US012656588B2

(12) United States Patent
Hirano et al.

(10) Patent No.: US 12,656,588 B2
(45) Date of Patent: Jun. 16, 2026

(54) PROJECTION SYSTEM AND PROJECTOR

(71) Applicant: SEIKO EPSON CORPORATION, Tokyo (JP)

(72) Inventors: Hitoshi Hirano, Suwa (JP); Akihisa Kageyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 286 days.

(21) Appl. No.: 18/599,608

(22) Filed: Mar. 8, 2024

(65) Prior Publication Data

US 2024/0302636 A1 Sep. 12, 2024

(30) Foreign Application Priority Data

Mar. 10, 2023 (JP) ................................ 2023-037310

(51) Int. Cl.
| | |
|---|---|
| *G02B 15/14* | (2006.01) |
| *G02B 13/18* | (2006.01) |
| *G03B 21/14* | (2006.01) |

(52) U.S. Cl.
CPC ......... *G02B 15/1465* (2019.08); *G02B 13/18* (2013.01); *G03B 21/142* (2013.01)

(58) Field of Classification Search
CPC .... G02B 15/1465; G02B 13/18; G02B 13/16; G02B 15/177; G03B 21/142; G03B 21/14

USPC .......................................................... 359/676
See application file for complete search history.

(56) References Cited

U.S. PATENT DOCUMENTS

| | | | | |
|---|---|---|---|---|
| 10,353,183 B2* | 7/2019 | Chang | ................ | G02B 13/0045 |
| 2005/0057795 A1* | 3/2005 | Tada | .................... | G02B 13/143 |
| | | | | 359/356 |
| 2016/0085053 A1* | 3/2016 | Asami | ................ | G02B 13/0045 |
| | | | | 359/755 |
| 2022/0099941 A1* | 3/2022 | Yang | .................. | G02B 27/0025 |

FOREIGN PATENT DOCUMENTS

JP          2013-200454 A      10/2013

* cited by examiner

*Primary Examiner* — Mohammed A Hasan
(74) *Attorney, Agent, or Firm* — Oliff PLC

(57) ABSTRACT

A projection system includes a first lens group having negative power, a second lens group having positive power, a third lens group having positive power, a fourth lens group having negative power, a fifth lens group having positive power, a sixth lens group having positive power, and a seventh lens group having positive power that are sequentially arranged from the enlargement side toward the reduction side. The second lens group, the third lens group, the fourth lens group, the fifth lens group, and the sixth lens group are moved with the first lens group and the seventh lens group fixed to change the magnification of the projection system.

7 Claims, 46 Drawing Sheets

*FIG. 10*

DISTORTION

ASTIGMATIC
FIELD CURVES

LONGITUDINAL
SPHERICAL ABER.

*FIG. 21*

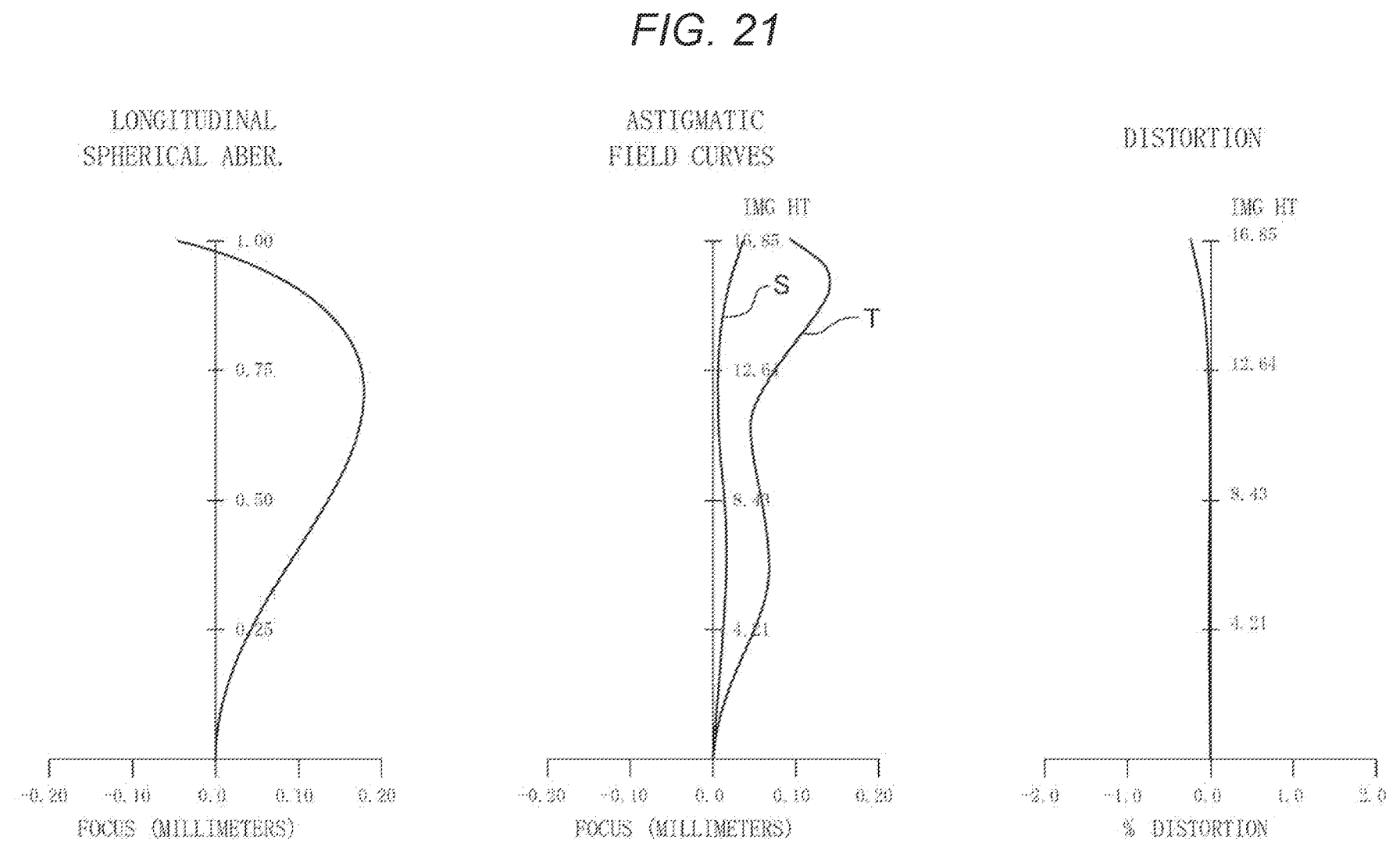

DISTORTION

IMG HT
16.85

12.64

8.43

4.21

-2.0          -1.0          0.0          1.0          2.0
% DISTORTION

ASTIGMATIC
FIELD CURVES

IMG HT

T

S

T 16.85

12.64

8.43

4.21

-0.20          -0.10          0.0          0.10          0.20
FOCUS (MILLIMETERS)

LONGITUDINAL
SPHERICAL ABER.

1.00

0.75

0.50

0.25

-0.20          -0.10          0.0          0.10          0.20
FOCUS (MILLIMETERS)

TANGENTIAL                1.00  RELATIVE                SAGITTAL
                          FIELD HEIGHT
                          ( 19.82 )°

0.80  RELATIVE
FIELD HEIGHT
( 16.12 )°

0.40  RELATIVE
FIELD HEIGHT
( 8.291 )°

0.00  RELATIVE
FIELD HEIGHT
( 0.000 )°

PROJECTION SYSTEM AND PROJECTOR

The present application is based on, and claims priority from JP Application Serial Number 2023-037310, filed Mar. 10, 2023, the disclosure of which is hereby incorporated by reference herein in its entirety.

BACKGROUND

1. Technical Field

The present disclosure relates to a projection system and a projector.

2. Related Art

JP-A-2013-200454 describes a projector that projects a projection image displayed at an image display device onto a screen via a projection system that enlarge the projection image. The projection system described in JP-A-2013-200454 is formed of a negative first lens group, a positive second lens group, a third lens group, a fourth lens group, a negative fifth lens group, a positive or negative sixth lens group, and a positive seventh lens group sequentially arranged from the enlargement side. To change the enlargement magnification, the second lens group to the sixth lens group are moved. The projection system has a zooming ratio of about two. In the projection system, a focal length fw of the overall projection system operating at the wide angle end, a focal length f1 of the first lens group, a focal length f2 of the second lens group, a focal length f3 of the third lens group, and a focal length f4 of the fourth lens group satisfy the conditional expressions below.

$$1.3 < |f1|/fw < 1.9$$

$$0.6 < f2/f3 < 3.5$$

$$0.4 < f4/f3 < 3.7$$

JP-A-2013-200454 is an example of the related art.

The projection system described in JP-A-2013-200454 suppresses the chromatic aberration of magnification while achieving a large zooming ratio. It is, however, required to provide a projection system having a large zooming ratio that suppresses the chromatic aberration of magnification by a greater degree.

SUMMARY

To achieve the advantage described above, a projection system according to an aspect of the present disclosure includes a first lens group having negative power, a second lens group having positive power, a third lens group having positive power, a fourth lens group having negative power, a fifth lens group having positive power, a sixth lens group having positive power, and a seventh lens group having positive power that are sequentially arranged from the enlargement side toward the reduction side. The second lens group, the third lens group, the fourth lens group, the fifth lens group, and the sixth lens group are moved with the first lens group and the seventh lens group fixed to change the magnification of the projection system. The projection system satisfies the following conditional expressions, $$1.0 < Fg2/Fw < 3.0 \tag{1}$$

$$-2.50 \leq Fg2/Fg1 < -1.0 \tag{2}$$

$$0.5 \leq Fg2/Fg3 < 1.0 \tag{3}$$

$$Ft/Fw > 2.0 \tag{4}$$

where Fw represents a focal length of the overall projection system operating at a wide angle end, Ft represents the focal length of the overall projection system operating at a tele-photo end, Fg1 represents a focal length of the first lens group, Fg2 represents a focal length of the second lens group, and Fg3 represents a focal length of the third lens group.

A projector according to another aspect of the present disclosure includes the projection system described above and an image formation device that forms a projection image in a reduction-side conjugate plane of the projection system.

BRIEF DESCRIPTION OF THE DRAWINGS

FIG. 10 shows the spherical aberration, astigmatism, and distortion produced by the projection system according to Example 2 operating at the wide angle end.

FIG. 21 shows the spherical aberration, astigmatism, and distortion produced by the projection system according to Example 4 operating at the telephoto end.

DESCRIPTION OF EMBODIMENTS

Figure 1:
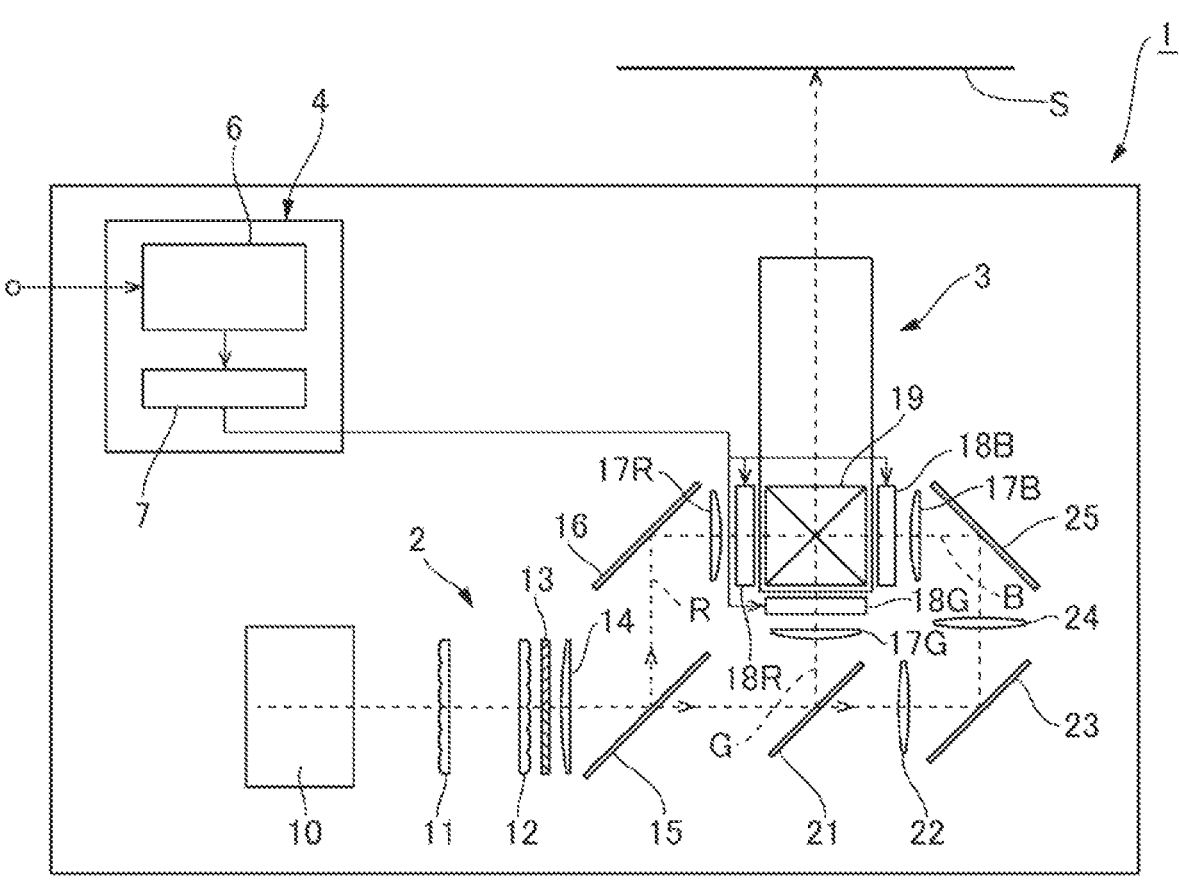
FIG. 1 shows a schematic configuration of a projector including a projection system according to an embodiment of the present disclosure.

A projection system and a projector according to an embodiment of the present disclosure will be described below with reference to the drawings.
Projector FIG. 1 shows a schematic configuration of a projector including a projection system 3 according to the embodiment of the present disclosure. A projector 1 includes an image formation unit 2, which generates a projection image to be projected onto a screen S, the projection system 3, which enlarges the projection image and projects the enlarged image onto the screen S, and a controller 4, which controls the operation of the image formation unit 2, as shown in FIG. 1.
Image Formation Unit and Controller The image formation unit 2 includes a light source 10, a first optical integration lens 11, a second optical integration lens 12, a polarization converter 13, and a superimposing lens 14. The light source 10 is formed, for example, of an ultrahigh-pressure mercury lamp or a solid-state light source. The first optical integration lens 11 and the second optical integration lens 12 each include a plurality of lens elements arranged in an array. The first optical integration lens 11 divides a luminous flux from the light source 10 into a plurality of luminous fluxes. The lens elements of the first optical integration lens 11 bring the luminous flux from the light source 10 into focus in the vicinity of the lens elements of the second optical integration lens 12.

The polarization converter 13 converts the light via the second optical integration lens 12 into predetermined linearly polarized light. The superimposing lens 14 superimposes images of the lens elements of the first optical integration lens 11 on one another in a display region of each of liquid crystal panels 18R, 18G, and 18B, which will be described later, via the second optical integration lens 12.

The image formation unit 2 further includes a first dichroic mirror 15, a reflection mirror 16, a field lens 17R, and the liquid crystal panel 18R. The first dichroic mirror 15 reflects R light, which is part of the beam incident via the superimposing lens 14, and transmits G light and B light, which are part of the beam incident via the superimposing lens 14. The R light reflected off the first dichroic mirror 15 travels via the reflection mirror 16 and the field lens 17R and is incident on the liquid crystal panel 18R. The liquid crystal panel 18R is an image formation device. The liquid crystal panel 18R modulates the R light in accordance with an image signal to form a red projection image.

The image formation unit 2 further includes a second dichroic mirror 21, a field lens 17G, and the liquid crystal panel 18G. The second dichroic mirror 21 reflects the G light, which is part of the beam via the first dichroic mirror 15, and transmits the B light, which is part of the beam via the first dichroic mirror 15. The G light reflected off the second dichroic mirror 21 passes through the field lens 17G and is incident on the liquid crystal panel 18G. The liquid crystal panel 18G is an image formation device. The liquid crystal panel 18G modulates the G light in accordance with an image signal to form a green projection image.

The image formation unit 2 further includes a relay lens 22, a reflection mirror 23, a relay lens 24, a reflection mirror 25, a field lens 17B, the liquid crystal panel 18B, and a cross dichroic prism 19. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is an image formation device. The liquid crystal panel 18B modulates the B light in accordance with an image signal to form a blue projection image.

The liquid crystal panels 18R, 18G, and 18B surround the cross dichroic prism 19 in such a way that the liquid crystal panels 18R, 18G, and 18B face three sides of the cross dichroic prism 19. The cross dichroic prism 19, which is a prism for light combination, produces a projection image that is the combination of the light modulated by the liquid crystal panel 18R, the light modulated by the liquid crystal panel 18G, and the light modulated by the liquid crystal panel 18B.

The projection system 3 enlarges the combined projection image from the cross dichroic prism 19 and projects the enlarged projection image onto the screen S.

The controller 4 includes an image processor 6, to which an external image signal, such as a video signal, is input, and a display driver 7, which drives the liquid crystal panels 18R, 18G, and 18B based on image signals output from the image processor 6.

The image processor 6 converts an image signal input from an external apparatus into image signals each containing grayscales and other factors of the corresponding color. The display driver 7 operates the liquid crystal panels 18R, 18G, and 18B based on the color projection image signals output from the image processor 6. The image processor 6 thus causes the liquid crystal panels 18R, 18G, and 18B to display projection images corresponding to the image signals.

Projection System

The projection system 3 will next be described. The screen S is disposed in the enlargement-side conjugate plane of the projection system 3, as shown in FIG. 1. The liquid crystal panels 18R, 18G, and 18B are disposed in the reduction-side conjugate plane of the projection system 3.

Examples 1 to 9 will be described below as examples of the configuration of the projection system 3 incorporated in the projector 1.

Example 1

Figure 2:
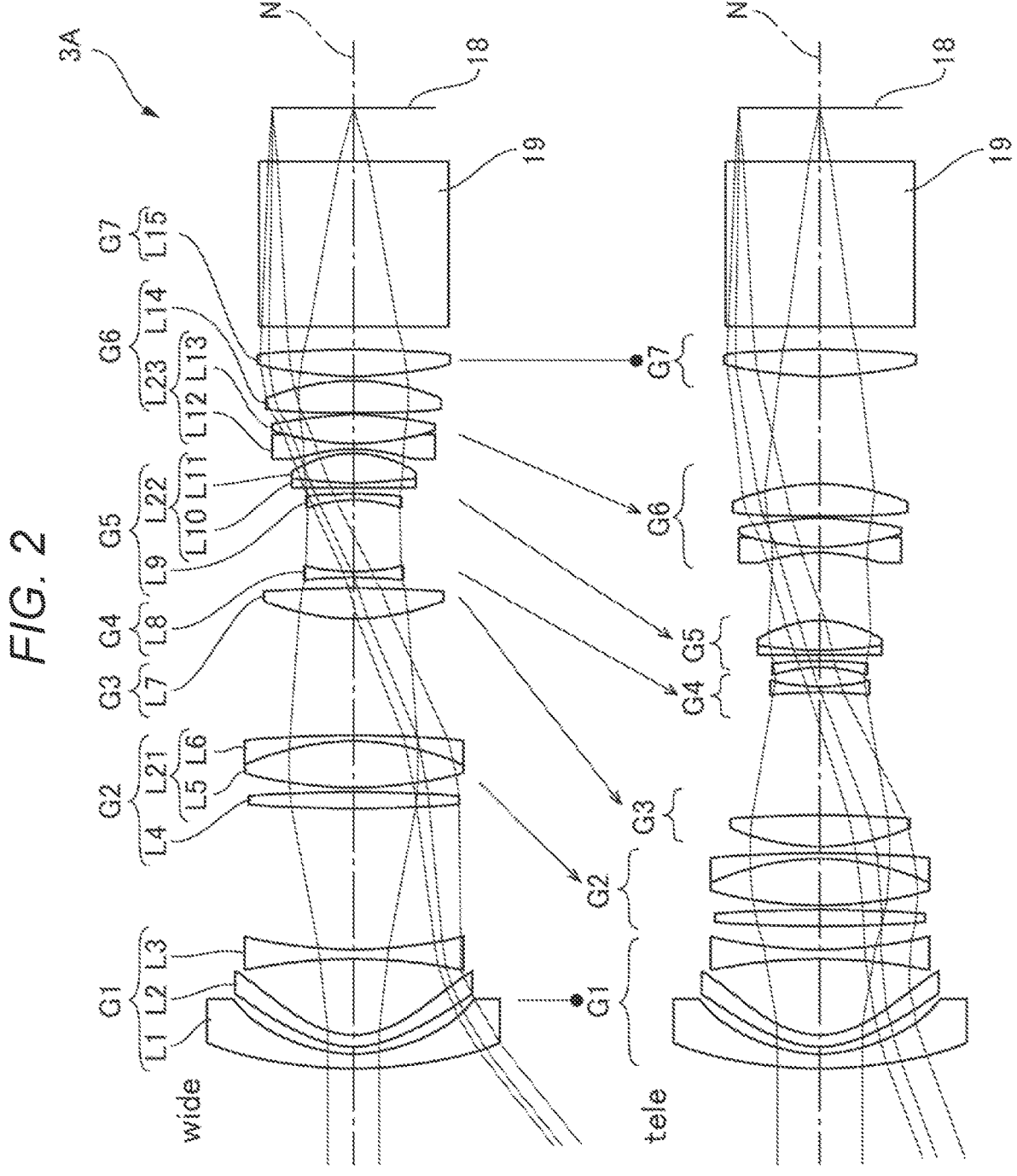
FIG. 2 is a beam diagram showing beams passing through the projection system according to Example 1.

FIG. 2 is a beam diagram showing beams passing through a projection system 3A according to Example 1. In the beam diagrams for the projection systems 3 according to Examples 1 to 9, the liquid crystal panels 18R, 18G, and 18B are referred to as a liquid crystal panel 18.

The projection system 3A includes a first lens group G1 having negative power, a second lens group G2 having positive power, a third lens group G3 having positive power, a fourth lens group G4 having negative power, a fifth lens group G5 having positive power, a sixth lens group G6 having positive power, and a seventh lens group G7 having positive power sequentially arranged from the enlargement side toward the reduction side, as shown in FIG. 2.

The first lens group G1 is formed of three lenses L1 to L3. The lenses L1 to L3 are arranged in this order from the enlargement side toward the reduction side. The lens L1 has negative power. The lens L1 is a meniscus lens. The lens L1 has a convex surface at the enlargement side and a concave surface at the reduction side. The lens L2 is made of resin. The lens L2 has negative power. The lens L2 has a convex surface at the enlargement side and a concave surface at the reduction side. The lens L2 has aspheric surfaces at the enlargement and reduction sides. The lens L3 has negative power. The lens L3 has concave surfaces at the enlargement and reduction sides.

The second lens group G2 is formed of three lenses L4 to L6. The lenses L4 to L6 are arranged in this order from the enlargement side toward the reduction side. The lens L4 has positive power. The lens L4 has convex surfaces at the enlargement and reduction sides. The lens L5 has positive power. The lens L5 has convex surfaces at the enlargement and reduction sides. The lens L6 has negative power. The lens L6 is a meniscus lens. The lens L6 has a concave surface at the enlargement side and a convex surface at the reduction side. The lens L5 and the lens L6 are bonded to each other into a cemented doublet L21. The cemented doublet L21 has positive power.

The third lens group G3 is formed of a single lens L7. The lens L7 has positive power. The lens L7 has convex surfaces at the enlargement and reduction sides. The fourth lens group G4 is formed of a single lens L8. The lens L8 has negative power. The lens L8 has concave surfaces at the enlargement and reduction sides.

The fifth lens group G5 is formed of three lenses L9 to L11. The lenses L9 to L11 are arranged in this order from the enlargement side toward the reduction side. The lens L9 is made of glass. The lens L9 has negative power. The lens L9 is a meniscus lens. The lens L9 has a concave surface at the enlargement side and a convex surface at the reduction side. The lens L9 has an aspheric surface at the enlargement side. The lens L10 has negative power. The lens L10 is a meniscus lens. The lens L10 has a convex surface at the enlargement side and a concave surface at the reduction side. The lens L11 has positive power. The lens L11 has convex surfaces at the enlargement and reduction sides. The lens L10 and the lens L11 are bonded to each other into a cemented doublet L22. The cemented doublet L22 has positive power.

The sixth lens group G6 is formed of three lenses L12 to L14. The lenses L12 to L14 are arranged in this order from the enlargement side toward the reduction side. The lens L12 has negative power. The lens L12 has concave surfaces at the enlargement and reduction sides. The lens L13 has positive power. The lens L13 has convex surfaces at the enlargement and reduction sides. The lens L12 and the lens L13 are bonded to each other into a cemented doublet L23. The cemented doublet L23 has negative power. The lens L14 has positive power. The lens L14 has convex surfaces at the enlargement and reduction sides.

The seventh lens group G7 is formed of a single lens L15. The lens L15 has positive power. The lens L15 has convex surfaces at the enlargement and reduction sides.

In the projection system 3A, the reduction side of the lens L15 of the seventh lens group G7 forms a telecentric system. The term "telecentric" means that the central beam of each luminous flux traveling between the lens L15 and the liquid crystal panel 18 disposed in the reduction-side conjugate plane is parallel or substantially parallel to the optical axis of the projection system. The term "telecentric" in the present specification means that the angle between the center beam of each of the luminous fluxes and an optical axis N of the projection system 3A is smaller than or equal to ±5°.

The projection system 3A is a zoom lens having an angle of view that changes between the angle at the wide angle end and the angle at the telephoto end. To change the magnification of the projection system 3A, the first lens group G1 and the seventh lens group G7 are fixed, and the second lens group G2, the third lens group G3, the fourth lens group G4, the fifth lens group G5, and the sixth lens group G6 are moved along the optical axis N. When the magnification is changed from the value at the wide angle end to the value at the telephoto end, the second lens group G2, the third lens group G3, the fourth lens group G4, the fifth lens group G5, and the sixth lens group G6 are each moved along the optical axis N from the reduction side toward the enlargement side. In the present example, the zooming ratio is about 2.08.

Data on the projection system 3A are listed in the table below, in which FNo represents the f number of the projection system 3A, ω represents the half angle of view, Fw represents the focal length of the overall projection system operating at the wide angle end, Ft represents the focal length of the overall projection system operating at the telephoto end, LL represents the overall length of the projection system (distance from object-side surface of lens L1 to reduction-side surface of lens L15), IH represents the largest image height at the liquid crystal panel 18, M represents the projection magnification, Fg1 represents the focal length of the first lens group G1, Fg2 represents the focal length of the second lens group G2, and Fg3 represents the focal length of the third

| | |
|---|---|
| FNo (between wide angle end and telephoto end) | 2.01 to 2.61 |
| ω (between telephoto end and wide angle end) | 19.81° to 37.24° |
| Fw | 22.48 mm |
| Ft | 46.74 mm |
| LL | 156.00 mm |
| IH | 16.85 mm |
| M | 108.01 |
| Fg1 | −31.56 mm |
| Fg2 | 55.00 mm |
| Fg3 | 78.16 mm |

Data on the lenses of the projection system 3A are listed below. The surfaces of the lenses are numbered sequentially from the enlargement side toward the reduction side. Reference characters are given to the screen, the lenses, the dichroic prism, and the liquid crystal panels. An aspheric surface has a surface number followed by *. R represents the radius of curvature. D represents the axial inter-surface spacing. Nd represents the refractive index at the d line. vd represents the Abbe number at the d line. R and D are expressed in millimeters.

| Reference character | Surface number | R | D | Nd | vd |
|---|---|---|---|---|---|
| S | 1 | 1.00E+18 | 2390.000 | | |
| L1 | 2 | 86.596 | 3.133 | 1.6230 | 58.17 |
| | 3 | 32.130 | 1.563 | | |

-continued

| Reference character | Surface number | R | D | Nd | vd |
|---|---|---|---|---|---|
| L2 | 4* | 17.271 | 2.560 | 1.5350 | 55.71 |
| | 5* | 13.823 | 16.494 | | |
| L3 | 6 | −102.402 | 2.000 | 1.4970 | 81.55 |
| | 7 | 94.068 | Variable spacing 1 | | |
| L4 | 8 | 259.777 | 3.649 | 1.7205 | 34.71 |
| | 9 | −267.783 | 0.800 | | |
| L5 | 10 | 78.290 | 10.254 | 1.7620 | 40.10 |
| L6 | 11 | −53.252 | 1.200 | 1.7552 | |
| | 12 | −231.426 | Variable spacing 2 | | |
| L7 | 13 | 44.452 | 6.848 | 1.4970 | 81.55 |
| | 14 | −298.356 | Variable spacing 3 | | |
| L8 | 15 | −102.274 | 1.200 | 1.5163 | 64.14 |
| | 16 | 41.048 | Variable spacing 4 | | |
| L9 | 17* | −27.492 | 1.400 | 1.5831 | 59.39 |
| | 18 | −80.000 | 1.112 | | |
| L10 | 19 | 942.643 | 1.200 | 1.7552 | 27.51 |
| L11 | 20 | 69.537 | 6.334 | 1.4970 | 81.55 |
| | 21 | −22.683 | Variable spacing 5 | | |
| L12 | 22 | −34.350 | 1.200 | 1.7552 | 27.51 |
| L13 | 23 | 54.017 | 6.110 | 1.4970 | 81.55 |
| | 24 | −70.335 | 0.500 | | |
| L14 | 25 | 174.757 | 7.022 | 1.7552 | 27.51 |
| | 26 | −44.562 | Variable spacing 6 | | |
| L15 | 27 | 71.554 | 6.062 | 1.4970 | 81.55 |
| | 28 | −157.933 | 5.100 | | |
| 19 | 29 | 1.00E+18 | 35.540 | 1.5168 | 64.20 |
| | 30 | 1.00E+18 | 10.360 | | |
| 18 | 31 | 1.00E+18 | 0.000 | | |

The table below shows the variable spacings 1, 2, 3, 4, 5, and 6 required for the changes in magnification. Note that the following spacings are also defined as follows: The variable spacing 1 is the spacing between the first lens group G1 and the second lens group G2; the variable spacing 2 is the spacing between the second lens group G2 and the third lens group G3; the variable spacing 3 is the spacing between the third lens group G3 and the fourth lens group G4; the variable spacing 4 is the spacing between the fourth lens group G4 and the fifth lens group G5; the variable spacing 5 is the spacing between the fifth lens group G5 and the sixth lens group G6; and the variable spacing 6 is the spacing between the sixth lens group G6 and the seventh lens group G7.

| | Wide angle end | Intermediate position | Telephoto end |
|---|---|---|---|
| Variable spacing 1 | 30.599 | 11.020 | 4.923 |
| Variable spacing 2 | 25.090 | 12.831 | 1.000 |
| Variable spacing 3 | 2.302 | 17.476 | 27.076 |
| Variable spacing 4 | 15.568 | 8.508 | 3.854 |
| Variable spacing 5 | 1.000 | 13.178 | 15.000 |
| Variable spacing 6 | 0.800 | 12.206 | 23.309 |

9

The aspheric coefficients are listed below.

| Surface number | 4 | 5 | 17 |
|---|---|---|---|
| R | 17.271 | 13.823 | −27.492 |
| Conic constant (K) | −0.878 | −0.939 | 2.387 |
| Fourth-order coefficient | −3.545002E−05 | −4.219137E−05 | 2.546338E−06 |
| Sixth-order coefficient | 3.940472E−08 | 4.951730E−08 | 4.995544E−09 |
| Eighth-order coefficient | −2.718503E−11 | −3.833998E−11 | 4.707074E−10 |
| Tenth-order coefficient | 7.571079E−15 | 6.852409E−15 | −5.274175E−12 |
| Twelfth-order coefficient | −2.379045E−18 | 1.238344E−18 | 4.665867E−14 |
| Fourteenth-order coefficient | −2.668105E−21 | 8.143484E−21 | −1.367595E−16 |
| Sixteenth-order coefficient | 2.455242E−24 | 9.572530E−25 | 9.456857E−29 |
| Eighteenth-order coefficient | 1.270225E−26 | −5.566497E−26 | 0.000000E+00 |
| Twentieth-order coefficient | −1.847579E−29 | 4.280899E−29 | 0.000000E+00 |

The projection system 3A according to the present example satisfies the conditional expressions below, $$1.0 < Fg2/Fw < 3.0 \qquad (1)$$
$$-2.50 \le Fg2/Fg1 < -1.0 \qquad (2)$$
$$0.5 \le Fg2/Fg3 < 1.0 \qquad (3)$$
$$Ft/Fw > 2.0 \qquad (4)$$

where Fw represents the focal length of the overall projection system operating at the wide angle end, Ft represents the focal length of the overall projection system operating at the telephoto end, Fg1 represents the focal length of the first lens group G1, Fg2 represents the focal length of the second lens group G2, and Fg3 represents the focal length of the third lens group G3.

In the present example,

| Fw | 22.48 mm |
|---|---|
| Fg2 | 55.00 mm | are provided. Fg2/Fw=2.45 is therefore achieved, so that Conditional Expression (1) is satisfied.

In the present example,

| Fg1 | −31.56 mm |
|---|---|
| Fg2 | 55.00 mm | are provided. Fg2/Fg1=−1.74 is therefore achieved, so that Conditional Expression (2) is satisfied.

In the present example,

| Fg2 | 55.00 mm |
|---|---|
| Fg3 | 78.16 mm |

10 are provided. Fg2/Fg3=0.70 is therefore achieved, so that Conditional Expression (3) is satisfied.

In the present example,

| Fw | 22.48 mm |
|---|---|
| Ft | 46.74 mm | are provided. Ft/Fw=2.08 is therefore achieved, so that Conditional Expression (4) is satisfied.

The projection system 3A according to the present example satisfies the conditional expression below, $$0.10 < Dwg12/LL < 0.30 \qquad (5)$$

where LL represents the overall length of the projection system, and Dwg12 represents the spacing between the first lens group G1 and the second lens group G2 of the projection system 3A operating at the wide angle end.

In the present example,

| LL | 156.00 mm |
|---|---|
| Dwg12 | 30.60 mm | are provided. Dwg12/LL=0.20 is therefore achieved, so that Conditional Expression (5) is satisfied.

The projection system 3A according to the present example satisfies the conditional expression below, $$0 < Dwg34/LL \le 0.05 \qquad (6)$$

where LL represents the overall length of the projection system, and Dwg34 represents the spacing between the third lens group G3 and the fourth lens group G4 of the projection system 3A operating at the wide angle end.

In the present example,

| LL | 156.00 mm |
|---|---|
| Dwg34 | 2.30 mm | are provided. Dwg34/LL=0.01 is therefore achieved, so that Conditional Expression (6) is satisfied.

The projection system 3A according to the present example satisfies the conditional expression below, $$8.0 < LL/IH \le 11.0 \qquad (7)$$

where LL represents the overall length of the projection system, and IH represents the largest image height at the liquid crystal panel 18.

In the present example,

| LL | 156.00 mm |
|---|---|
| IH | 16.85 mm | are provided. LL/IH=9.26 is therefore achieved, so that Conditional Expression (7) is satisfied.

The projection system 3A according to the present example satisfies the conditional expression below, $$Nd < 1.85 \quad (8)$$

where Nd represents the refractive index of the following lenses at the d line: all the lenses that constitute the first lens group G1, the second lens group G2, the third lens group G3, the fourth lens group G4, the fifth lens group G5, the sixth lens group G6, and the seventh lens group G7.

In the present example, Nd=1.50 to 1.76 is provided, so that Conditional Expression (8) is satisfied.

Effects and Advantages

The projection system 3A according to the present example is formed of the first lens group G1 having negative power, the second lens group G2 having positive power, the third lens group G3 having positive power, the fourth lens group G4 having negative power, the fifth lens group G5 having positive power, the sixth lens group G6 having positive power, and the seventh lens group G7 having positive power sequentially arranged from the enlargement side toward the reduction side. To change the magnification of the projection system 3A, the first lens group G1 and the seventh lens group G7 are fixed, and the second lens group G2, the third lens group G3, the fourth lens group G4, the fifth lens group G5, and the sixth lens group G6 are moved.

According to the present example, the lens groups having negative, positive, positive, negative, positive, positive, and positive power are sequentially arranged from the enlargement side toward the reduction side, so that the reduction side of the seventh lens group G7 of the projection system 3A can form a telecentric system with the back focal length of the projection system 3A ensured. Only the second lens group G2 to the sixth lens group G6 are moved to change the magnification of the projection system 3A, so that the structure of the lens barrel that holds the projection system 3A can be simplified.

The projection system 3A satisfies the conditional expressions below, $$1.0 < Fg2/Fw < 3.0 \quad (1)$$

$$-2.50 \leq Fg2/Fg1 < -1.0 \quad (2)$$

$$0.5 \leq Fg2/Fg3 < 1.0 \quad (3)$$

$$Ft/Fw > 2.0 \quad (4)$$

where Fw represents the focal length of the overall projection system operating at the wide angle end, Ft represents the focal length of the overall projection system operating at the telephoto end, Fg1 represents the focal length of the first lens group G1, Fg2 represents the focal length of the second lens group G2, and Fg3 represents the focal length of the third lens group G3.

The projection system 3A according to the present example, which satisfies Conditional Expression (1), can satisfactorily correct a variety of aberrations with the size of the projection system reduced. When the value of Conditional Expression (1) is smaller than the lower limit, the size of the projection system can be reduced, but the second lens group G2 has too large power, so that it is difficult to correct the variety of aberrations. When the value of Conditional Expressions (1) is greater than the upper limit, the variety of aberrations can be satisfactorily corrected, but the size of the projection system increases.

The projection system 3A according to the present example, which satisfies Conditional Expression (2), can satisfactorily correct the chromatic aberration of magnification and the variety of aberrations. Since the first lens group G1 has positive power, and the second lens group G2 has negative power, the first lens group G1 can cancel out the chromatic aberration of magnification and the variety of aberrations produced by the second lens group G2. When the value of Conditional Expression (2) is smaller than the lower limit, the second lens group G2 has small power, so that the variety of aberrations produced by the second lens group G2 can be suppressed, but it is difficult to satisfactorily correct the chromatic aberration of magnification. When the value of Conditional Expression (2) is greater than the upper limit, the chromatic aberration of magnification can be satisfactorily corrected, but the second lens group G2 has too large power, so that it is difficult to correct the variety of aberrations.

The projection system 3A according to the present example, which satisfies Conditional Expression (3), can satisfactorily correct the chromatic aberration of magnification and the variety of aberrations. When the value of Conditional Expression (3) is smaller than the lower limit, the difference in power between the second lens group G2 and the third lens group G3 increases, so that the chromatic aberration of magnification can be corrected, but it is difficult to correct the variety of aberrations. When the value of Conditional Expression (3) is greater than the upper limit, the difference in power between the second lens group G2 and the third lens group G3 decreases, so that the variety of aberrations can be corrected, but it is difficult to correct the chromatic aberration of magnification.

The projection system 3A according to the present example, which satisfies Conditional Expression (4), can provide a large zooming ratio.

The second lens group G2 is formed of the following lenses arranged from the enlargement side toward the reduction side: the lens L4, which is a positive lens; the lens L5, which is a positive lens; and the lens L6, which is a negative lens. The second lens group G2, which includes two positive lenses, allows a decrease in the power of each of the positive lenses as compared with a case where the second lens group G2 includes one positive lens. The variety of aberrations produced by the second lens group G2 can thus be suppressed. Furthermore, the second lens group G2 includes one negative lens and can therefore satisfactorily correct the chromatic aberration of magnification produced by the two positive lenses. Moreover, the three lenses of the second lens group G2 can satisfactorily correct the chromatic aberration of magnification and the variety of aberrations, so that the second lens group G2 is compact.

The projection system 3A according to the present example satisfies the conditional expression below, $$0.10 < Dwg12/LL < 0.30 \quad (5)$$

where LL represents the overall length of the projection system, and Dwg12 represents the spacing between the first lens group and the second lens group of the projection system 3A operating at the wide angle end.

The projection optical system operating at the wide angle end is likely to produce the chromatic aberration of magnification and distortion because the angle of the beam that enters the first lens group G1 is greater than those produced by the projection system operating at the telephoto end. The projection system 3A according to the present example satisfies Conditional Expression (5) and can therefore suppress design error sensitivity and ensure the distance between the first lens group G1 and the second lens group G2 while satisfactorily correcting the chromatic aberration of magnification and distortion. When the value of Conditional Expression (5) is smaller than the lower limit, the spacing between the first lens group G1 and the second lens group G2 decreases, so that the chromatic aberration of magnification and distortion can be satisfactorily corrected, but it is difficult to suppress the design error sensitivity and also difficult to ensure the spacing between the first lens group G1 and the second lens group G2 when the projection system is manufacture. When the value of Conditional Expression (5) is greater than the upper limit, the design error sensitivity can be suppressed, and the spacing between the first lens group G1 and the second lens group G2 is readily ensured when the projection system is manufacture, but the spacing between the first lens group G1 and the second lens group G2 is too large, so that it is difficult to satisfactorily correct the chromatic aberration of magnification and distortion.

The projection system 3A according to the present example satisfies the conditional expression below, $$0 < Dwg34/LL \le 0.05 \qquad (6)$$

where LL represents the overall length of the projection system, and Dwg34 represents the spacing between the third lens group G3 and the fourth lens group G4 of the projection system 3A operating at the wide angle end.

The projection optical system operating at the wide angle end is likely to produce the chromatic aberration of magnification because the angle of the beam that enters the third lens group G3 is greater than that produced by the projection system operating at the telephoto end. The projection system 3A according to the present example, which satisfies Conditional Expression (6), can therefore reduce the cost of the lens materials while satisfactorily correcting the chromatic aberration of magnification. When the value of Conditional Expression (6) is greater than the upper limit, the spacing between the third lens group G3 and the fourth lens group G4 is too large, so that the lens materials of the third lens group G3 and the fourth lens group G4 each need to have a large refractive index to satisfactorily correct the chromatic aberration of magnification. Using lens materials each having a large refractive index therefore increases the cost of the lens materials.

The projection system 3A according to the present example satisfies the conditional expression below, $$8.0 < LL/IH \le 11.0 \qquad (7)$$

where LL represents the overall length of the projection system, and IH represents the largest image height at the liquid crystal panel 18.

The projection system 3A according to the present example, which satisfies Conditional Expression (7), can satisfactorily correct the variety of aberrations with the overall projection system being compact. When the value of Conditional Expression (7) is smaller than the lower limit, the overall projection system can be compact, which, however, does not allow a necessary number of lenses for correcting the variety of aberrations to be all disposed in the projection system, and it is therefore difficult to satisfactorily correct the variety of aberrations. When the value of Conditional Expression (7) is greater than the upper limit, the necessary number of lenses for correcting the variety of aberrations can all be disposed in the projection system, but the size of the overall projection system increases.

The projection system 3A according to the present example satisfies the conditional expression below, $$Nd < 1.85 \qquad (8)$$

where Nd represents the refractive index of the following lenses at the d line: all the lenses that constitute the first lens group G1, the second lens group G2, the third lens group G3, the fourth lens group G4, the fifth lens group G5, the sixth lens group G6, and the seventh lens group G7.

The projection system 3A according to the present example, which satisfies Conditional Expression (8), allows improvement in the transmittance of the lenses and reduction in the cost of the lens materials. That is, when the value of Conditional Expression (8) is greater than the upper limit, the transmittance of the lenses decreases, and the cost of the lens materials increases.

Figure 3:
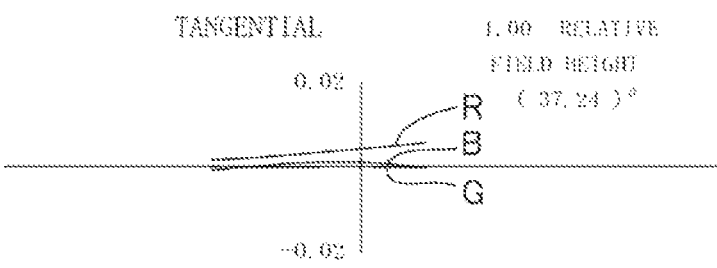
FIG. 3 shows the coma produced by the projection system according to Example 1 operating at the wide angle end.
Figure 3:
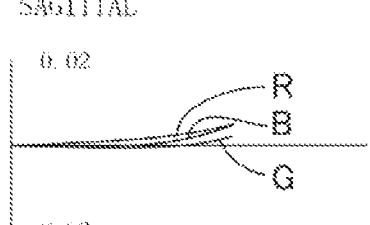
Figure 3:
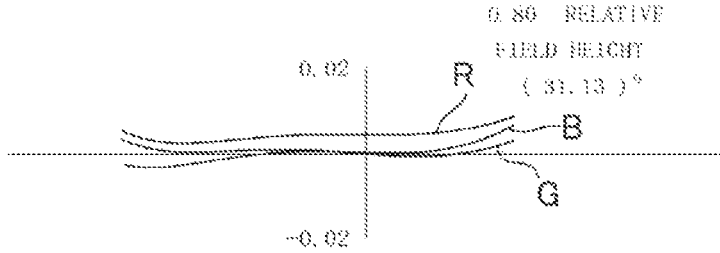
Figure 3:
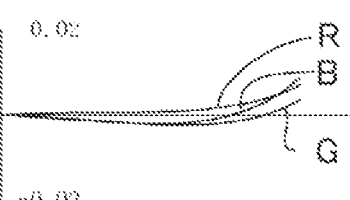
Figure 3:
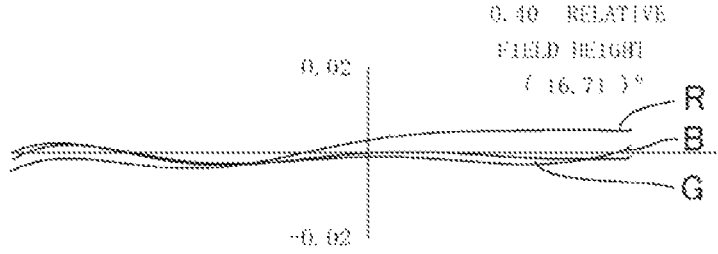
Figure 3:
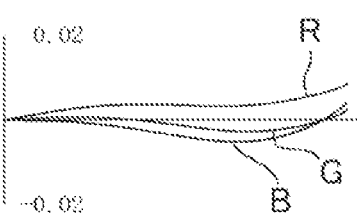
Figure 3:
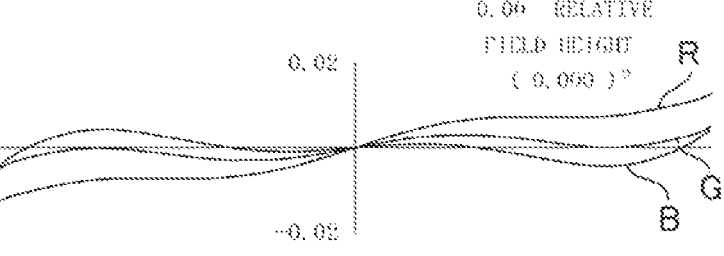
Figure 3:
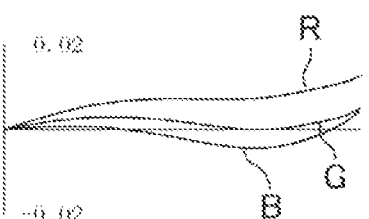
Figure 4:
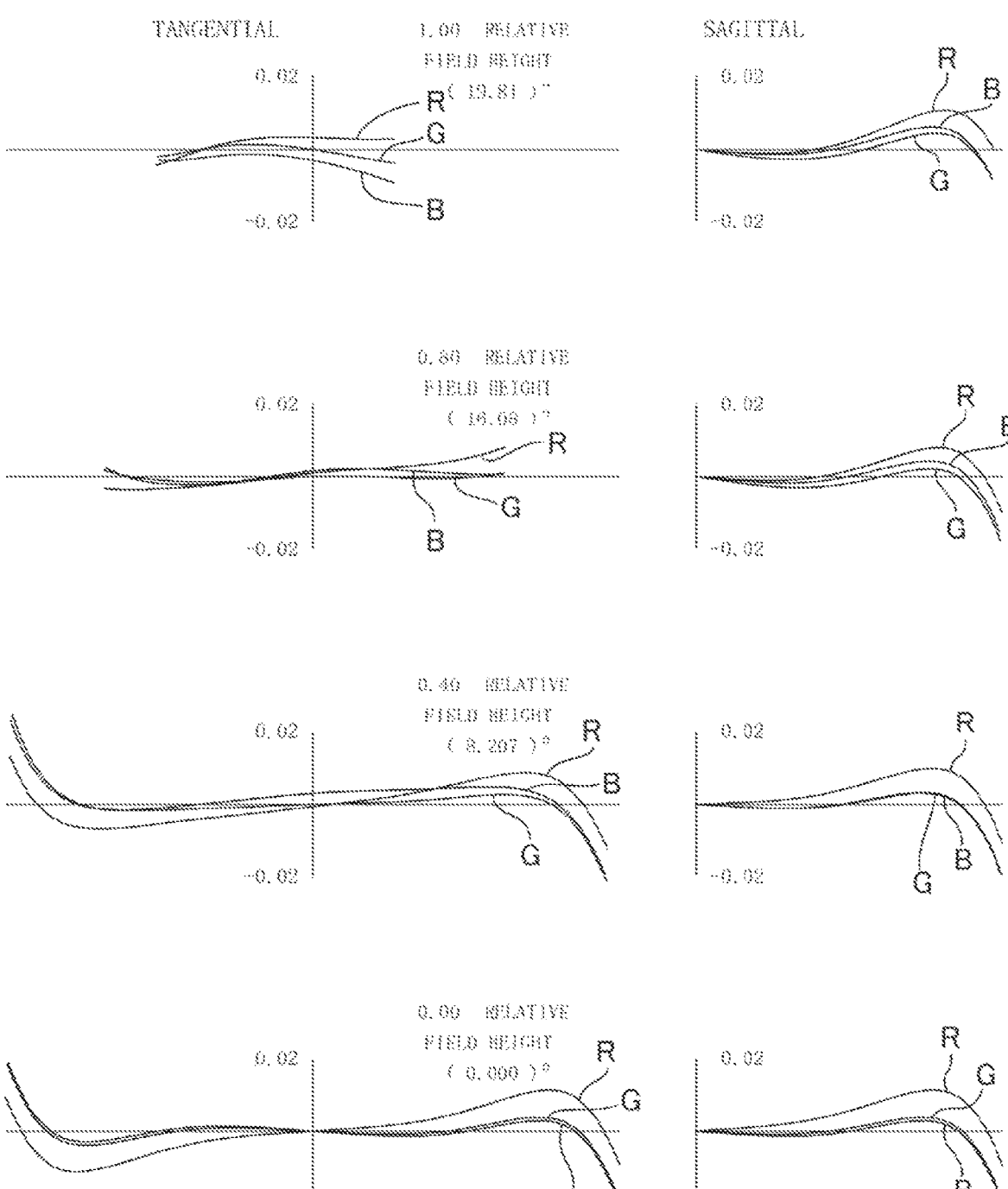
FIG. 4 shows the coma produced by the projection system according to Example 1 operating at the telephoto end.
Figure 5:
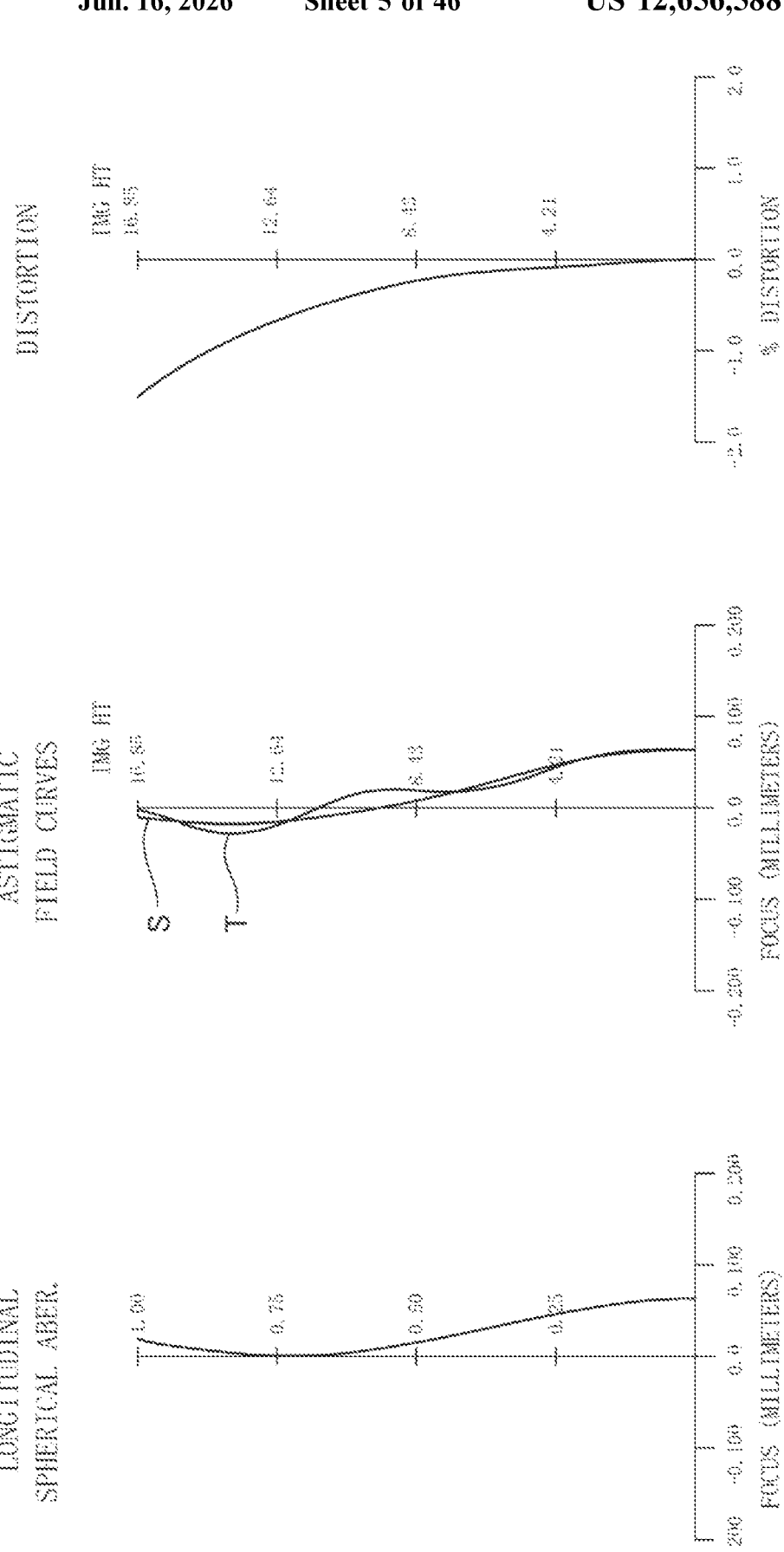
FIG. 5 shows the spherical aberration, astigmatism, and distortion produced by the projection system according to Example 1 operating at the wide angle end.
Figure 6:
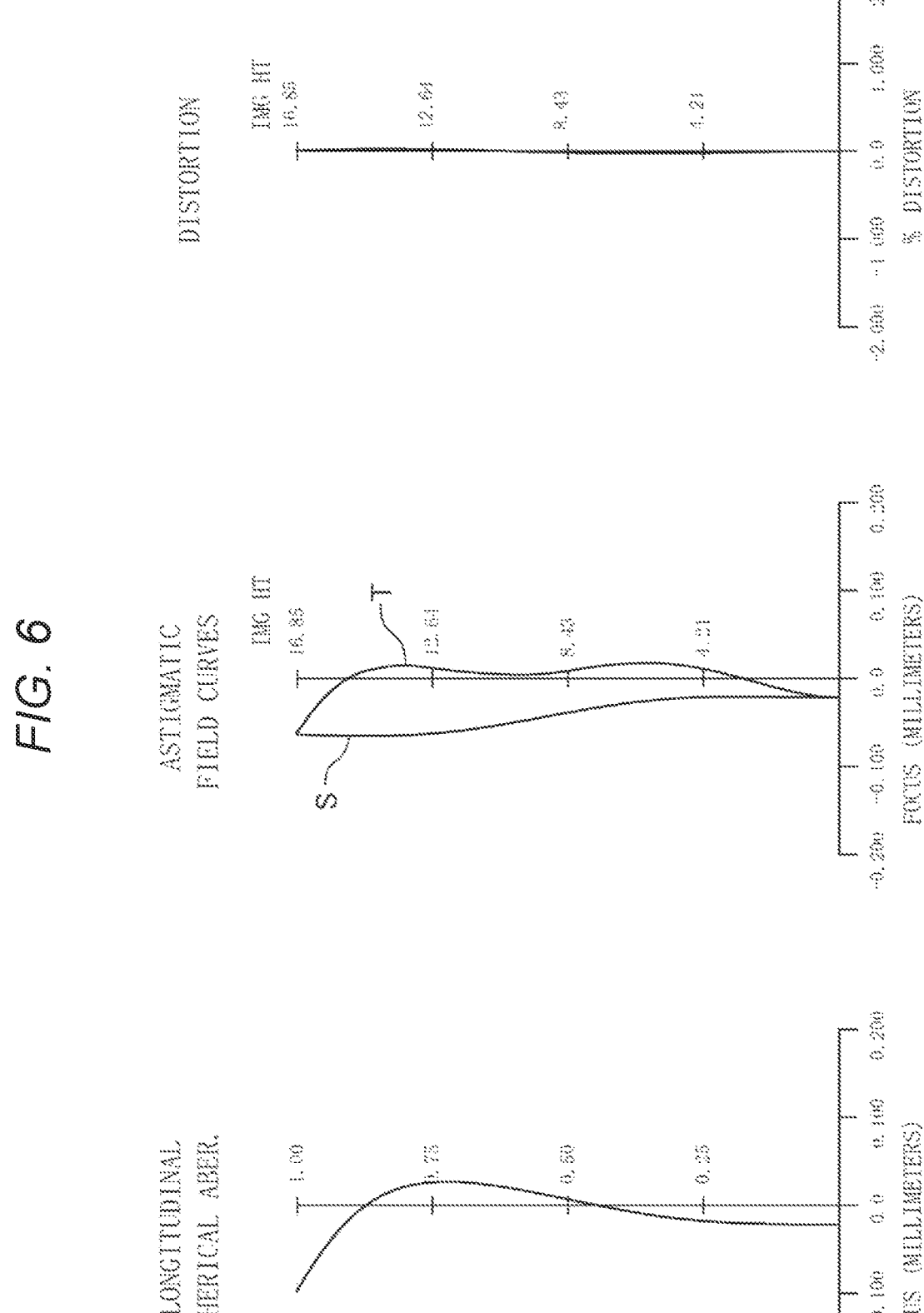
FIG. 6 shows the spherical aberration, astigmatism, and distortion produced by the projection system according to Example 1 operating at the telephoto end.

FIG. 3 shows the coma produced by the projection system 3A operating at the wide angle end. FIG. 4 shows the coma produced by the projection system 3A operating at the telephoto end. FIG. 5 shows the spherical aberration, astigmatism, and distortion produced by the projection system 3A operating at the wide angle end. FIG. 6 shows the spherical aberration, astigmatism, and distortion produced by the projection system 3A operating at the telephoto end. In the aberration diagrams, "G" represents the aberrations at a wavelength of 550.0 nm, "R" represents the aberration at a wavelength of 620.0 nm, "B" represents the aberration at a wavelength of 470.0 nm, "S" represents the sagittal image plane at the wavelength of 550.0 nm, and "T" represents the tangential image plane at the wavelength of 550.0 nm. The projection system 3A according to the present example suppresses the variety of aberrations, as shown in FIGS. 3 to 6.

Example 2

Figure 7:
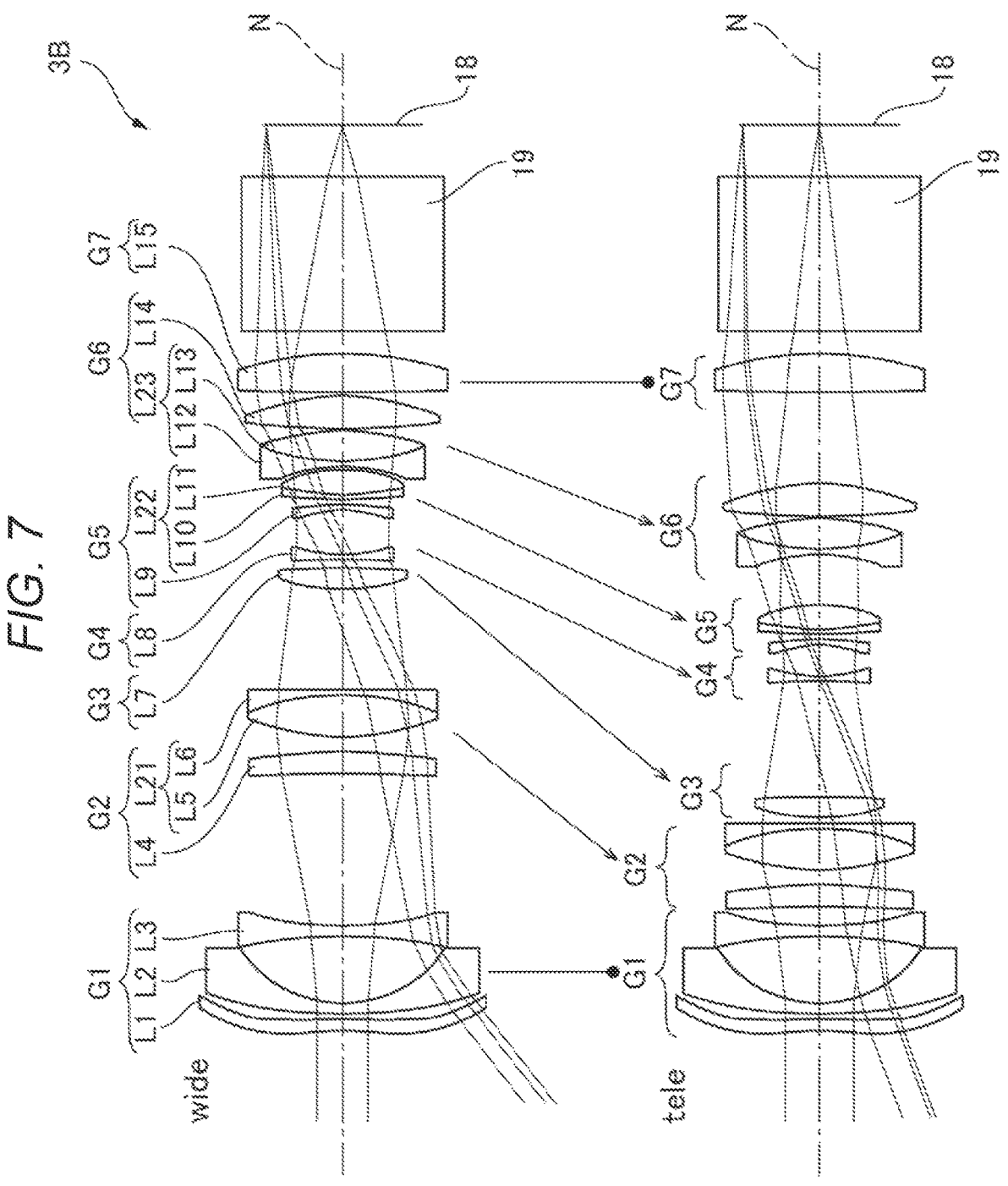
FIG. 7 is a beam diagram showing beams passing through the projection system according to Example 2.

FIG. 7 is a beam diagram showing beams passing through a projection system 3B according to Example 2. The projection system 3B includes a first lens group G1 having negative power, a second lens group G2 having positive power, a third lens group G3 having positive power, a fourth lens group G4 having negative power, a fifth lens group G5 having positive power, a sixth lens group G6 having positive power, and a seventh lens group G7 having positive power sequentially arranged from the enlargement side toward the reduction side, as shown in FIG. 7.

The first lens group G1 is formed of three lenses L1 to L3. The lenses L1 to L3 are arranged in this order from the enlargement side toward the reduction side. The lens L1 is made of resin. The lens L1 has negative power. The lens L1 has a convex surface at the enlargement side and a concave surface at the reduction side. The lens L1 has aspheric surfaces at the enlargement and reduction sides. The lens L2 has negative power. The lens L2 is a meniscus lens. The lens L2 has a convex surface at the enlargement side and a concave surface at the reduction side. The lens L3 has negative power. The lens L3 has concave surfaces at the enlargement and reduction sides.

The second lens group G2 is formed of three lenses L4 to L6. The lenses L4 to L6 are arranged in this order from the enlargement side toward the reduction side. The lens L4 has positive power. The lens L4 is a meniscus lens. The lens L4 has a concave surface at the enlargement side and a convex surface at the reduction side. The lens L5 has positive power. The lens L5 has convex surfaces at the enlargement and reduction sides. The lens L6 has negative power. The lens L6 has concave surfaces at the enlargement and reduction sides. The lens L5 and the lens L6 are bonded to each other into a cemented doublet L21. The cemented doublet L21 has positive power.

The third lens group G3 is formed of a single lens L7. The lens L7 has positive power. The lens L7 has convex surfaces at the enlargement and reduction sides. The fourth lens group G4 is formed of a single lens L8. The lens L8 has negative power. The lens L8 has concave surfaces at the enlargement and reduction sides.

The fifth lens group G5 is formed of three lenses L9 to L11. The lenses L9 to L11 are arranged in this order from the enlargement side toward the reduction side. The lens L9 is made of glass. The lens L9 has negative power. The lens L9 is a meniscus lens. The lens L9 has a concave surface at the enlargement side and a convex surface at the reduction side. The lens L9 has aspheric surfaces at the enlargement and reduction sides. The lens L10 has negative power. The lens L10 is a meniscus lens. The lens L10 has a convex surface at the enlargement side and a concave surface at the reduction side. The lens L11 has positive power. The lens L11 has convex surfaces at the enlargement and reduction sides. The lens L10 and the lens L11 are bonded to each other into a cemented doublet L22. The cemented doublet L22 has positive power.

The sixth lens group G6 is formed of three lenses L12 to L14. The lenses L12 to L14 are arranged in this order from the enlargement side toward the reduction side. The lens L12 has negative power. The lens L12 has concave surfaces at the enlargement and reduction sides. The lens L13 has positive power. The lens L13 has convex surfaces at the enlargement and reduction sides. The lens L12 and the lens L13 are bonded to each other into a cemented doublet L23. The cemented doublet L23 has negative power. The lens L14 has positive power. The lens L14 has convex surfaces at the enlargement and reduction sides.

The seventh lens group G7 is formed of a single lens L15. The lens L15 has positive power. The lens L15 has convex surfaces at the enlargement and reduction sides.

In the projection system 3B, the reduction side of the lens L15 of the seventh lens group G7 forms a telecentric system.

The projection system 3B is a zoom lens having an angle of view that changes between the angle at the wide angle end and the angle at the telephoto end. To change the magnification of the projection system 3B, the first lens group G1 and the seventh lens group G7 are fixed, and the second lens group G2, the third lens group G3, the fourth lens group G4, the fifth lens group G5, and the sixth lens group G6 are moved along the optical axis N. When the magnification is changed from the value at the wide angle end to the value at the telephoto end, the second lens group G2, the third lens group G3, the fourth lens group G4, the fifth lens group G5, and the sixth lens group G6 are each moved along the optical axis N from the reduction side toward the enlargement side. In the present example, the zooming ratio is about 2.08.

Data on the projection system 3B are listed in the table below, in which FNo represents the f number of the projection system 3B, ω represents the half angle of view, Fw represents the focal length of the overall projection system operating at the wide angle end, Ft represents the focal length of the overall projection system operating at the telephoto end, LL represents the overall length of the projection system (distance from object-side surface of lens L1 to reduction-side surface of lens L15), IH represents the largest image height at the liquid crystal panel 18, M represents the projection magnification, Fg1 represents the focal length of the first lens group G1, Fg2 represents the focal length of the second lens group G2, and Fg3 represents the focal length of the third lens group G3.

| | |
|---|---|
| FNo (between wide angle end and telephoto end) | 2.01 to 3.05 |
| ω (between telephoto end and wide angle end) | 19.80° to 37.19° |
| Fw | 22.48 mm |
| Ft | 46.74 mm |
| LL | 156.00 mm |
| IH | 16.85 mm |
| M | 107.90 |
| Fg1 | −32.08 mm |
| Fg2 | 51.88 mm |
| Fg3 | 83.40 mm |

Data on the lenses of the projection system 3B are listed below. The surfaces of the lenses are numbered sequentially from the enlargement side toward the reduction side. Reference characters are given to the screen, the lenses, the dichroic prism, and the liquid crystal panels. An aspheric surface has a surface number followed by *. R represents the radius of curvature. D represents the axial inter-surface spacing. Nd represents the refractive index at the d line. vd represents the Abbe number at the d line. R and D are expressed in millimeters.

| Reference character | Surface number | R | D | Nd | vd |
|---|---|---|---|---|---|
| S | 1 | 1.00E+18 | 2390.000 | | |
| L1 | 2* | −76.134 | 2.713 | 1.5350 | 55.71 |
| | 3* | −99.168 | 1.200 | | |
| L2 | 4 | 99.540 | 2.500 | 1.4875 | 70.24 |
| | 5 | 26.753 | 15.676 | | |
| L3 | 6 | −85.935 | 2.124 | 1.4875 | 70.24 |
| | 7 | 68.773 | Variable spacing 1 | | |
| L4 | 8 | −424.689 | 5.174 | 1.7552 | 27.51 |
| | 9 | −111.974 | 3.302 | | |
| L5 | 10 | 54.303 | 9.625 | 1.7620 | 40.10 |
| L6 | 11 | −56.127 | 1.200 | 1.7283 | 28.46 |
| | 12 | 2901.403 | Variable spacing 2 | | |
| L7 | 13 | 41.646 | 4.508 | 1.4388 | 94.66 |
| | 14 | −296.890 | Variable spacing 3 | | |
| L8 | 15 | −182.757 | 1.200 | 1.6200 | 36.26 |
| | 16 | 34.852 | Variable spacing 4 | | |
| L9 | 17* | −26.342 | 1.400 | 1.5831 | 59.39 |
| | 18* | −80.000 | 0.967 | | |
| L10 | 19 | 107.415 | 1.200 | 1.7552 | 27.51 |
| L11 | 20 | 51.383 | 5.782 | 1.4970 | 81.55 |
| | 21 | −27.871 | Variable spacing 5 | | |

-continued

| Reference character | Surface number | R | D | Nd | vd |
|---|---|---|---|---|---|
| L12 | 22 | −36.967 | 1.258 | 1.7174 | 29.52 |
| L13 | 23 | 51.707 | 7.033 | 1.4970 | 81.55 |
| | 24 | −51.470 | 0.500 | | |
| L14 | 25 | 161.815 | 7.601 | 1.7552 | 27.51 |
| | 26 | −49.074 | Variable spacing 6 | | |
| L15 | 27 | 869.776 | 9.033 | 1.4970 | 81.55 |
| | 28 | −71.607 | 5.100 | | |
| 19 | 29 | 1.00E+18 | 35.540 | 1.5168 | 64.20 |
| | 30 | 1.00E+18 | 10.360 | | |
| 18 | 31 | 1.00E+18 | 0.000 | | |

The table below shows the variable spacings 1, 2, 3, 4, 5, and 6 required for the changes in magnification.

| | Wide angle end | Intermediate position | Telephoto end |
|---|---|---|---|
| Variable spacing 1 | 35.082 | 12.297 | 4.731 |
| Variable spacing 2 | 23.209 | 14.715 | 1.000 |
| Variable spacing 3 | 2.147 | 16.515 | 27.008 |
| Variable spacing 4 | 10.190 | 7.956 | 7.027 |
| Variable spacing 5 | 0.574 | 7.665 | 11.375 |
| Variable spacing 6 | 0.800 | 12.692 | 20.651 |

The aspheric coefficients are listed below.

| Surface number | 2 | 3 | 17 | 18 |
|---|---|---|---|---|
| R | −76.134 | −99.168 | −26.342 | −80.000 |
| Conic constant (K) | −13.991 | −18.524 | −0.870 | −100.000 |
| Fourth-order coefficient | 2.408311E−05 | 2.403003E−05 | −1.732947E−06 | −9.540910E−06 |
| Sixth-order coefficient | −3.401476E−08 | −3.170813E−08 | −1.070480E−07 | 1.179860E−07 |
| Eighth-order coefficient | 3.990211E−11 | 3.111077E−11 | 8.301420E−10 | −9.037150E−10 |
| Tenth-order coefficient | −2.973326E−14 | −2.211033E−14 | −8.001208E−12 | 2.616890E−12 |
| Twelfth-order coefficient | 1.127176E−17 | 2.002062E−17 | 5.047189E−14 | 6.995590E−15 |
| Fourteenth-order coefficient | −3.750312E−23 | −2.453815E−20 | −1.367595E−16 | −8.910070E−24 |
| Sixteenth-order coefficient | −3.678011E−25 | 1.596455E−23 | −2.996037E−27 | −3.090550E−27 |
| Eighteenth-order coefficient | −1.974549E−27 | −3.326071E−27 | 0.000000E+00 | −4.748940E−28 |
| Twentieth-order coefficient | 1.036649E−30 | −2.942257E−31 | 0.000000E+00 | −1.808670E−23 |

The projection system 3B according to the present example satisfies Conditional Expressions (1) to (8), as the projection system 3A according to Example 1 does.

In the present example,

| Fw | 22.48 mm |
|---|---|
| Fg2 | 51.88 mm | are provided. Fg2/Fw=2.31 is therefore achieved, so that Conditional Expression (1) is satisfied.

In the present example,

| Fg1 | −32.08 mm |
|---|---|
| Fg2 | 51.88 mm | are provided. Fg2/Fg1=−1.62 is therefore achieved, so that Conditional Expression (2) is satisfied.

In the present example,

| Fg2 | 51.88 mm |
|---|---|
| Fg3 | 83.40 mm | are provided. Fg2/Fg3=0.62 is therefore achieved, so that Conditional Expression (3) is satisfied.

In the present example,

| Fw | 22.48 mm |
|---|---|
| Ft | 46.74 mm | are provided. Ft/Fw=2.08 is therefore achieved, so that Conditional Expression (4) is satisfied.

In the present example,

| LL | 156.00 mm |
|---|---|
| Dwg12 | 35.08 mm | are provided. Dwg12/LL=0.22 is therefore achieved, so that Conditional Expression (5) is satisfied.

In the present example,

| LL | 156.00 mm |
|---|---|
| Dwq34 | 2.15 mm | are provided. Dwg34/LL=0.01 is therefore achieved, so that Conditional Expression (6) is satisfied.

In the present example,

| LL | 156.00 mm |
|----|-----------|
| IH | 16.85 mm | are provided. LL/IH=9.26 is therefore achieved, so that Conditional Expression (7) is satisfied.

In the present example, Nd=1.49 to 1.76 is provided, so that Conditional Expression (8) is satisfied.

Effects and Advantages

The second lens group G2 is formed of the following lenses arranged from the enlargement side toward the reduction side: the lens L4, which is a positive lens; the lens L5, which is a positive lens; and the lens L6, which is a negative lens. The projection system 3B according to the present example can therefore provide the same effects and advantages as those provided by the projection system 3A according to Example 1.

The projection system 3B according to the present example, which satisfies Conditional Expressions (1) to (8), can provide the same effects and advantages as those provided by the projection system 3A according to Example 1.

Figure 8:
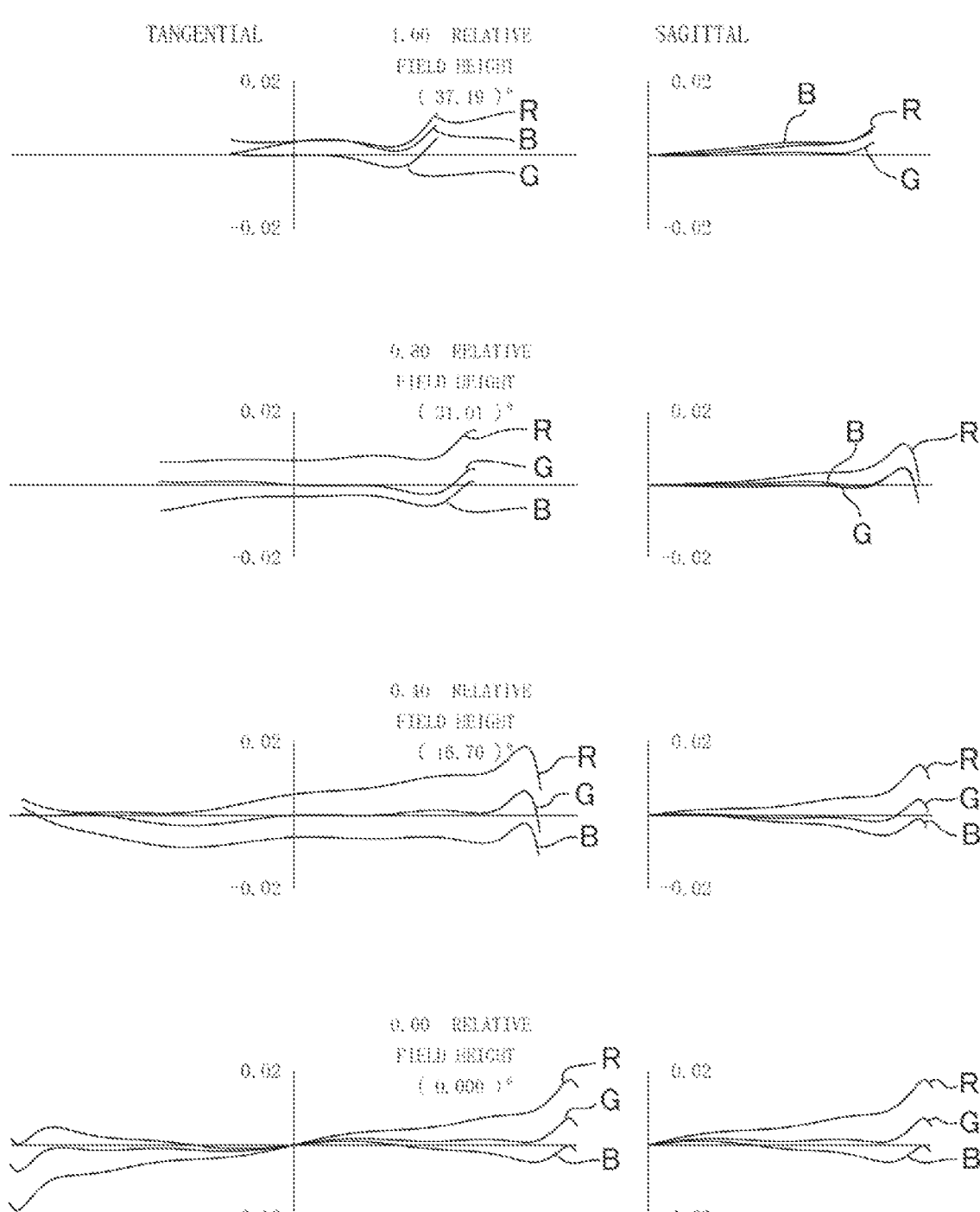
FIG. 8 shows the coma produced by the projection system according to Example 2 operating at the wide angle end.
Figure 9:
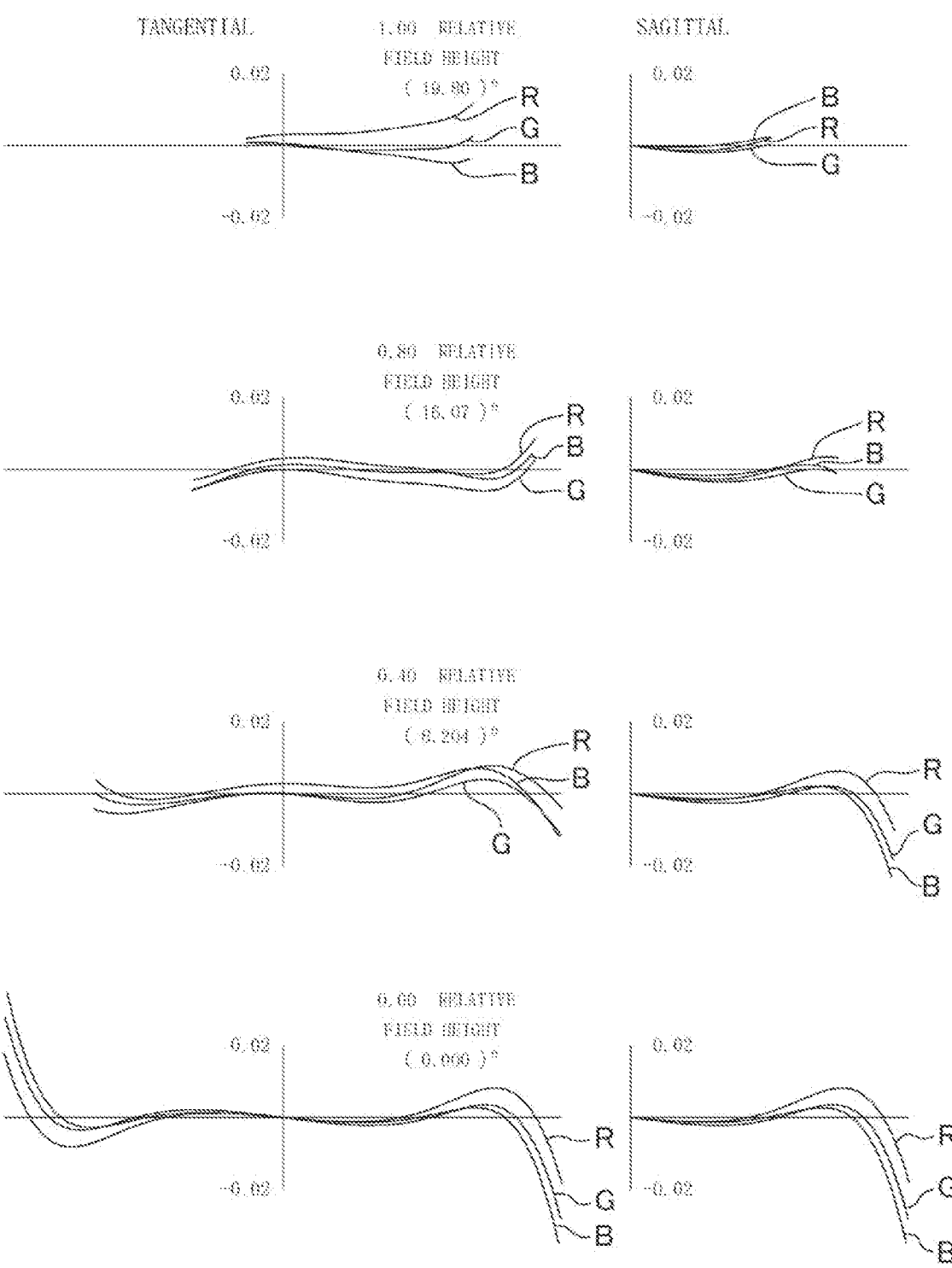
FIG. 9 shows the coma produced by the projection system according to Example 2 operating at the telephoto end.
Figure 10:
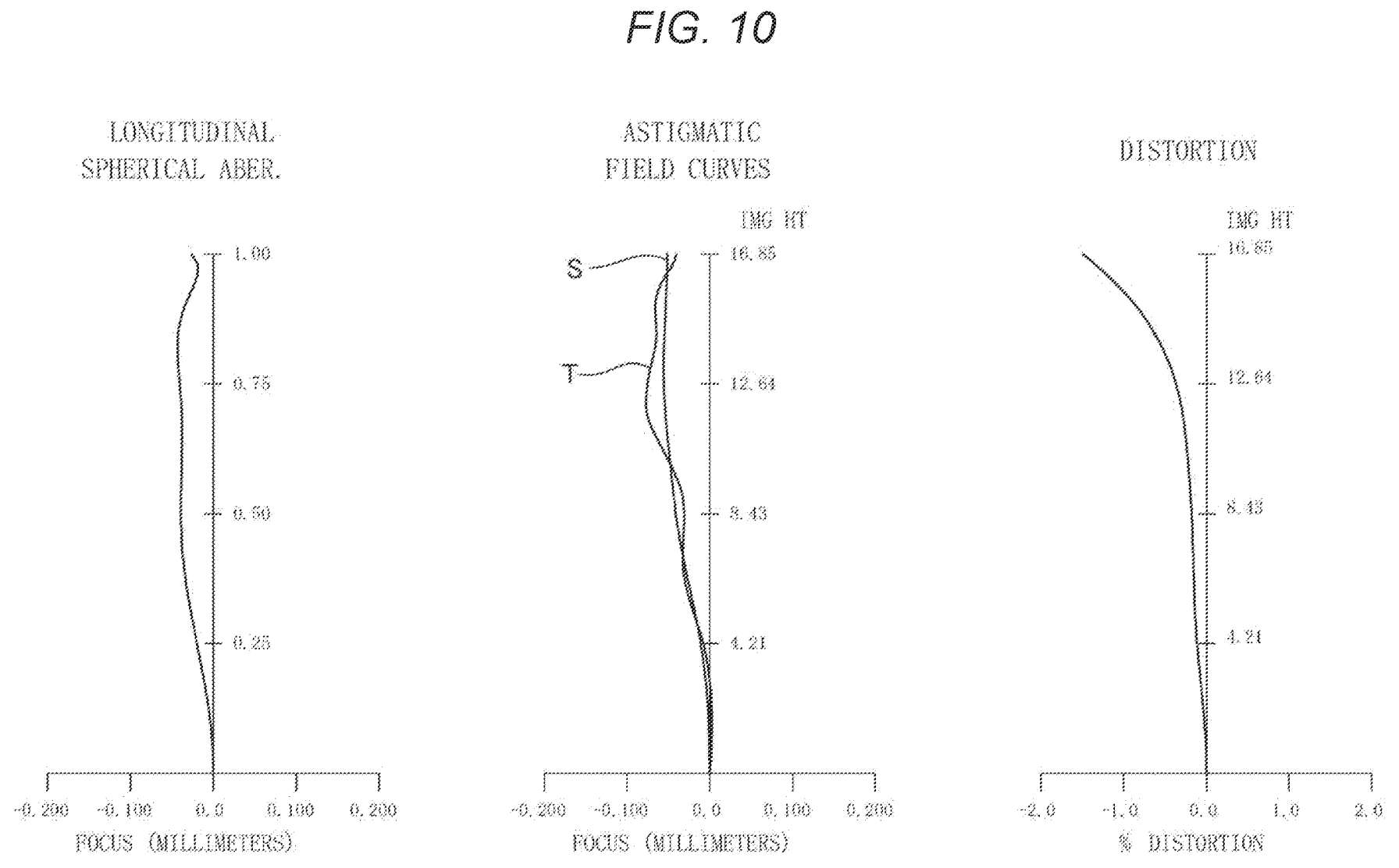
Figure 11:
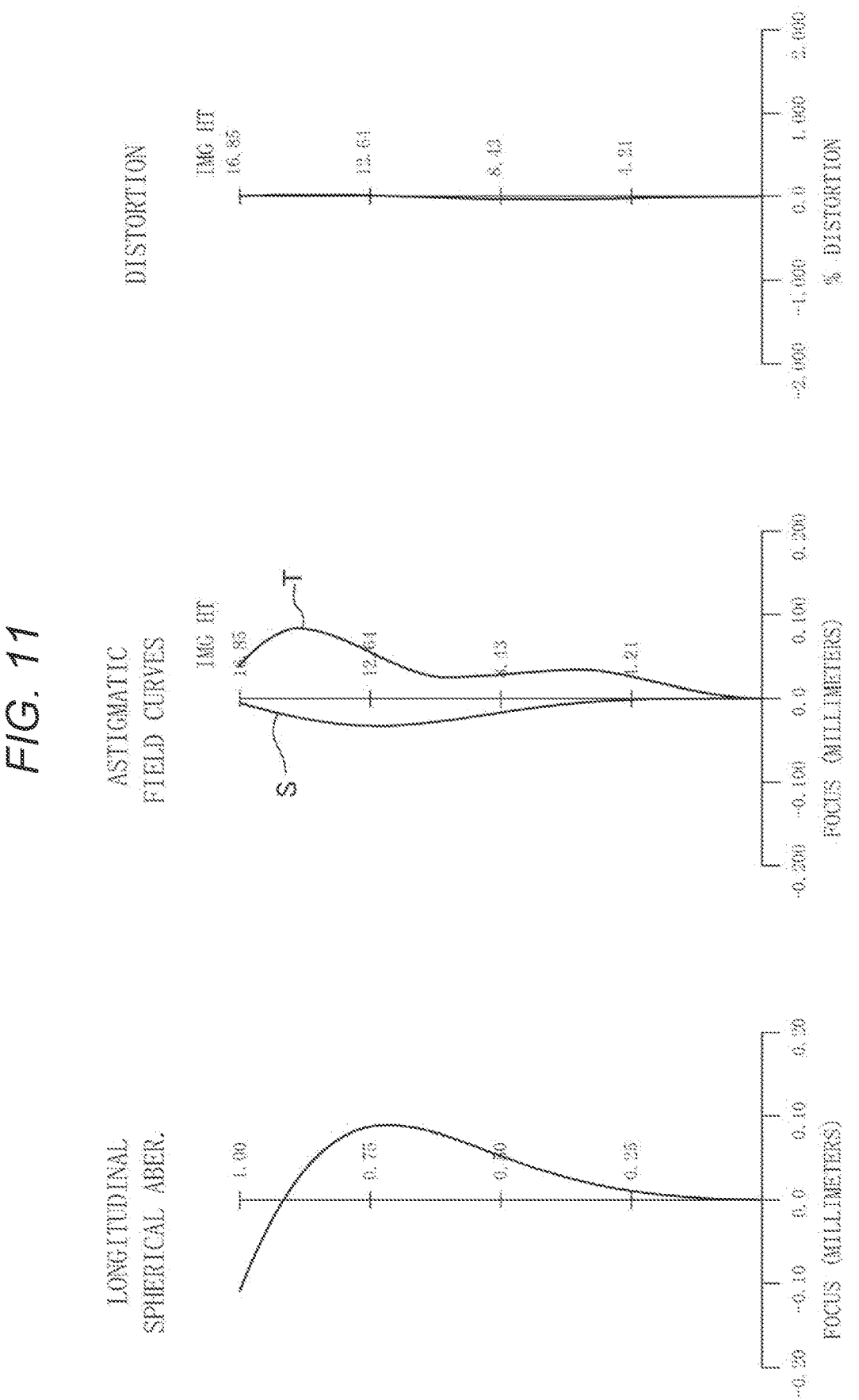
FIG. 11 shows the spherical aberration, astigmatism, and distortion produced by the projection system according to Example 2 operating at the telephoto end.

FIG. 8 shows the coma produced by the projection system 3B operating at the wide angle end. FIG. 9 shows the coma produced by the projection system 3B operating at the telephoto end. FIG. 10 shows the spherical aberration, astigmatism, and distortion produced by the projection system 3B operating at the wide angle end. FIG. 11 shows the spherical aberration, astigmatism, and distortion produced by the projection system 3B operating at the telephoto end. The projection system 3B according to the present example suppresses the variety of aberrations, as shown in FIGS. 8 to 11.

Example 3

Figure 12:
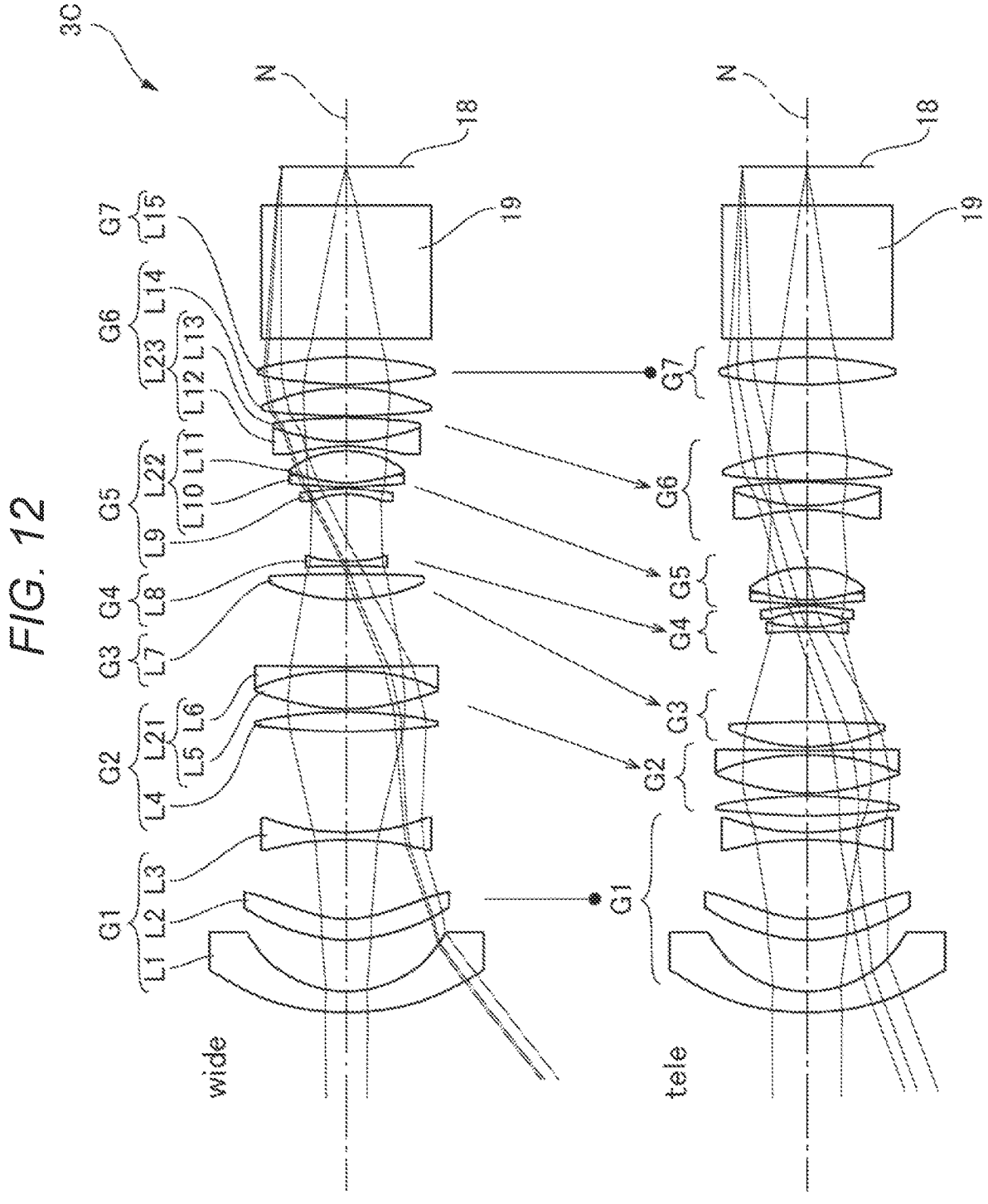
FIG. 12 is a beam diagram showing beams passing through the projection system according to Example 3.

FIG. 12 is a beam diagram showing beams passing through a projection system 3C according to Example 3. The projection system 3C includes a first lens group G1 having negative power, a second lens group G2 having positive power, a third lens group G3 having positive power, a fourth lens group G4 having negative power, a fifth lens group G5 having positive power, a sixth lens group G6 having positive power, and a seventh lens group G7 having positive power sequentially arranged from the enlargement side toward the reduction side, as shown in FIG. 12.

The first lens group G1 is formed of three lenses L1 to L3. The lenses L1 to L3 are arranged in this order from the enlargement side toward the reduction side. The lens L1 has negative power. The lens L1 is a meniscus lens. The lens L1 has a convex surface at the enlargement side and a concave surface at the reduction side. The lens L2 is made of resin. The lens L2 has negative power. The lens L2 has a convex surface at the enlargement side and a concave surface at the reduction side. The lens L2 has aspheric surfaces at the enlargement and reduction sides. The lens L3 has negative power. The lens L3 has concave surfaces at the enlargement and reduction sides.

The second lens group G2 is formed of three lenses L4 to L6. The lenses L4 to L6 are arranged in this order from the enlargement side toward the reduction side. The lens L4 has positive power. The lens L4 has convex surfaces at the enlargement and reduction sides. The lens L5 has positive power. The lens L5 has convex surfaces at the enlargement and reduction sides. The lens L6 has negative power. The lens L6 has concave surfaces at the enlargement and reduction sides. The lens L5 and the lens L6 are bonded to each other into a cemented doublet L21. The cemented doublet L21 has positive power.

The third lens group G3 is formed of a single lens L7. The lens L7 has positive power. The lens L7 has convex surfaces at the enlargement and reduction sides. The fourth lens group G4 is formed of a single lens L8. The lens L8 has negative power. The lens L8 has concave surfaces at the enlargement and reduction sides.

The fifth lens group G5 is formed of three lenses L9 to L11. The lenses L9 to L11 are arranged in this order from the enlargement side toward the reduction side. The lens L9 is made of glass. The lens L9 has negative power. The lens L9 is a meniscus lens. The lens L9 has a concave surface at the enlargement side and a convex surface at the reduction side. The lens L9 has an aspheric surface at the enlargement side. The lens L10 has negative power. The lens L10 is a meniscus lens. The lens L10 has a convex surface at the enlargement side and a concave surface at the reduction side. The lens L11 has positive power. The lens L11 has convex surfaces at the enlargement and reduction sides. The lens L10 and the lens L11 are bonded to each other into a cemented doublet L22. The cemented doublet L22 has positive power.

The sixth lens group G6 is formed of three lenses L12 to L14. The lenses L12 to L14 are arranged in this order from the enlargement side toward the reduction side. The lens L12 has negative power. The lens L12 has concave surfaces at the enlargement and reduction sides. The lens L13 has positive power. The lens L13 has convex surfaces at the enlargement and reduction sides. The lens L12 and the lens L13 are bonded to each other into a cemented doublet L23. The cemented doublet L23 has negative power. The lens L14 has positive power. The lens L14 has convex surfaces at the enlargement and reduction sides.

The seventh lens group G7 is formed of a single lens L15. The lens L15 has positive power. The lens L15 has convex surfaces at the enlargement and reduction sides.

In the projection system 3C, the reduction side of the lens L15 of the seventh lens group G7 forms a telecentric system.

The projection system 3C is a zoom lens having an angle of view that changes between the angle at the wide angle end and the angle at the telephoto end. To change the magnification of the projection system 3C, the first lens group G1 and the seventh lens group G7 are fixed, and the second lens group G2, the third lens group G3, the fourth lens group G4, the fifth lens group G5, and the sixth lens group G6 are moved along the optical axis N. When the magnification is changed from the value at the wide angle end to the value at the telephoto end, the second lens group G2, the third lens group G3, the fourth lens group G4, the fifth lens group G5, and the sixth lens group G6 are each moved along the optical axis N from the reduction side toward the enlargement side. In the present example, the zooming ratio is about 2.08.

Data on the projection system 3C are listed in the table below, in which FNo represents the f number of the projection system 3C, ω represents the half angle of view, Fw represents the focal length of the overall projection system operating at the wide angle end, Ft represents the focal length of the overall projection system operating at the telephoto end, LL represents the overall length of the projection system (distance from object-side surface of lens L1 to reduction-side surface of lens L15), IH represents the largest image height at the liquid crystal panel 18, M represents the projection magnification, Fg1 represents the focal length of the first lens group G1, Fg2 represents the focal length of the second lens group G2, and Fg3 represents the focal length of the third

| FNo (between wide angle end and telephoto end) | 2.01 to 2.55 |
| ω (between telephoto end and wide angle end) | 19.82° to 37.25° |
| Fw | 22.48 mm |
| Ft | 46.74 mm |
| LL | 175.78 mm |
| IH | 16.85 mm |
| M | 108.44 |
| Fg1 | −25.49 mm |
| Fg2 | 40.48 mm |
| Fg3 | 80.96 mm |

Data on the lenses of the projection system 3C are listed below. The surfaces of the lenses are numbered sequentially from the enlargement side toward the reduction side. Reference characters are given to the screen, the lenses, the dichroic prism, and the liquid crystal panels. An aspheric surface has a surface number followed by *. R represents the radius of curvature. D represents the axial inter-surface spacing. Nd represents the refractive index at the d line. vd represents the Abbe number at the d line. R and D are expressed in millimeters.

| Reference character | Surface number | R | D | Nd | vd |
|---|---|---|---|---|---|
| S | 1 | 1.00E+18 | 2390.000 | | |
| L1 | 2 | 61.375 | 5.500 | 1.7373 | 30.88 |
| | 3 | 28.344 | 14.135 | | |
| L2 | 4* | 33.256 | 5.500 | 1.5350 | 55.71 |
| | 5* | 27.343 | 21.056 | | |
| L3 | 6 | −78.448 | 2.000 | 1.4970 | 81.55 |
| | 7 | 57.525 | Variable spacing 1 | | |
| L4 | 8 | 177.383 | 5.425 | 1.7950 | 32.34 |
| | 9 | −106.272 | 0.800 | | |
| L5 | 10 | 59.425 | 10.098 | 1.7950 | 36.98 |
| L6 | 11 | −61.544 | 1.200 | 1.7824 | 23.45 |
| | 12 | 1251.863 | Variable spacing 2 | | |

| Reference character | Surface number | R | D | Nd | vd |
|---|---|---|---|---|---|
| L7 | 13 | 45.449 | 6.698 | 1.4970 | 81.55 |
| | 14 | −341.496 | Variable spacing 3 | | |
| L8 | 15 | −115.030 | 1.200 | 1.7950 | 36.55 |
| | 16 | 33.979 | Variable spacing 4 | | |
| L9 | 17* | −23.850 | 1.400 | 1.5831 | 59.39 |
| | 18 | −57.598 | 0.532 | | |
| L10 | 19 | 120.632 | 1.200 | 1.7680 | 34.15 |
| L11 | 20 | 43.186 | 8.724 | 1.4970 | 81.55 |
| | 21 | −22.039 | Variable spacing 5 | | |
| L12 | 22 | −45.430 | 1.200 | 1.7950 | 23.00 |
| L13 | 23 | 49.551 | 6.373 | 1.4970 | 81.55 |
| | 24 | −131.779 | 0.500 | | |
| L14 | 25 | 157.946 | 7.708 | 1.7950 | 23.25 |
| | 26 | −49.810 | Variable spacing 6 | | |
| L15 | 27 | 101.434 | 7.352 | 1.4970 | 81.55 |
| | 28 | −79.439 | 5.100 | | |
| 19 | 29 | 1.00E+18 | 35.540 | 1.5168 | 64.20 |
| | 30 | 1.00E+18 | 10.360 | | |
| 18 | 31 | 1.00E+18 | 0.000 | | |

The table below shows the variable spacings 1, 2, 3, 4, 5, and 6 required for the changes in magnification.

| | Wide angle end | Intermediate position | Telephoto end |
|---|---|---|---|
| Variable spacing 1 | 27.104 | 10.928 | 4.277 |
| Variable spacing 2 | 18.022 | 13.897 | 1.000 |
| Variable spacing 3 | 2.232 | 13.928 | 24.379 |
| Variable spacing 4 | 18.021 | 5.273 | 4.057 |
| Variable spacing 5 | 1.000 | 13.462 | 15.000 |
| Variable spacing 6 | 0.800 | 9.609 | 18.347 |

The aspheric coefficients are listed below.

| Surface number | 4 | 5 | 17 |
|---|---|---|---|
| R | 33.256 | 27.343 | −23.850 |
| Conic constant (K) | −2.480 | −0.679 | 1.960 |
| Fourth-order coefficient | −1.921889E−06 | −1.496663E−05 | −1.179549E−07 |
| Sixth-order coefficient | 2.749450E−09 | 3.457696E−09 | 4.435432E−08 |
| Eighth-order coefficient | −1.137669E−11 | −8.074308E−12 | −1.173702E−10 |
| Tenth-order coefficient | 2.742414E−14 | 1.562949E−14 | −1.551758E−12 |
| Twelfth-order coefficient | −7.865071E−18 | −9.657205E−18 | 4.665869E−14 |
| Fourteenth-order coefficient | −3.322011E−20 | 2.167155E−20 | −1.367594E−16 |
| Sixteenth-order coefficient | 1.290167E−23 | −7.022882E−23 | 3.154836E−27 |
| Eighteenth-order coefficient | 5.703587E−26 | 5.069303E−26 | 0.000000E+00 |
| Twentieth-order coefficient | −5.236582E−29 | −5.523376E−30 | 0.000000E+00 |

The projection system 3C according to the present example satisfies Conditional Expressions (1) to (8), as the projection system 3A according to Example 1 does.

In the present example,

| | |
|---|---|
| Fw | 22.48 mm |
| Fg2 | 40.48 mm | are provided. Fg2/Fw=1.80 is therefore achieved, so that Conditional Expression (1) is satisfied.

In the present example,

| | |
|---|---|
| Fg1 | −25.49 mm |
| Fg2 | 40.48 mm | are provided. Fg2/Fg1=−1.59 is therefore achieved, so that Conditional Expression (2) is satisfied.

In the present example,

| | |
|---|---|
| Fg2 | 40.48 mm |
| Fg3 | 80.96 mm | are provided. Fg2/Fg3=0.50 is therefore achieved, so that Conditional Expression (3) is satisfied.

In the present example,

| | |
|---|---|
| Fw | 22.48 mm |
| Ft | 46.74 mm | are provided. Ft/Fw=2.08 is therefore achieved, so that Conditional Expression (4) is satisfied.

In the present example,

| | |
|---|---|
| LL | 175.78 mm |
| Dwg12 | 27.10 mm | are provided. Dwg12/LL=0.15 is therefore achieved, so that Conditional Expression (5) is satisfied.

In the present example,

| | |
|---|---|
| LL | 175.78 mm |
| Dwg34 | 2.23 mm | are provided. Dwg34/LL=0.01 is therefore achieved, so that Conditional Expression (6) is satisfied.

In the present example,

| | |
|---|---|
| LL | 175.78 mm |
| IH | 16.85 mm | are provided. LL/IH=10.43 is therefore achieved, so that Conditional Expression (7) is satisfied.

In the present example, Nd=1.50 to 1.80 is provided, so that Conditional Expression (8) is satisfied.

Effects and Advantages

The second lens group G2 is formed of the following lenses arranged from the enlargement side toward the reduction side: the lens L4, which is a positive lens; the lens L5, which is a positive lens; and the lens L6, which is a negative lens. The projection system 3C according to the present example can therefore provide the same effects and advantages as those provided by the projection system 3A according to Example 1.

The projection system 3C according to the present example, which satisfies Conditional Expressions (1) to (8), can provide the same effects and advantages as those provided by the projection system 3A according to Example 1.

Figure 13:
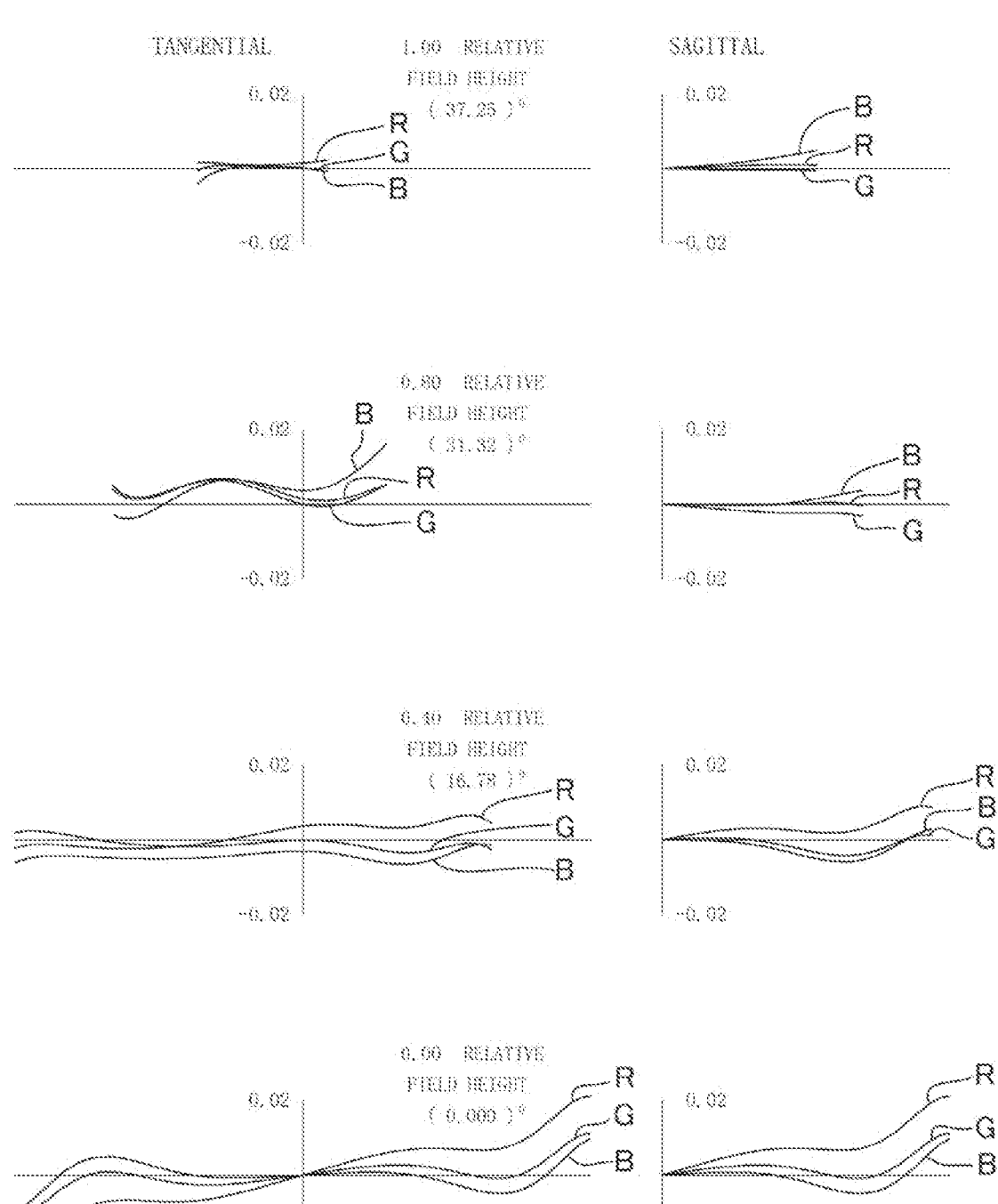
FIG. 13 shows the coma produced by the projection system according to Example 3 operating at the wide angle end.
Figure 14:
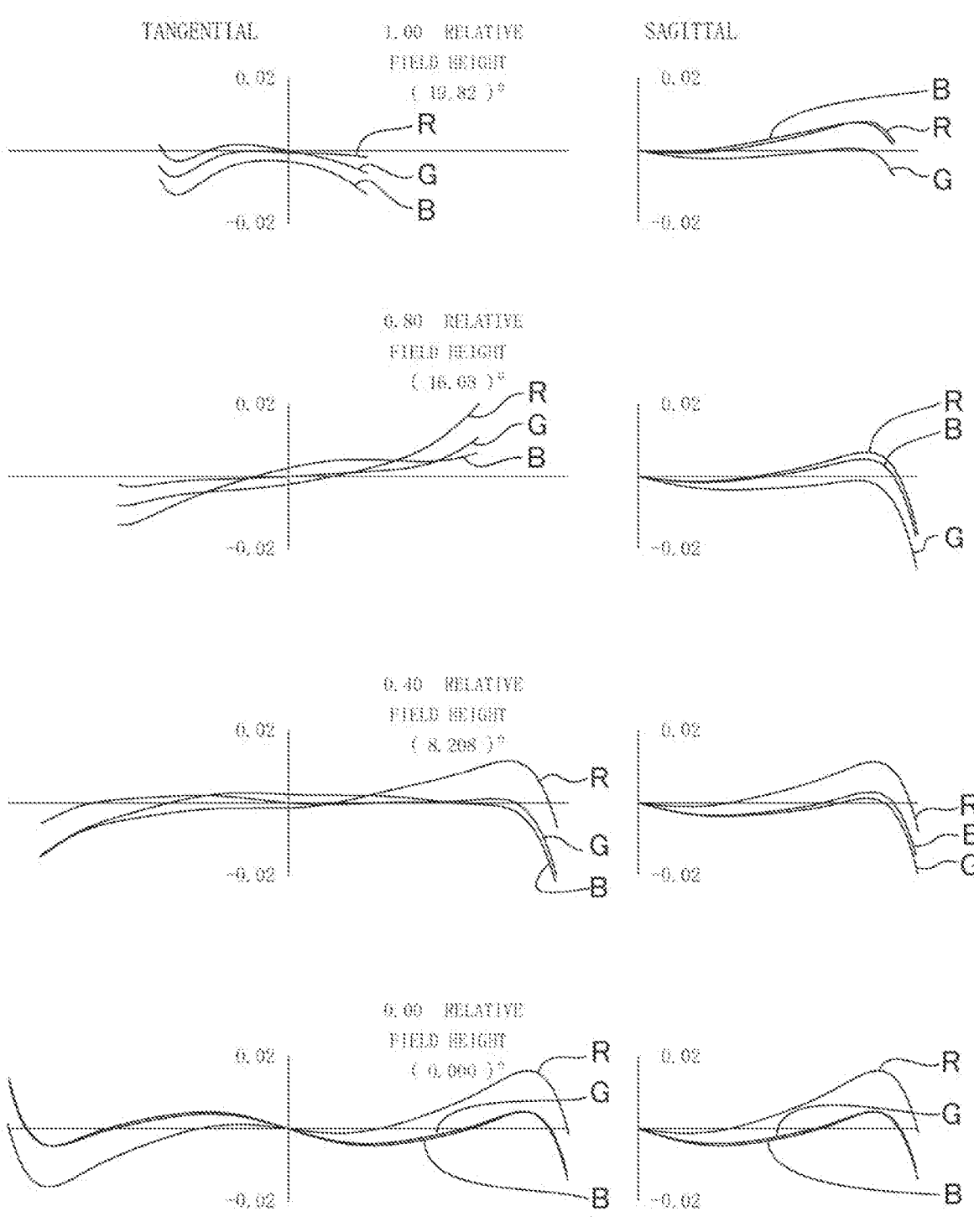
FIG. 14 shows the coma produced by the projection system according to Example 3 operating at the telephoto end.
Figure 15:
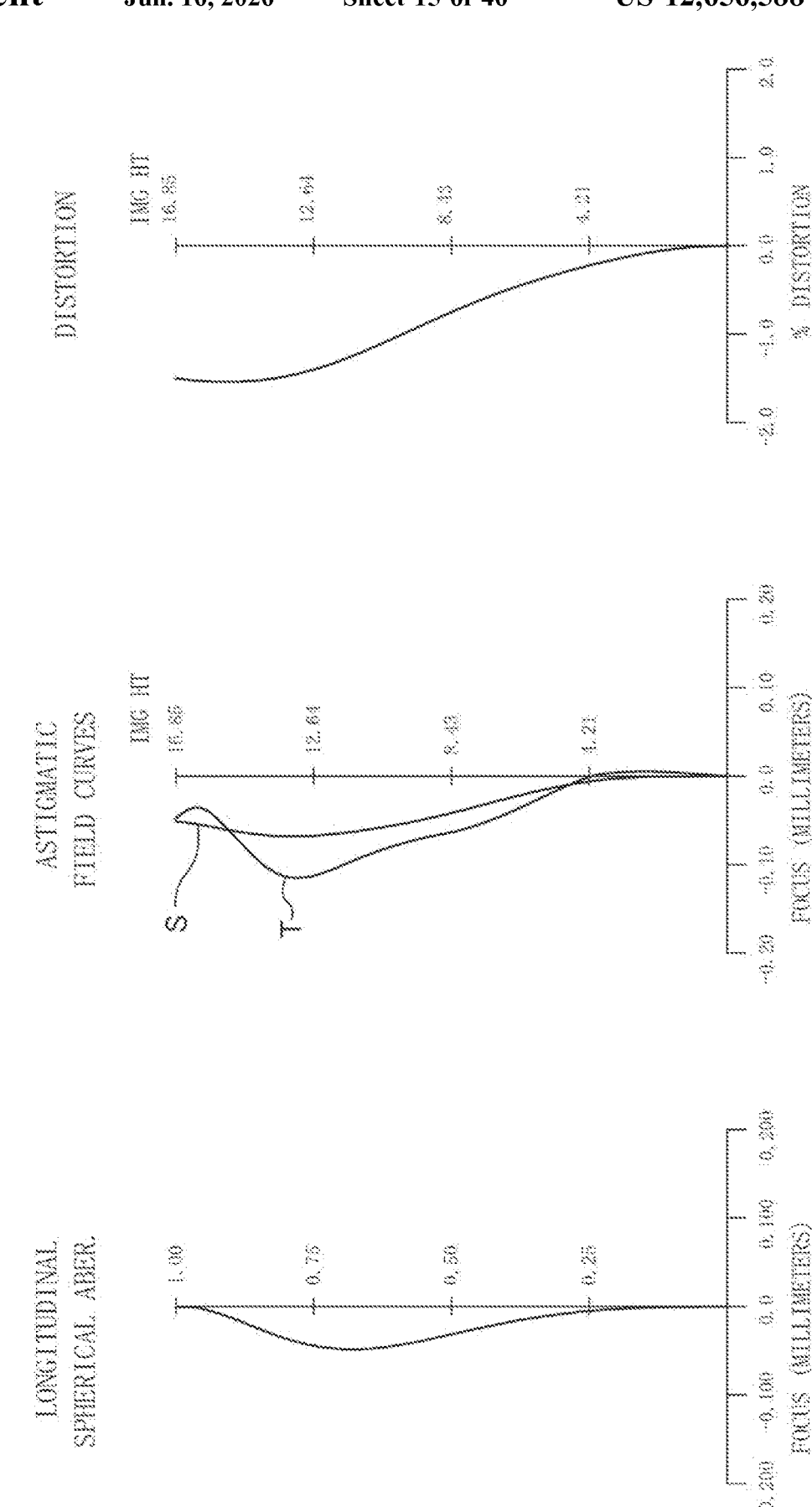
FIG. 15 shows the spherical aberration, astigmatism, and distortion produced by the projection system according to Example 3 operating at the wide angle end.
Figure 16:
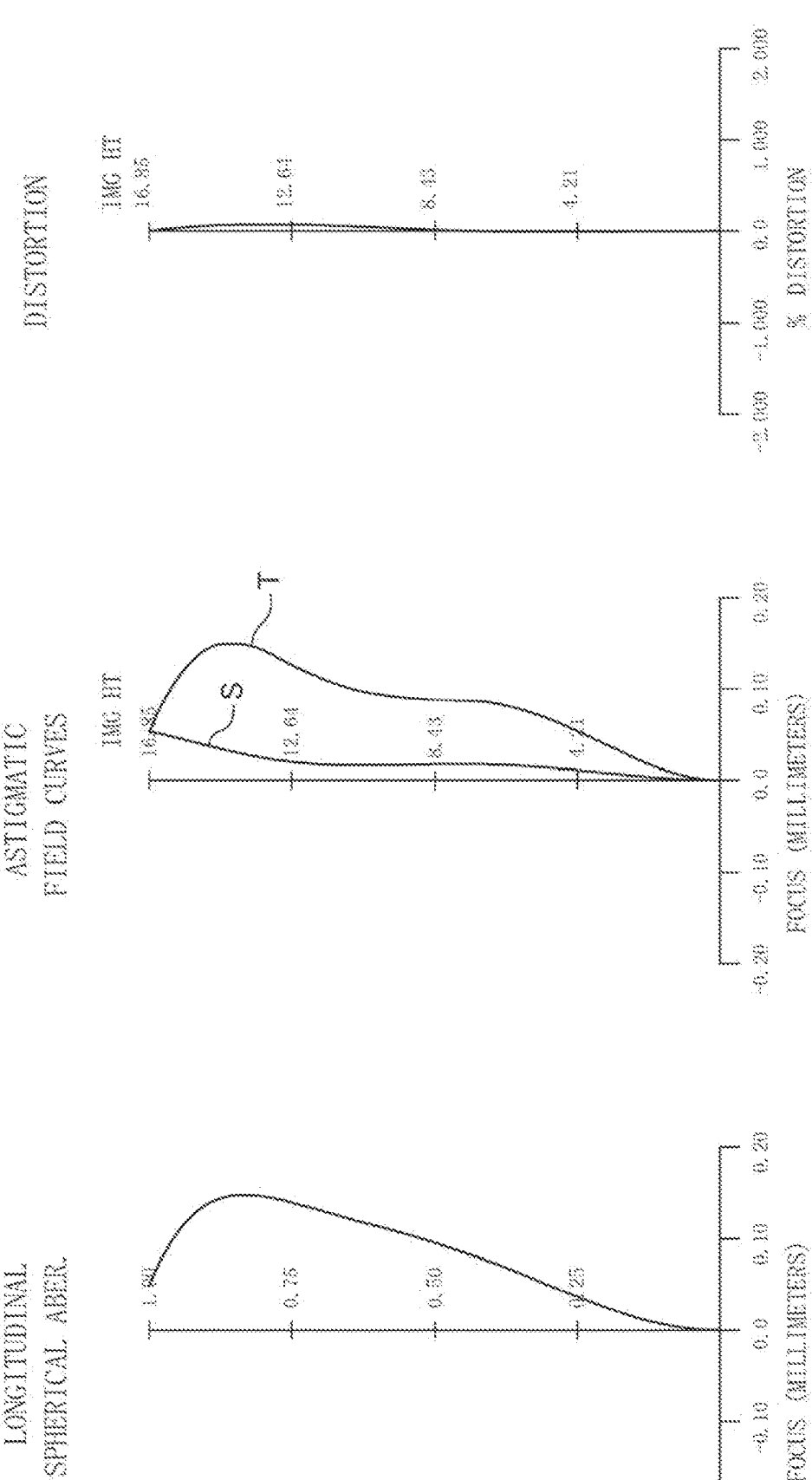
FIG. 16 shows the spherical aberration, astigmatism, and distortion produced by the projection system according to Example 3 operating at the telephoto end.

FIG. 13 shows the coma produced by the projection system 3C operating at the wide angle end. FIG. 14 shows the coma produced by the projection system 3C operating at the telephoto end. FIG. 15 shows the spherical aberration, astigmatism, and distortion produced by the projection system 3C operating at the wide angle end. FIG. 16 shows the spherical aberration, astigmatism, and distortion produced by the projection system 3C operating at the telephoto end. The projection system 3C according to the present example suppresses the variety of aberrations, as shown in FIGS. 14 to 16.

Example 4

Figure 17:
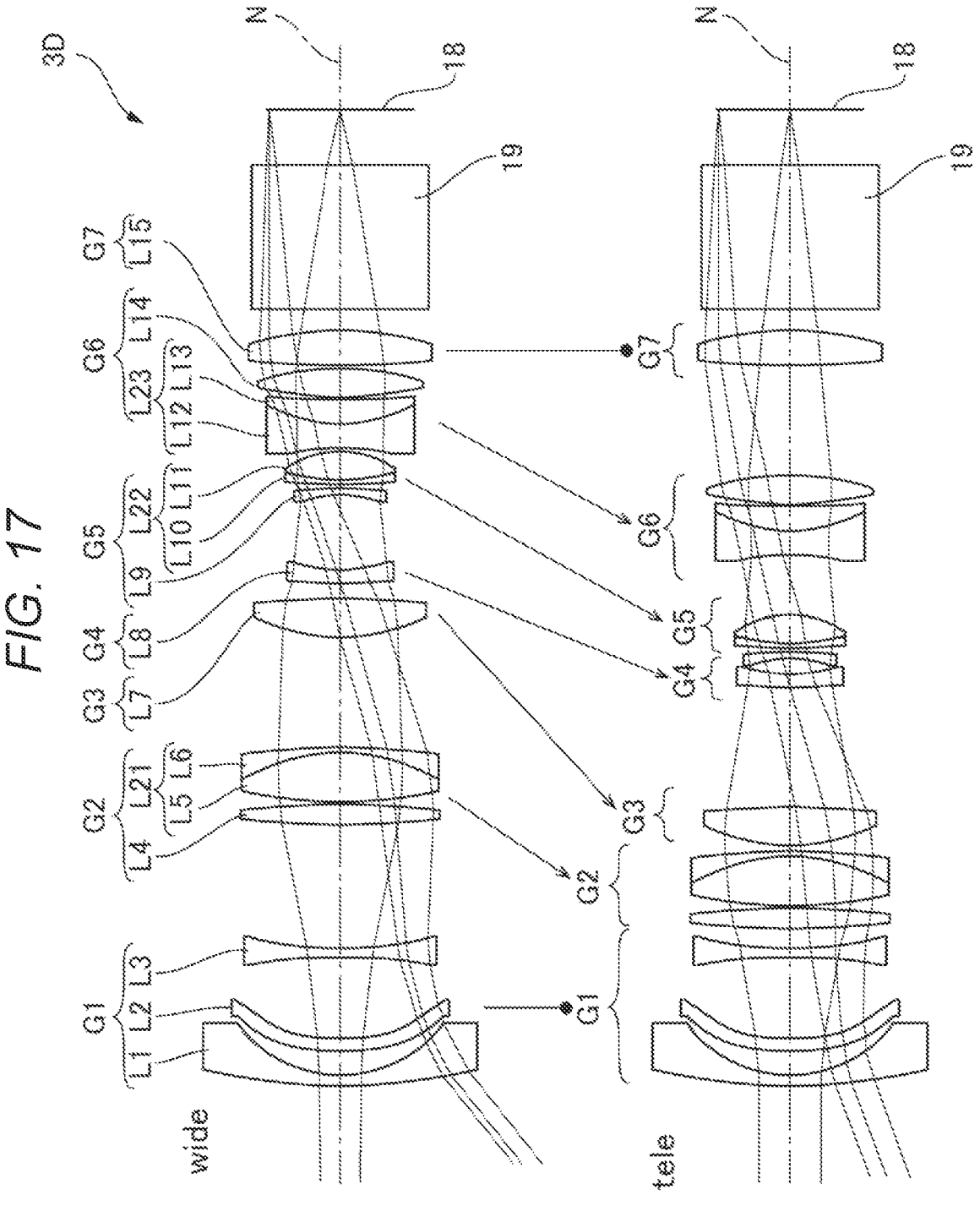
FIG. 17 is a beam diagram showing beams passing through the projection system according to Example 4.

FIG. 17 is a beam diagram showing beams passing through a projection system 3D according to Example 4. The projection system 3D includes a first lens group G1 having negative power, a second lens group G2 having positive power, a third lens group G3 having positive power, a fourth lens group G4 having negative power, a fifth lens group G5 having positive power, a sixth lens group G6 having positive power, and a seventh lens group G7 having positive power sequentially arranged from the enlargement side toward the reduction side, as shown in FIG. 17.

The first lens group G1 is formed of three lenses L1 to L3. The lenses L1 to L3 are arranged in this order from the enlargement side toward the reduction side. The lens L1 has negative power. The lens L1 is a meniscus lens. The lens L1 has a convex surface at the enlargement side and a concave surface at the reduction side. The lens L2 is made of resin. The lens L2 has negative power. The lens L2 has a convex surface at the enlargement side and a concave surface at the reduction side. The lens L2 has aspheric surfaces at the enlargement and reduction sides. The lens L3 has negative power. The lens L3 has concave surfaces at the enlargement and reduction sides.

The second lens group G2 is formed of three lenses L4 to L6. The lenses L4 to L6 are arranged in this order from the enlargement side toward the reduction side. The lens L4 has positive power. The lens L4 has convex surfaces at the enlargement and reduction sides. The lens L5 has positive power. The lens L5 has convex surfaces at the enlargement and reduction sides. The lens L6 has negative power. The lens L6 is a meniscus lens. The lens L6 has a concave surface at the enlargement side and a convex surface at the reduction side. The lens L5 and the lens L6 are bonded to each other into a cemented doublet L21. The cemented doublet L21 has positive power.

The third lens group G3 is formed of a single lens L7. The lens L7 has positive power. The lens L7 has convex surfaces at the enlargement and reduction sides. The fourth lens group G4 is formed of a single lens L8. The lens L8 has negative power. The lens L8 is a meniscus lens. The lens L8 has a convex surface at the enlargement side and a concave surface at the reduction side.

The fifth lens group G5 is formed of three lenses L9 to L11. The lenses L9 to L11 are arranged in this order from the enlargement side toward the reduction side. The lens L9 is made of glass. The lens L9 has negative power. The lens L9 is a meniscus lens. The lens L9 has a concave surface at the enlargement side and a convex surface at the reduction side. The lens L9 has an aspheric surface at the enlargement side. The lens L10 has negative power. The lens L10 is a meniscus lens. The lens L10 has a convex surface at the enlargement L11 has positive power. The lens L11 has convex surfaces at the enlargement and reduction sides. The lens L10 and the lens L11 are bonded to each other into a cemented doublet L22. The cemented doublet L22 has positive power.

The sixth lens group G6 is formed of three lenses L12 to L14. The lenses L12 to L14 are arranged in this order from the enlargement side toward the reduction side. The lens L12 has negative power. The lens L12 has concave surfaces at the enlargement and reduction sides. The lens L13 has positive power. The lens L13 has convex surfaces at the enlargement and reduction sides. The lens L12 and the lens L13 are bonded to each other into a cemented doublet L23. The cemented doublet L23 has negative power. The lens L14 has positive power. The lens L14 has convex surfaces at the enlargement and reduction sides.

The seventh lens group G7 is formed of a single lens L15. The lens L15 has positive power. The lens L15 has convex surfaces at the enlargement and reduction sides.

In the projection system 3D, the reduction side of the lens L15 of the seventh lens group G7 forms a telecentric system.

The projection system 3D is a zoom lens having an angle of view that changes between the angle at the wide angle end and the angle at the telephoto end. To change the magnification of the projection system 3D, the first lens group G1 and the seventh lens group G7 are fixed, and the second lens group G2, the third lens group G3, the fourth lens group G4, the fifth lens group G5, and the sixth lens group G6 are moved along the optical axis N. When the magnification is changed from the value at the wide angle end to the value at the telephoto end, the second lens group G2, the third lens group G3, the fourth lens group G4, the fifth lens group G5, and the sixth lens group G6 are each moved along the optical axis N from the reduction side toward the enlargement side. In the present example, the zooming ratio is about 2.08.

Data on the projection system 3D are listed in the table below, in which FNo represents the f number of the projection system 3D, ω represents the half angle of view, Fw represents the focal length of the overall projection system operating at the wide angle end, Ft represents the focal length of the overall projection system operating at the telephoto end, LL represents the overall length of the projection system (distance from object-side surface of lens L1 to reduction-side surface of lens L15), IH represents the largest image height at the liquid crystal panel 18, M represents the projection magnification, Fg1 represents the focal length of the first lens group G1, Fg2 represents the focal length of the second lens group G2, and Fg3 represents the focal length of the third

| | |
|---|---|
| FNo (between wide angle end and telephoto end) | 2.27 to 3.16 |
| ω (between telephoto end and wide angle end) | 19.86° to 37.24° |
| Fw | 22.48 mm |
| Ft | 46.74 mm |
| LL | 185.35 mm |
| IH | 16.85 mm |
| M | 107.83 |
| Fg1 | −26.50 mm |
| Fg2 | 66.21 mm |
| Fg3 | 72.39 mm |

Data on the lenses of the projection system 3D are listed below. The surfaces of the lenses are numbered sequentially from the enlargement side toward the reduction side. Reference characters are given to the screen, the lenses, the dichroic prism, and the liquid crystal panels. An aspheric surface has a surface number followed by *. R represents the radius of curvature. D represents the axial inter-surface spacing. Nd represents the refractive index at the d line. vd represents the Abbe number at the d line. R and D are expressed in millimeters.

| Reference character | Surface number | R | D | Nd | vd |
|---|---|---|---|---|---|
| S | 1 | 1.00E+18 | 2390.000 | | |
| L1 | 2 | 129.265 | 2.683 | 1.6471 | 56.09 |
| | 3 | 29.552 | 6.011 | | |
| L2 | 4* | 136.963 | 3.000 | 1.5350 | 55.71 |
| | 5* | 67.444 | 19.895 | | |
| L3 | 6 | −123.457 | 2.000 | 1.4970 | 81.55 |
| | 7 | 77.741 | Variable spacing 1 | | |
| L4 | 8 | 286.209 | 4.742 | 1.5868 | 40.17 |
| | 9 | −208.365 | 0.800 | | |
| L5 | 10 | 109.846 | 11.993 | 1.7342 | 46.77 |
| L6 | 11 | −43.346 | 1.424 | 1.8000 | 39.02 |
| | 12 | −145.597 | Variable spacing 2 | | |
| L7 | 13 | 43.310 | 9.496 | 1.4970 | 81.55 |
| | 14 | −200.104 | Variable spacing 3 | | |
| L8 | 15 | 175.354 | 3.000 | 1.4970 | 81.40 |
| | 16 | 32.849 | Variable spacing 4 | | |
| L9 | 17* | −26.275 | 1.400 | 1.5831 | 59.39 |
| | 18 | −223.455 | 1.072 | | |
| L10 | 19 | 106.600 | 1.200 | 1.7297 | 25.94 |
| L11 | 20 | 46.015 | 6.956 | 1.4970 | 81.55 |
| | 21 | −22.604 | Variable spacing 5 | | |
| L12 | 22 | −50.951 | 5.817 | 1.7333 | 25.76 |
| L13 | 23 | 34.018 | 5.968 | 1.4970 | 81.55 |
| | 24 | 181.976 | 0.500 | | |
| L14 | 25 | 77.580 | 7.130 | 1.7608 | 24.81 |
| | 26 | −59.540 | Variable spacing 6 | | |
| L15 | 27 | 208.297 | 8.581 | 1.4970 | 81.55 |
| | 28 | −68.935 | 5.100 | | |
| 19 | 29 | 1.00E+18 | 35.540 | 1.5168 | 64.20 |
| | 30 | 1.00E+18 | 10.360 | | |
| 18 | 31 | 1.00E+18 | 0.000 | | |

The table below shows the variable spacings 1, 2, 3, 4, 5, and 6 required for the changes in magnification.

| | Wide angle end | Intermediate position | Telephoto end |
|---|---|---|---|
| Variable spacing 1 | 30.603 | 10.777 | 5.237 |
| Variable spacing 2 | 26.886 | 13.453 | 1.000 |
| Variable spacing 3 | 3.929 | 18.704 | 29.287 |
| Variable spacing 4 | 18.465 | 10.277 | 4.152 |
| Variable spacing 5 | 1.000 | 14.681 | 15.000 |
| Variable spacing 6 | 0.800 | 13.688 | 26.869 |

The aspheric coefficients are listed below.

| Surface number | 4 | 5 | 17 |
|---|---|---|---|
| R | 136.963 | 67.444 | −26.275 |
| Conic constant (K) | −97.566 | −22.066 | −5.817 |
| Fourth-order coefficient | 3.768580E−05 | 3.985965E−05 | −5.523879E−05 |
| Sixth-order coefficient | −6.581672E−08 | −7.538673E−08 | 7.121823E−08 |
| Eighth-order coefficient | 9.589515E−11 | 1.173785E−10 | −1.049723E−10 |
| Tenth-order coefficient | −3.498563E−14 | −1.063416E−13 | −5.240867E−12 |
| Twelfth-order coefficient | −5.631346E−17 | 2.897087E−17 | 4.665867E−14 |
| Fourteenth-order coefficient | 8.656675E−21 | 1.509401E−19 | −1.367595E−16 |
| Sixteenth-order coefficient | 9.413949E−23 | −1.245630E−22 | 9.904100E−29 |
| Eighteenth-order coefficient | 7.531863E−26 | −5.816333E−25 | 0.000000E+00 |
| Twentieth-order coefficient | −2.617119E−28 | 5.823841E−28 | 0.000000E+00 |

The projection system 3D according to the present example satisfies Conditional Expressions (1) to (8), as the projection system 3A according to Example 1 does.

In the present example,

| Fw | 22.48 mm |
|---|---|
| Fg2 | 66.21 mm | are provided. Fg2/Fw=2.95 is therefore achieved, so that Conditional Expression (1) is satisfied.

In the present example,

| Fg1 | −26.50 mm |
|---|---|
| Fg2 | 66.21 mm | are provided. Fg2/Fg1=−2.50 is therefore achieved, so that Conditional Expression (2) is satisfied.

In the present example,

| Fg2 | 66.21 mm |
|---|---|
| Fg3 | 72.39 mm | are provided. Fg2/Fg3=0.91 is therefore achieved, so that Conditional Expression (3) is satisfied.

In the present example,

| Fw | 22.48 mm |
|---|---|
| Ft | 46.74 mm | are provided. Ft/Fw=2.08 is therefore achieved, so that Conditional Expression (4) is satisfied.

In the present example,

| LL | 185.35 mm |
|---|---|
| Dwg12 | 30.60 mm | are provided. Dwg12/LL=0.17 is therefore achieved, so that Conditional Expression (5) is satisfied.

In the present example,

| LL | 185.35 mm |
|---|---|
| Dwg34 | 3.93 mm | are provided. Dwg34/LL=0.02 is therefore achieved, so that Conditional Expression (6) is satisfied.

In the present example,

| LL | 185.35 mm |
|---|---|
| IH | 16.85 mm | are provided. LL/IH=11.00 is therefore achieved, so that Conditional Expression (7) is satisfied.

In the present example, Nd=1.50 to 1.80 is provided, so that Conditional Expression (8) is satisfied.

Effects and Advantages

The second lens group G2 is formed of the following lenses arranged from the enlargement side toward the reduction side: the lens L4, which is a positive lens; the lens L5, which is a positive lens; and the lens L6, which is a negative lens. The projection system 3D according to the present example can therefore provide the same effects and advantages as those provided by the projection system 3A according to Example 1.

The projection system 3D according to the present example, which satisfies Conditional Expressions (1) to (8), can provide the same effects and advantages as those provided by the projection system 3A according to Example 1.

Figure 18:
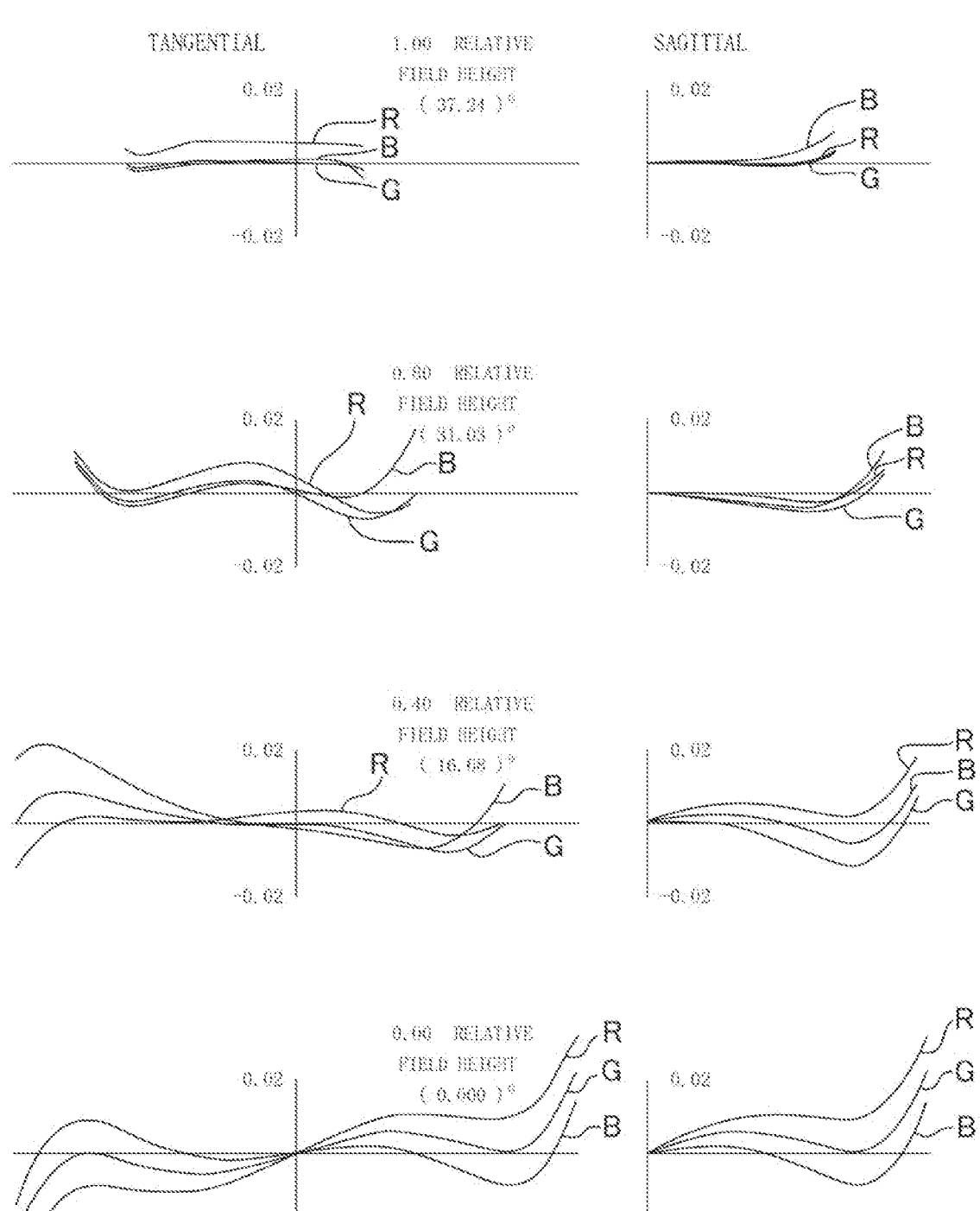
FIG. 18 shows the coma produced by the projection system according to Example 4 operating at the wide angle end.
Figure 19:
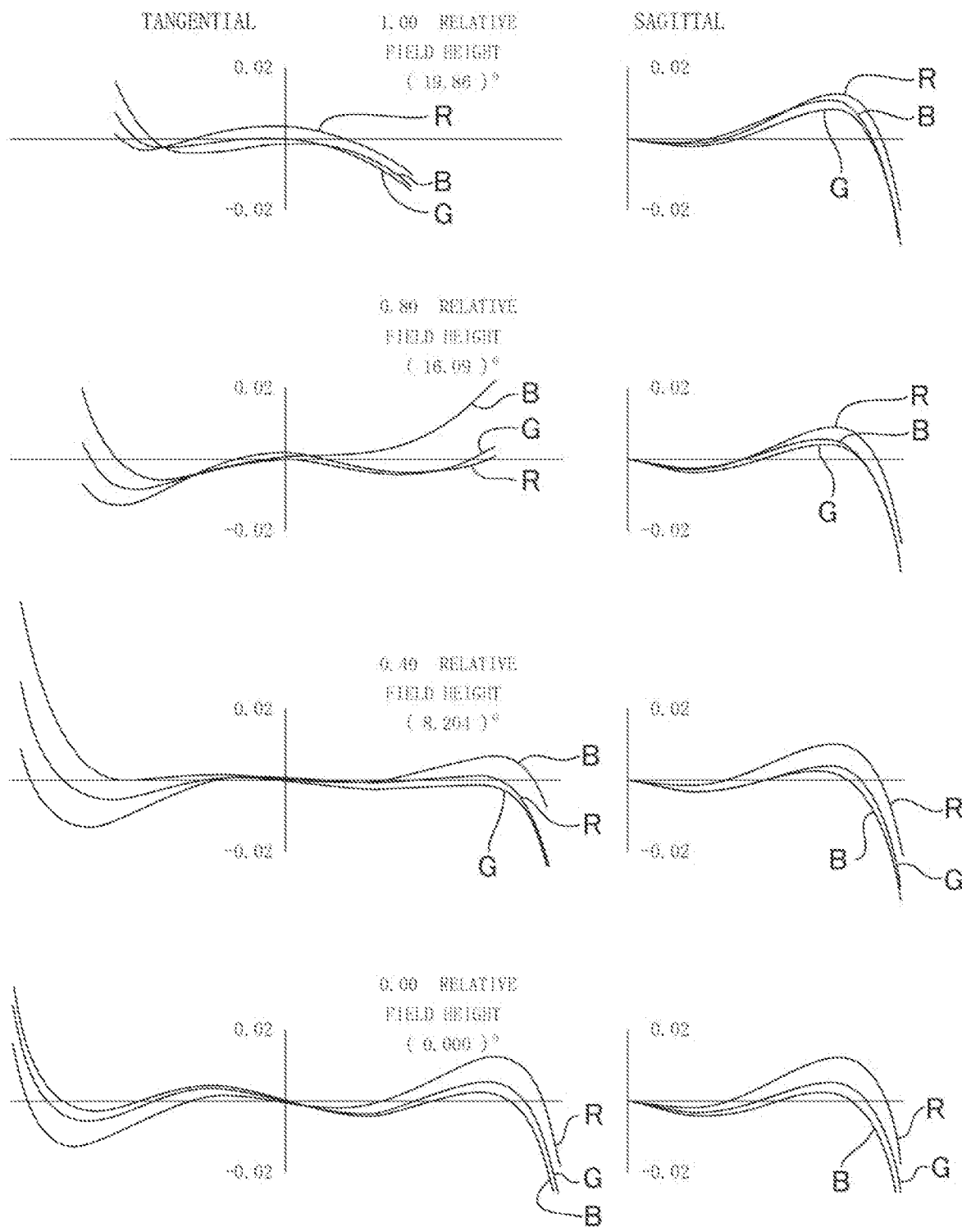
FIG. 19 shows the coma produced by the projection system according to Example 4 operating at the telephoto end.
Figure 20:
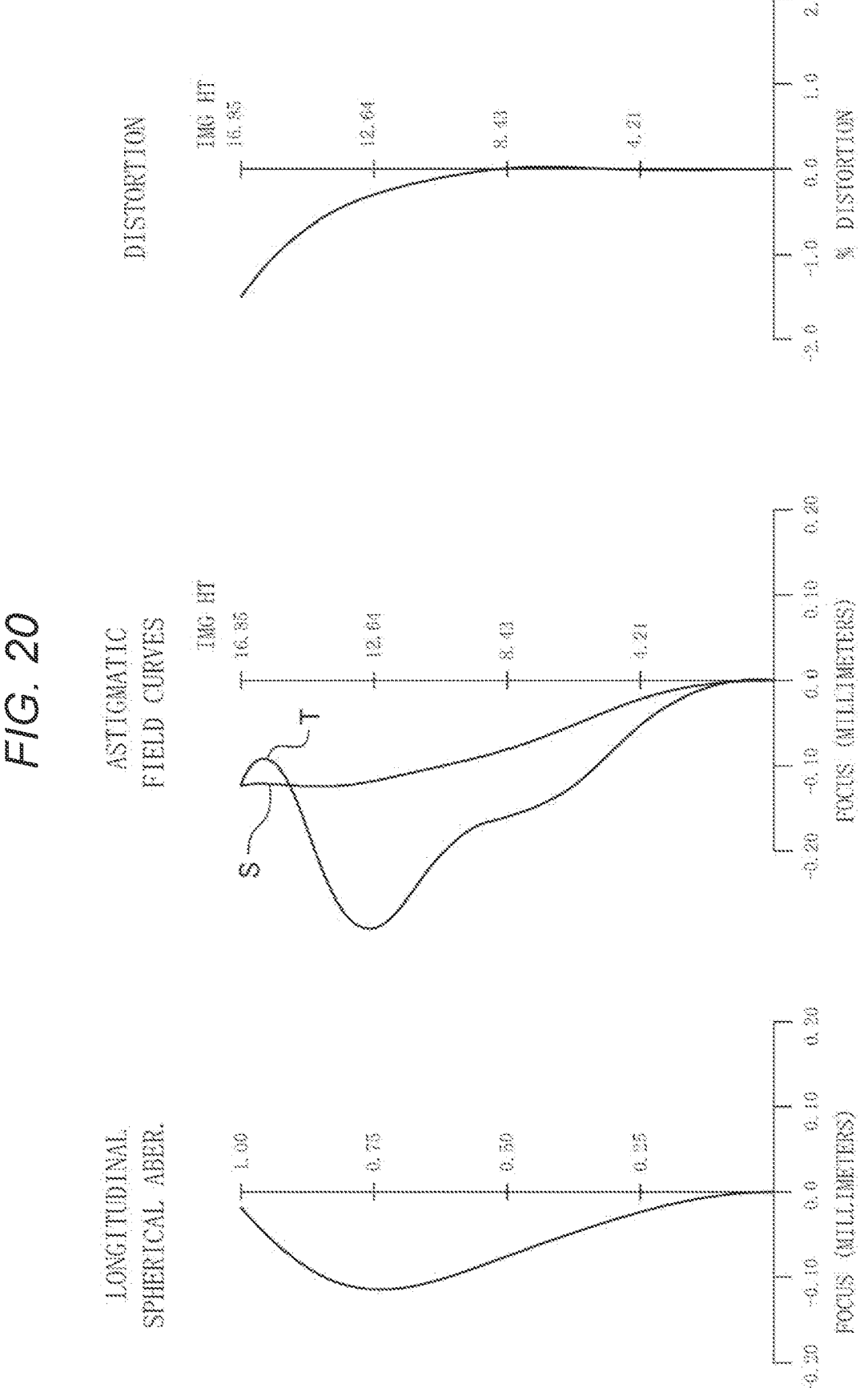
FIG. 20 shows the spherical aberration, astigmatism, and distortion produced by the projection system according to Example 4 operating at the wide angle end.

FIG. 18 shows the coma produced by the projection system 3D operating at the wide angle end. FIG. 19 shows the coma produced by the projection system 3D operating at the telephoto end. FIG. 20 shows the spherical aberration, astigmatism, and distortion produced by the projection system 3D operating at the wide angle end. FIG. 21 shows the spherical aberration, astigmatism, and distortion produced by the projection system 3D operating at the telephoto end. The projection according to the present example suppresses the variety of aberrations, as shown in FIGS. 18 to 21.

Example 5

Figure 22:
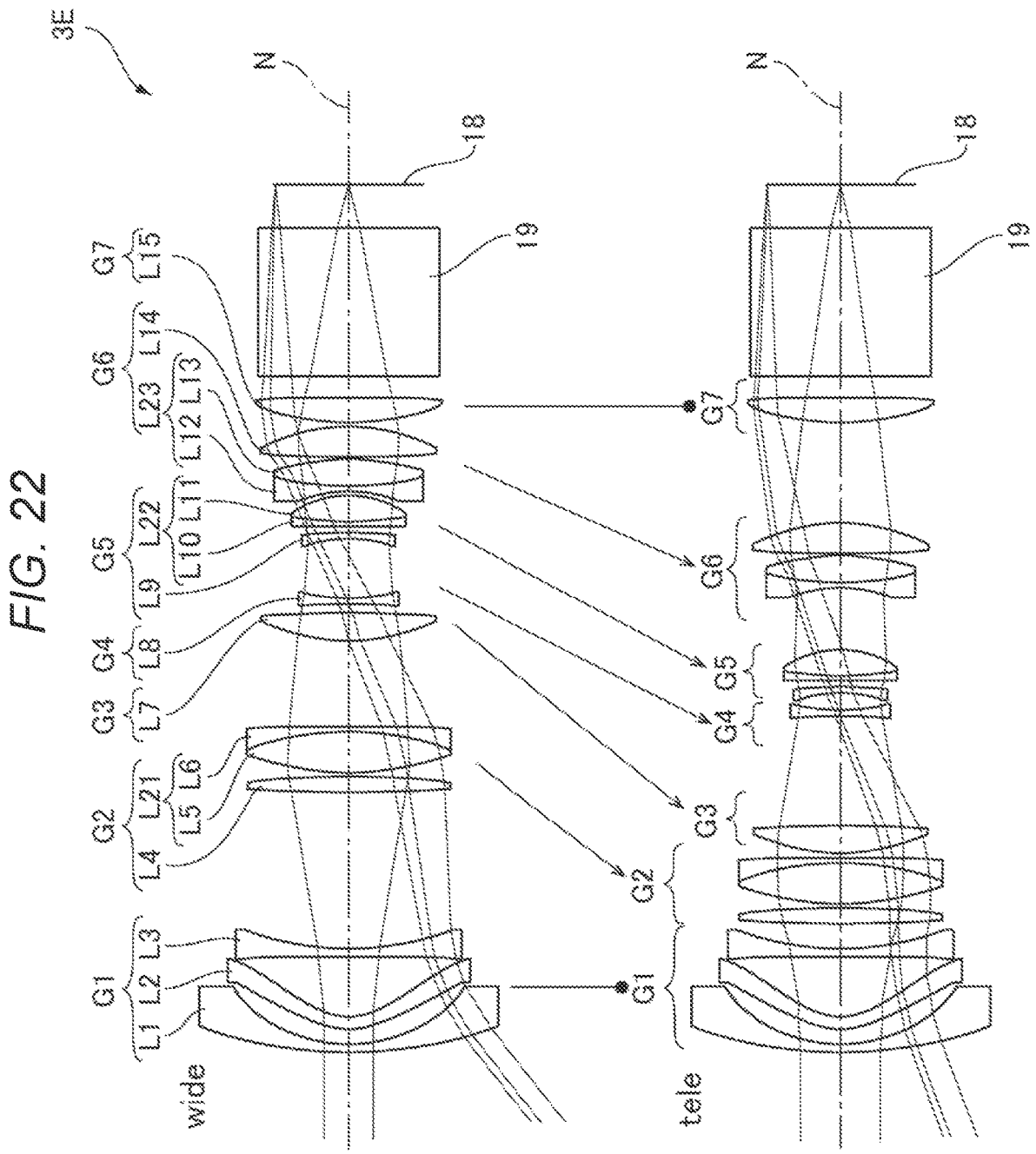
FIG. 22 is a beam diagram showing beams passing through the projection system according to Example 5.

FIG. 22 is a beam diagram showing beams passing through a projection system 3E according to Example 5. The projection system 3E includes a first lens group G1 having negative power, a second lens group G2 having positive power, a third lens group G3 having positive power, a fourth lens group G4 having negative power, a fifth lens group G5 having positive power, a sixth lens group G6 having positive power, and a seventh lens group G7 having positive power sequentially arranged from the enlargement side toward the reduction side, as shown in FIG. 22.

The first lens group G1 is formed of three lenses L1 to L3. The lenses L1 to L3 are arranged in this order from the enlargement side toward the reduction side. The lens L1 has negative power. The lens L1 is a meniscus lens. The lens L1 has a convex surface at the enlargement side and a concave surface at the reduction side. The lens L2 is made of resin. The lens L2 has negative power. The lens L2 has a convex surface at the enlargement side and a concave surface at the reduction side. The lens L2 has aspheric surfaces at the enlargement and reduction sides. The lens L3 has negative power. The lens L3 has concave surfaces at the enlargement and reduction sides.

The second lens group G2 is formed of three lenses L4 to L6. The lenses L4 to L6 are arranged in this order from the enlargement side toward the reduction side. The lens L4 has positive power. The lens L4 has convex surfaces at the enlargement and reduction sides. The lens L5 has positive power. The lens L5 has convex surfaces at the enlargement and reduction sides. The lens L6 has negative power. The lens L6 is a meniscus lens. The lens L6 has a concave surface at the enlargement side and a convex surface at the reduction side. The lens L5 and the lens L6 are bonded to each other into a cemented doublet L21. The cemented doublet L21 has positive power.

The third lens group G3 is formed of a single lens L7. The lens L7 has positive power. The lens L7 has convex surfaces at the enlargement and reduction sides. The fourth lens group G4 is formed of a single lens L8. The lens L8 has negative power. The lens L8 has concave surfaces at the enlargement and reduction sides.

The fifth lens group G5 is formed of three lenses L9 to L11. The lenses L9 to L11 are arranged in this order from the enlargement side toward the reduction side. The lens L9 is made of glass. The lens L9 has negative power. The lens L9 is a meniscus lens. The lens L9 has a concave surface at the enlargement side and a convex surface at the reduction side. The lens L9 has an aspheric surface at the enlargement side. The lens L10 has negative power. The lens L10 has concave surfaces at the enlargement and reduction sides. The lens L11 has positive power. The lens L11 has convex surfaces at the enlargement and reduction sides. The lens L10 and the lens L11 are bonded to each other into a cemented doublet L22. The cemented doublet L22 has positive power.

The sixth lens group G6 is formed of three lenses L12 to L14. The lenses L12 to L14 are arranged in this order from the enlargement side toward the reduction side. The lens L12 has negative power. The lens L12 has concave surfaces at the enlargement and reduction sides. The lens L13 has positive power. The lens L13 has convex surfaces at the enlargement and reduction sides. The lens L12 and the lens L13 are bonded to each other into a cemented doublet L23. The cemented doublet L23 has negative power. The lens L14 has positive power. The lens L14 has convex surfaces at the enlargement and reduction sides.

The seventh lens group G7 is formed of a single lens L15. The lens L15 has positive power. The lens L15 has convex surfaces at the enlargement and reduction sides.

In the projection system 3E, the reduction side of the lens L15 of the seventh lens group G7 forms a telecentric system.

The projection system 3E is a zoom lens having an angle of view that changes between the angle at the wide angle end and the angle at the telephoto end. To change the magnification of the projection system 3E, the first lens group G1 and the seventh lens group G7 are fixed, and the second lens group G2, the third lens group G3, the fourth lens group G4, the fifth lens group G5, and the sixth lens group G6 are moved along the optical axis N. When the magnification is changed from the value at the wide angle end to the value at the telephoto end, the second lens group G2, the third lens group G3, the fourth lens group G4, the fifth lens group G5, and the sixth lens group G6 are each moved along the optical axis N from the reduction side toward the enlargement side. In the present example, the zooming ratio is about 2.08.

Data on the projection system 3E are listed in the table below, in which FNo represents the f number of the projection system 3E, $\omega$ represents the half angle of view, Fw represents the focal length of the overall projection system operating at the wide angle end, Ft represents the focal length of the overall projection system operating at the telephoto end, LL represents the overall length of the projection system (distance from object-side surface of lens L1 to reduction-side surface of lens L15), IH represents the largest image height at the liquid crystal panel 18, M represents the projection magnification, Fg1 represents the focal length of the first lens group G1, Fg2 represents the focal length of the second lens group G2, and Fg3 represents the focal length of the third lens group G3.

| | |
|---|---|
| FNo (between wide angle end and telephoto end) | 1.95 to 2.52 |
| $\omega$ (between telephoto end and wide angle end) | 19.82° to 37.25° |
| Fw | 22.48 mm |
| Ft | 46.74 mm |
| LL | 156.90 mm |
| IH | 16.85 mm |
| M | 108.09 |
| Fg1 | −35.55 mm |
| Fg2 | 57.25 mm |
| Fg3 | 80.45 mm |

Data on the lenses of the projection system 3E are listed below. The surfaces of the lenses are numbered sequentially from the enlargement side toward the reduction side. Reference characters are given to the screen, the lenses, the dichroic prism, and the liquid crystal panels. An aspheric surface has a surface number followed by *. R represents the radius of curvature. D represents the axial inter-surface spacing. Nd represents the refractive index at the d line. vd represents the Abbe number at the d line. R and D are expressed in millimeters.

| Reference character | Surface number | R | D | Nd | vd |
|---|---|---|---|---|---|
| S | 1 | 1.00E+18 | 2390.000 | | |
| L1 | 2 | 92.939 | 2.000 | 1.5558 | 68.60 |
| | 3 | 32.537 | 3.665 | | |
| L2 | 4* | 15.549 | 3.000 | 1.5350 | 55.71 |
| | 5* | 12.523 | 14.297 | | |

-continued

| Reference character | Surface number | R | D | Nd | vd |
|---|---|---|---|---|---|
| L3 | 6 | −557.265 | 2.000 | 1.4970 | 81.55 |
| | 7 | 66.360 | Variable spacing 1 | | |
| L4 | 8 | 397.982 | 3.481 | 1.6641 | 40.16 |
| | 9 | −227.693 | 0.800 | | |
| L5 | 10 | 62.986 | 10.058 | 1.7434 | 35.11 |
| L6 | 11 | −64.323 | 1.200 | 1.7561 | 24.69 |
| | 12 | −526.631 | Variable spacing 2 | | |
| L7 | 13 | 46.208 | 6.694 | 1.4970 | 81.55 |
| | 14 | −288.115 | Variable spacing 3 | | |
| L8 | 15 | −256.013 | 1.500 | 1.5242 | 60.38 |
| | 16 | 40.960 | Variable spacing 4 | | |
| L9 | 17* | −24.492 | 1.400 | 1.5831 | 59.39 |
| | 18 | −82.584 | 1.282 | | |
| L10 | 19 | −816.161 | 1.200 | 1.8000 | 24.68 |
| L11 | 20 | 66.800 | 6.229 | 1.4970 | 81.55 |
| | 21 | −22.381 | Variable spacing 5 | | |
| L12 | 22 | −30.878 | 1.200 | 1.7600 | 24.58 |
| L13 | 23 | 61.120 | 6.540 | 1.4970 | 81.55 |
| | 24 | −50.075 | 0.500 | | |
| L14 | 25 | 257.848 | 7.248 | 1.7760 | 23.87 |
| | 26 | −41.149 | Variable spacing 6 | | |
| L15 | 27 | 57.577 | 6.026 | 1.4970 | 81.55 |
| | 28 | −556.091 | 5.100 | | |
| 19 | 29 | 1.00E+18 | 35.540 | 1.5168 | 64.20 |
| | 30 | 1.00E+18 | 10.360 | | |
| 18 | 31 | 1.00E+18 | 0.000 | | |

The table below shows the variable spacings 1, 2, 3, 4, 5, and 6 required for the changes in magnification.

| | Wide angle end | Intermediate position | Telephoto end |
|---|---|---|---|
| Variable spacing 1 | 37.676 | 13.755 | 6.020 |
| Variable spacing 2 | 20.530 | 13.489 | 1.000 |
| Variable spacing 3 | 1.982 | 15.837 | 25.847 |
| Variable spacing 4 | 14.587 | 7.200 | 3.985 |
| Variable spacing 5 | 1.000 | 11.445 | 15.000 |
| Variable spacing 6 | 0.800 | 14.672 | 24.466 |

The aspheric coefficients are listed below.

| Surface number | 4 | 5 | 17 |
|---|---|---|---|
| R | 15.549 | 12.523 | −24.492 |
| Conic constant (K) | −1.064 | −1.322 | −0.324 |
| Fourth-order coefficient | −4.543884E−05 | −4.144394E−05 | −1.321671E−05 |
| Sixth-order coefficient | 5.142926E−08 | 6.291342E−08 | −5.590020E−08 |
| Eighth-order coefficient | −1.981882E−11 | −4.604434E−11 | 6.385357E−10 |
| Tenth-order coefficient | −6.325852E−15 | 1.196304E−14 | −7.381142E−12 |
| Twelfth-order coefficient | −6.608506E−18 | −7.291598E−18 | 4.692765E−14 |
| Fourteenth-order coefficient | 6.220969E−21 | −6.518703E−21 | −1.367595E−16 |
| Sixteenth-order coefficient | 1.003789E−23 | 2.227396E−23 | 9.464307E−29 |

-continued

| Surface number | 4 | 5 | 17 |
|---|---|---|---|
| Eighteenth-order coefficient | 8.495362E−27 | 1.002368E−26 | 0.000000E+00 |
| Twentieth-order | −1.861311E−29 | −2.903444E−29 | 0.000000E+00 |

The projection system 3E according to the present example satisfies Conditional Expressions (1) to (8), as the projection system 3A according to Example 1 does.

In the present example,

| | |
|---|---|
| Fw | 22.48 mm |
| Fg2 | 57.25 mm | are provided. Fg2/Fw=2.55 is therefore achieved, so that Conditional Expression (1) is satisfied.

In the present example,

| | |
|---|---|
| Fg1 | −35.55 mm |
| Fg2 | 57.25 mm | are provided. Fg2/Fg1=−1.61 is therefore achieved, so that Conditional Expression (2) is satisfied.

In the present example,

| | |
|---|---|
| Fg2 | 57.25 mm |
| Fg3 | 80.45 mm | are provided. Fg2/Fg3=0.71 is therefore achieved, so that Conditional Expression (3) is satisfied.

In the present example,

| | |
|---|---|
| Fw | 22.48 mm |
| Ft | 46.74 mm | are provided. Ft/Fw=2.08 is therefore achieved, so that Conditional Expression (4) is satisfied.

In the present example,

| | |
|---|---|
| LL | 156.90 mm |
| Dwg12 | 37.68 mm | are provided. Dwg12/LL=0.24 is therefore achieved, so that Conditional Expression (5) is satisfied.

In the present example,

| | |
|---|---|
| LL | 156.90 mm |
| Dwg34 | 1.98 mm | are provided. Dwg34/LL=0.01 is therefore achieved, so that Conditional Expression (6) is satisfied.

In the present example,

| | |
|---|---|
| LL | 156.90 mm |
| IH | 16.85 mm | are provided. LL/IH=9.31 is therefore achieved, so that Conditional Expression (7) is satisfied.

In the present example, Nd=1.50 to 1.80 is provided, so that Conditional Expression (8) is satisfied.

Effects and Advantages

The second lens group G2 is formed of the following lenses arranged from the enlargement side toward the reduction side: the lens L4, which is a positive lens; the lens L5, which is a positive lens; and the lens L6, which is a negative lens. The projection system 3E according to the present example can therefore provide the same effects and advantages as those provided by the projection system 3A according to Example 1.

The projection system 3E according to the present example, which satisfies Conditional Expressions (1) to (8), can provide the same effects and advantages as those provided by the projection system 3A according to Example 1.

Figure 23:
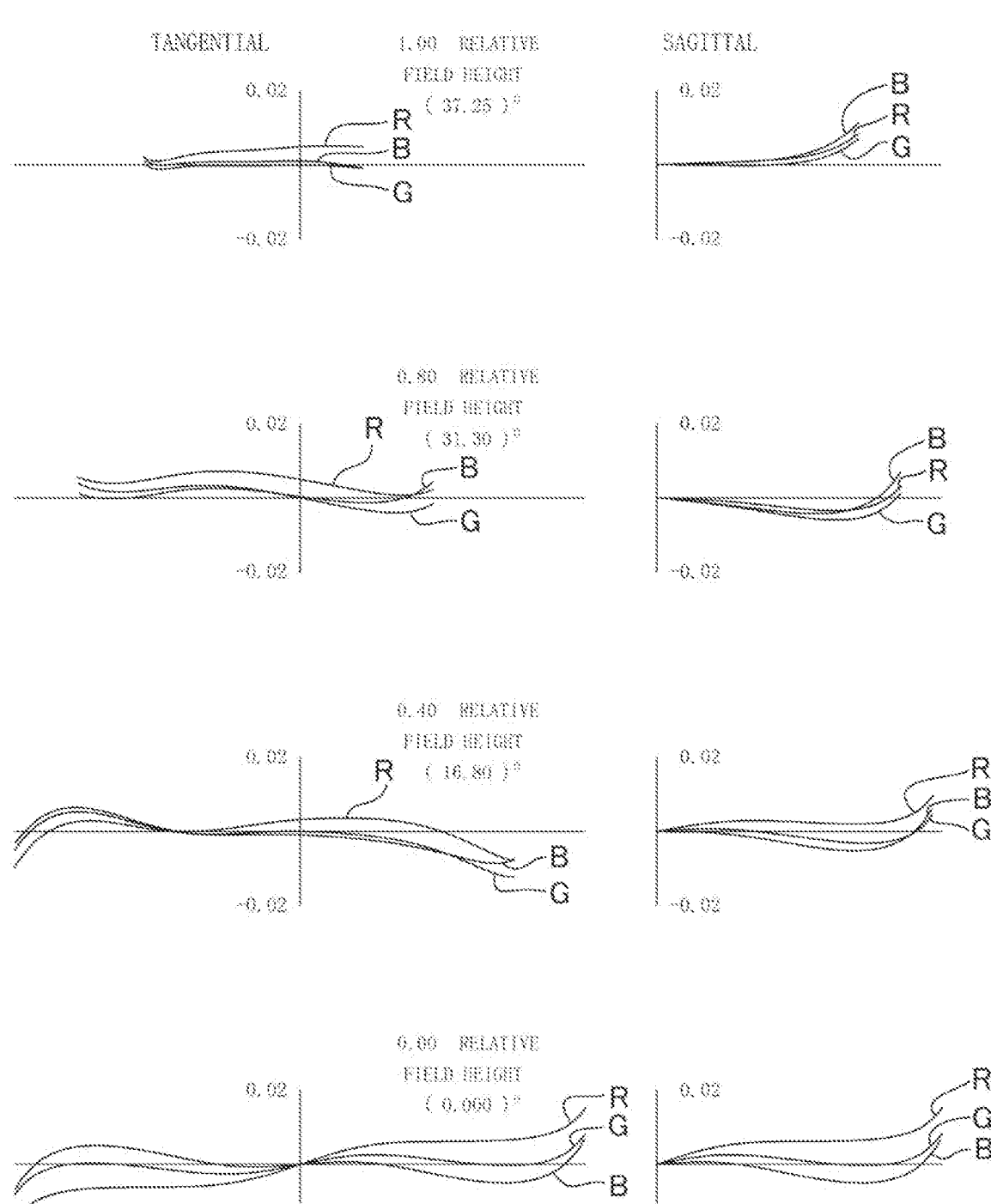
FIG. 23 shows the coma produced by the projection system according to Example 5 operating at the wide angle end.
Figure 24:
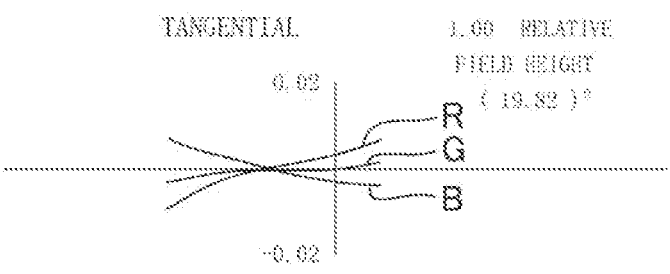
FIG. 24 shows the coma produced by the projection system according to Example 5 operating at the telephoto end.
Figure 24:
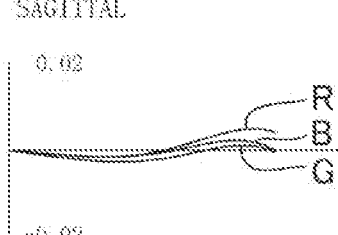
Figure 24:
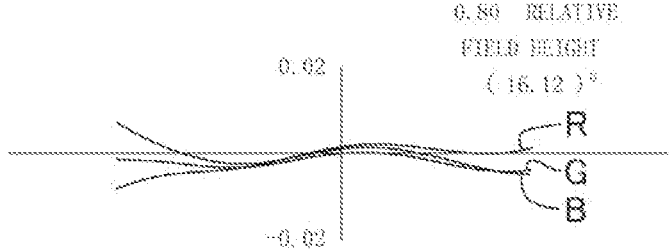
Figure 24:
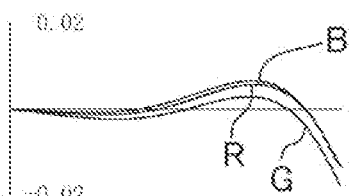
Figure 24:
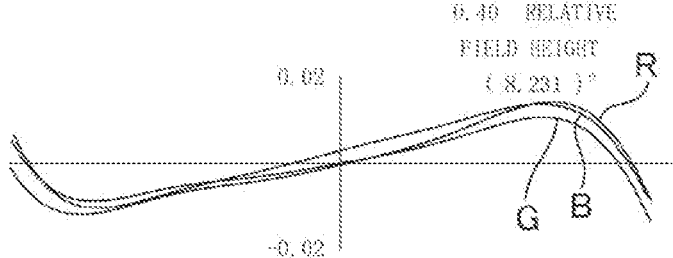
Figure 24:
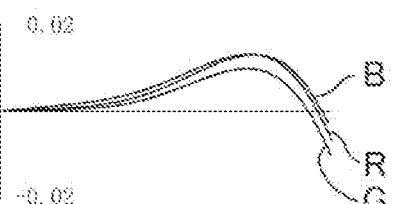
Figure 24:
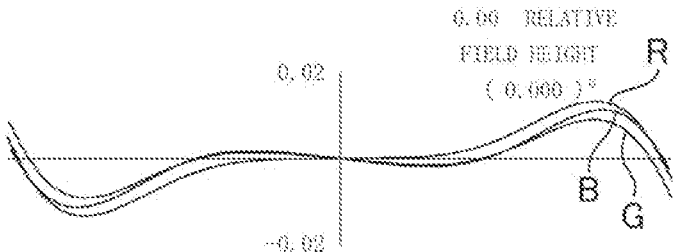
Figure 24:
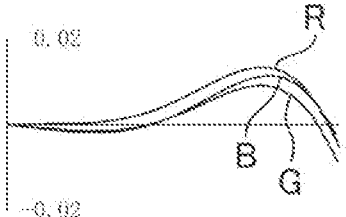
Figure 25:
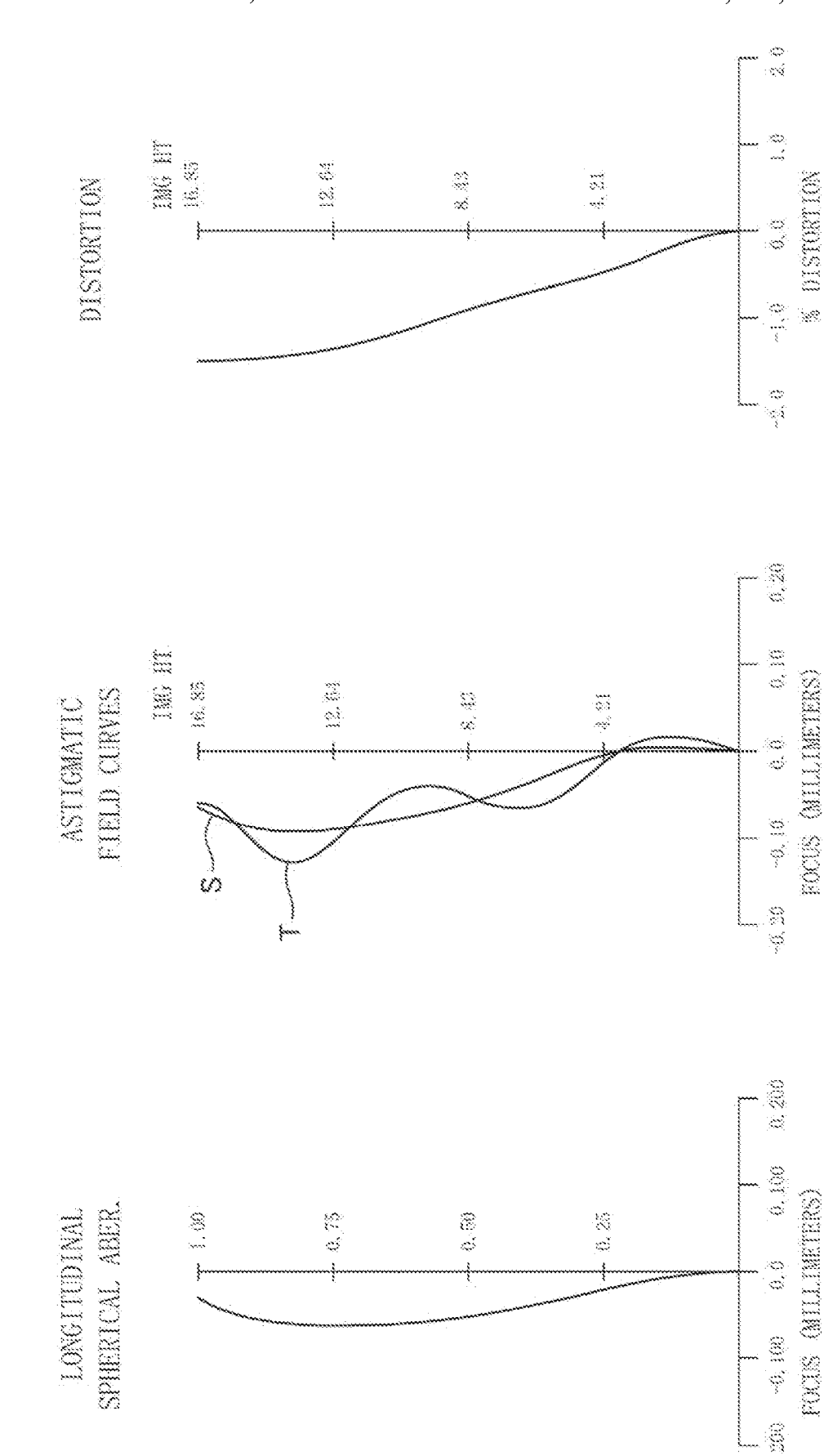
FIG. 25 shows the spherical aberration, astigmatism, and distortion produced by the projection system according to Example 5 operating at the wide angle end.
Figure 26:
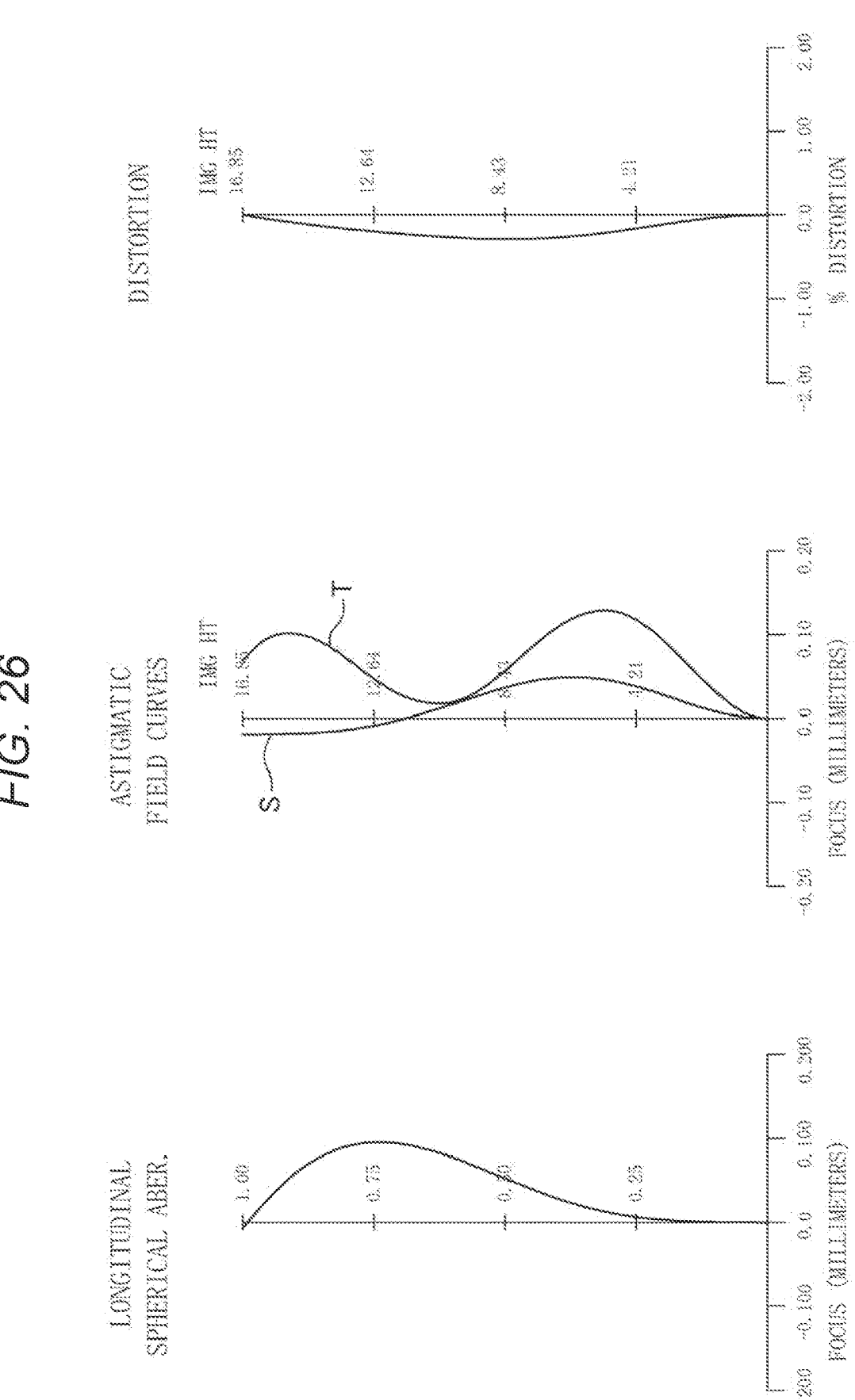
FIG. 26 shows the spherical aberration, astigmatism, and distortion produced by the projection system according to Example 5 operating at the telephoto end.

FIG. 23 shows the coma produced by the projection system 3E operating at the wide angle end. FIG. 24 shows the coma produced by the projection system 3E operating at the telephoto end. FIG. 25 shows the spherical aberration, astigmatism, and distortion produced by the projection system 3E operating at the wide angle end. FIG. 26 shows the spherical aberration, astigmatism, and distortion produced by the projection system 3E operating at the telephoto end. The projection E according to the present example suppresses the variety of aberrations, as shown in FIGS. 23 to 26.

Example 6

Figure 27:
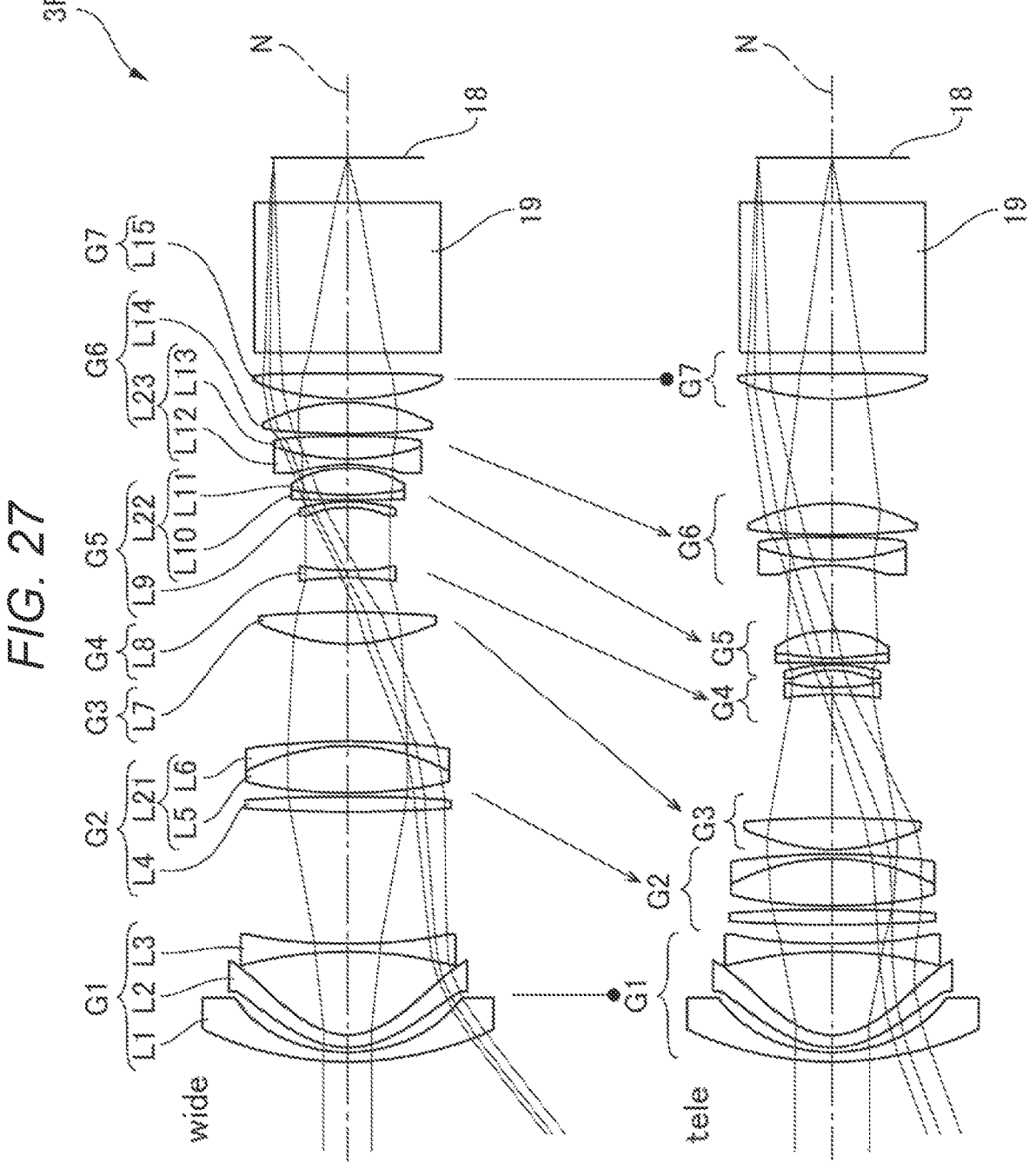
FIG. 27 is a beam diagram showing beams passing through the projection system according to Example 6.

FIG. 27 is a beam diagram showing beams passing through a projection system 3F according to Example 6. The projection system 3F includes a first lens group G1 having negative power, a second lens group G2 having positive power, a third lens group G3 having positive power, a fourth lens group G4 having negative power, a fifth lens group G5 having positive power, a sixth lens group G6 having positive power, and a seventh lens group G7 having positive power sequentially arranged from the enlargement side toward the reduction side, as shown in FIG. 27.

The first lens group G1 is formed of three lenses L1 to L3. The lenses L1 to L3 are arranged in this order from the enlargement side toward the reduction side. The lens L1 has negative power. The lens L1 is a meniscus lens. The lens L1 has a convex surface at the enlargement side and a concave surface at the reduction side. The lens L2 is made of resin. The lens L2 has negative power. The lens L2 has a convex surface at the enlargement side and a concave surface at the reduction side. The lens L2 has aspheric surfaces at the enlargement and reduction sides. The lens L3 has negative power. The lens L3 has concave surfaces at the enlargement and reduction sides.

The second lens group G2 is formed of three lenses L4 to L6. The lenses L4 to L6 are arranged in this order from the enlargement side toward the reduction side. The lens L4 has positive power. The lens L4 has convex surfaces at the enlargement and reduction sides. The lens L5 has positive power. The lens L5 has convex surfaces at the enlargement and reduction sides. The lens L6 has negative power. The lens L6 is a meniscus lens. The lens L6 has a concave surface at the enlargement side and a convex surface at the reduction side. The lens L5 and the lens L6 are bonded to each other into a cemented doublet L21. The cemented doublet L21 has positive power.

The third lens group G3 is formed of a single lens L7. The lens L7 has positive power. The lens L7 has convex surfaces at the enlargement and reduction sides. The fourth lens group G4 is formed of a single lens L8. The lens L8 has negative power. The lens L8 has concave surfaces at the enlargement and reduction sides.

The fifth lens group G5 is formed of three lenses L9 to L11. The lenses L9 to L11 are arranged in this order from the enlargement side toward the reduction side. The lens L9 is made of glass. The lens L9 has negative power. The lens L9 is a meniscus lens. The lens L9 has a concave surface at the enlargement side and a convex surface at the reduction side. The lens L9 has an aspheric surface at the enlargement side. The lens L10 has negative power. The lens L10 is a meniscus lens. The lens L10 has a convex surface at the enlargement L11 has positive power. The lens L11 has convex surfaces at the enlargement and reduction sides. The lens L10 and the lens L11 are bonded to each other into a cemented doublet L22. The cemented doublet L22 has positive power.

The sixth lens group G6 is formed of three lenses L12 to L14. The lenses L12 to L14 are arranged in this order from the enlargement side toward the reduction side. The lens L12 has negative power. The lens L12 has concave surfaces at the enlargement and reduction sides. The lens L13 has positive power. The lens L13 has convex surfaces at the enlargement and reduction sides. The lens L12 and the lens L13 are bonded to each other into a cemented doublet L23. The cemented doublet L23 has negative power. The lens L14 has positive power. The lens L14 has convex surfaces at the enlargement and reduction sides.

The seventh lens group G7 is formed of a single lens L15. The lens L15 has positive power. The lens L15 has convex surfaces at the enlargement and reduction sides.

In the projection system 3F, the reduction side of the lens L15 of the seventh lens group G7 forms a telecentric system.

The projection system 3F is a zoom lens having an angle of view that changes between the angle at the wide angle end and the angle at the telephoto end. To change the magnification of the projection system 3F, the first lens group G1 and the seventh lens group G7 are fixed, and the second lens group G2, the third lens group G3, the fourth lens group G4, the fifth lens group G5, and the sixth lens group G6 are moved along the optical axis N. When the magnification is changed from the value at the wide angle end to the value at the telephoto end, the second lens group G2, the third lens group G3, the fourth lens group G4, the fifth lens group G5, and the sixth lens group G6 are each moved along the optical axis N from the reduction side toward the enlargement side. In the present example, the zooming ratio is about 2.08.

Data on the projection system 3F are listed in the table below, in which FNo represents the f number of the projection system 3F, ω represents the half angle of view, Fw represents the focal length of the overall projection system operating at the wide angle end, Ft represents the focal length of the overall projection system operating at the telephoto end, LL represents the overall length of the projection system (distance from object-side surface of lens L1 to reduction-side surface of lens L15), IH represents the largest image height at the liquid crystal panel 18, M represents the projection magnification, Fg1 represents the focal length of the first lens group G1, Fg2 represents the focal length of the second lens group G2, and Fg3 represents the focal length of the third lens group G3.

| | |
|---|---|
| FNo (between wide angle end and telephoto end) | 1.99 to 2.64 |
| ω (between telephoto end and wide angle end) | 19.87° to 37.22° |
| Fw | 22.48 mm |
| Ft | 46.74 mm |
| LL | 163.67 mm |
| IH | 16.85 mm |
| M | 108.11 |
| Fg1 | −32.84 mm |
| Fg2 | 61.38 mm |
| Fg3 | 75.59 mm |

Data on the lenses of the projection system 3F are listed below. The surfaces of the lenses are numbered sequentially from the enlargement side toward the reduction side. Reference characters are given to the screen, the lenses, the dichroic prism, and the liquid crystal panels. An aspheric surface has a surface number followed by *. R represents the radius of curvature. D represents the axial inter-surface spacing. Nd represents the refractive index at the d line. vd represents the Abbe number at the d line. R and D are expressed in millimeters.

| Reference character | Surface number | R | D | Nd | vd |
|---|---|---|---|---|---|
| S | 1 | 1.00E+18 | 2390.000 | | |
| L1 | 2 | 75.292 | 2.197 | 1.6027 | 62.17 |
| | 3 | 32.237 | 1.206 | | |
| L2 | 4* | 16.001 | 3.000 | 1.5350 | 55.71 |
| | 5* | 12.528 | 19.868 | | |
| L3 | 6 | −91.311 | 2.000 | 1.4970 | 81.55 |
| | 7 | 124.539 | Variable spacing 1 | | |
| L4 | 8 | 281.199 | 3.579 | 1.6053 | 37.02 |
| | 9 | −381.374 | 0.800 | | |
| L5 | 10 | 92.486 | 11.392 | 1.7512 | 33.89 |
| L6 | 11 | −46.958 | 1.200 | 1.7933 | 23.23 |
| | 12 | −137.134 | Variable spacing 2 | | |
| L7 | 13 | 45.232 | 7.554 | 1.4970 | 81.55 |
| | 14 | −212.664 | Variable spacing 3 | | |
| L8 | 15 | −67.914 | 1.500 | 1.5414 | 52.59 |
| | 16 | 39.754 | Variable spacing 4 | | |
| L9 | 17* | −25.577 | 1.400 | 1.5831 | 59.39 |
| | 18 | −46.244 | 0.504 | | |
| L10 | 19 | 362.587 | 1.200 | 1.7471 | 30.53 |
| L11 | 20 | 57.584 | 6.431 | 1.4970 | 81.55 |
| | 21 | −23.641 | Variable spacing 5 | | |
| L12 | 22 | −38.886 | 1.200 | 1.7617 | 24.45 |
| L13 | 23 | 48.334 | 5.499 | 1.4970 | 81.55 |
| | 24 | −142.394 | 0.500 | | |
| L14 | 25 | 143.115 | 7.430 | 1.7588 | 24.81 |
| | 26 | −41.803 | Variable spacing 6 | | |
| L15 | 27 | 54.108 | 6.143 | 1.4970 | 81.55 |
| | 28 | −575.520 | 5.100 | | |
| 19 | 29 | 1.00E+18 | 35.540 | 1.5168 | 64.20 |
| | 30 | 1.00E+18 | 10.360 | | |
| 18 | 31 | 1.00E+18 | 0.000 | | |

The table below shows the variable spacings 1, 2, 3, 4, 5, and 6 required for the changes in magnification.

| | Wide angle end | Intermediate position | Telephoto end |
|---|---|---|---|
| Variable spacing 1 | 31.085 | 11.026 | 4.780 |
| Variable spacing 2 | 23.153 | 12.533 | 1.000 |

-continued

| | Wide angle end | Intermediate position | Telephoto end |
|---|---|---|---|
| Variable spacing 3 | 8.132 | 20.941 | 28.969 |
| Variable spacing 4 | 14.894 | 8.108 | 4.134 |
| Variable spacing 5 | 1.000 | 13.505 | 15.000 |
| Variable spacing 6 | 0.800 | 12.802 | 24.973 |

The aspheric coefficients are listed below.

| Surface number | 4 | 5 | 17 |
|---|---|---|---|
| R | 16.001 | 12.528 | −25.577 |
| Conic constant (K) | −0.870 | −0.932 | 1.811 |
| Fourth-order coefficient | −3.423103E−05 | −4.150408E−05 | 2.882926E−06 |
| Sixth-order coefficient | 2.897891E−08 | 3.970822E−08 | 1.674270E−08 |
| Eighth-order coefficient | −1.758485E−11 | −3.092392E−11 | 2.880551E−10 |
| Tenth-order coefficient | 7.938707E−15 | 1.549350E−14 | −4.739456E−12 |
| Twelfth-order coefficient | −3.788005E−18 | −4.075415E−18 | 4.665867E−14 |
| Fourteenth-order coefficient | −6.154406E−21 | −2.308131E−21 | −1.367595E−16 |
| Sixteenth-order coefficient | 1.423144E−24 | −3.646930E−24 | 9.456856E−29 |
| Eighteenth-order coefficient | 1.470320E−26 | −3.677325E−26 | 0.000000E+00 |
| Twentieth-order coefficient | −1.411216E−29 | 3.708854E−29 | 0.000000E+00 |

The projection system 3F according to the present example satisfies Conditional Expressions (1) to (8), as the projection system 3A according to Example 1 does.

In the present example,

| | |
|---|---|
| Fw | 22.48 mm |
| Fg2 | 61.38 mm | are provided. Fg2/Fw=2.73 is therefore achieved, so that Conditional Expression (1) is satisfied.

In the present example,

| | |
|---|---|
| Fg1 | −32.84 mm |
| Fg2 | 61.38 mm | are provided. Fg2/Fg1=−1.87 is therefore achieved, so that Conditional Expression (2) is satisfied.

In the present example,

| | |
|---|---|
| Fg2 | 61.38 mm |
| Fg3 | 75.59 mm | are provided. Fg2/Fg3=0.81 is therefore achieved, so that Conditional Expression (3) is satisfied.

In the present example,

| | |
|---|---|
| Fw | 22.48 mm |
| Ft | 46.74 mm | are provided. Ft/Fw=2.08 is therefore achieved, so that Conditional Expression (4) is satisfied.

In the present example,

| | |
|---|---|
| LL | 163.67 mm |
| Dwg12 | 31.08 mm | are provided. Dwg12/LL=0.19 is therefore achieved, so that Conditional Expression (5) is satisfied.

In the present example,

| | |
|---|---|
| LL | 163.67 mm |
| Dwg34 | 8.31 mm | are provided. Dwg34/LL=0.05 is therefore achieved, so that Conditional Expression (6) is satisfied.

In the present example,

| | |
|---|---|
| LL | 163.67 mm |
| IH | 16.85 mm | are provided. LL/IH=9.71 is therefore achieved, so that Conditional Expression (7) is satisfied.

In the present example, Nd=1.50 to 1.79 is provided, so that Conditional Expression (8) is satisfied.

Effects and Advantages

The second lens group G2 is formed of the following lenses arranged from the enlargement side toward the reduction side: the lens L4, which is a positive lens; the lens L5, which is a positive lens; and the lens L6, which is a negative lens. The projection system 3F according to the present example can therefore provide the same effects and advantages as those provided by the projection system 3A according to Example 1.

The projection system 3F according to the present example, which satisfies Conditional Expressions (1) to (8), can provide the same effects and advantages as those provided by the projection system 3A according to Example 1.

Figure 28:
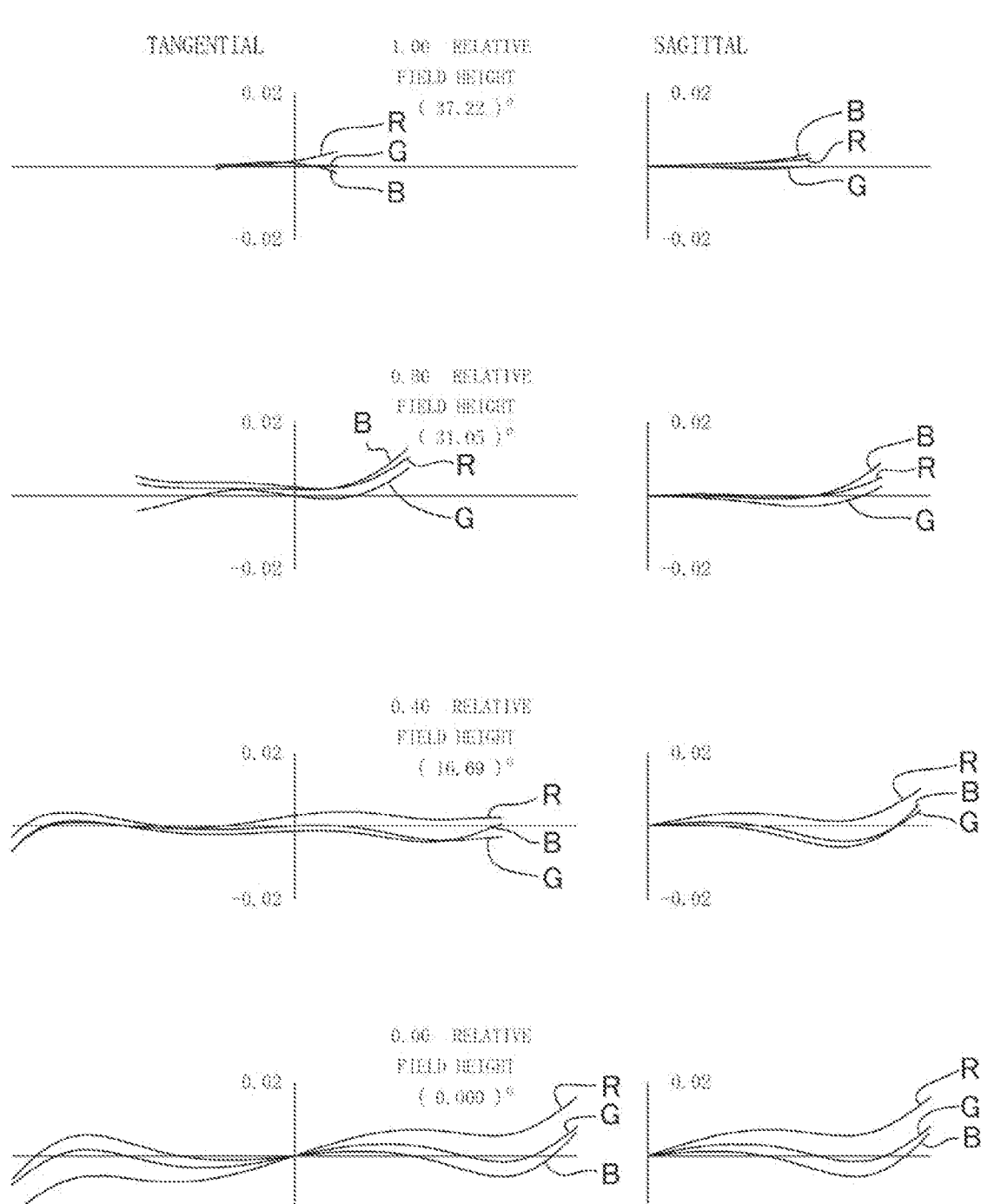
FIG. 28 shows the coma produced by the projection system according to Example 6 operating at the wide angle end.
Figure 29:
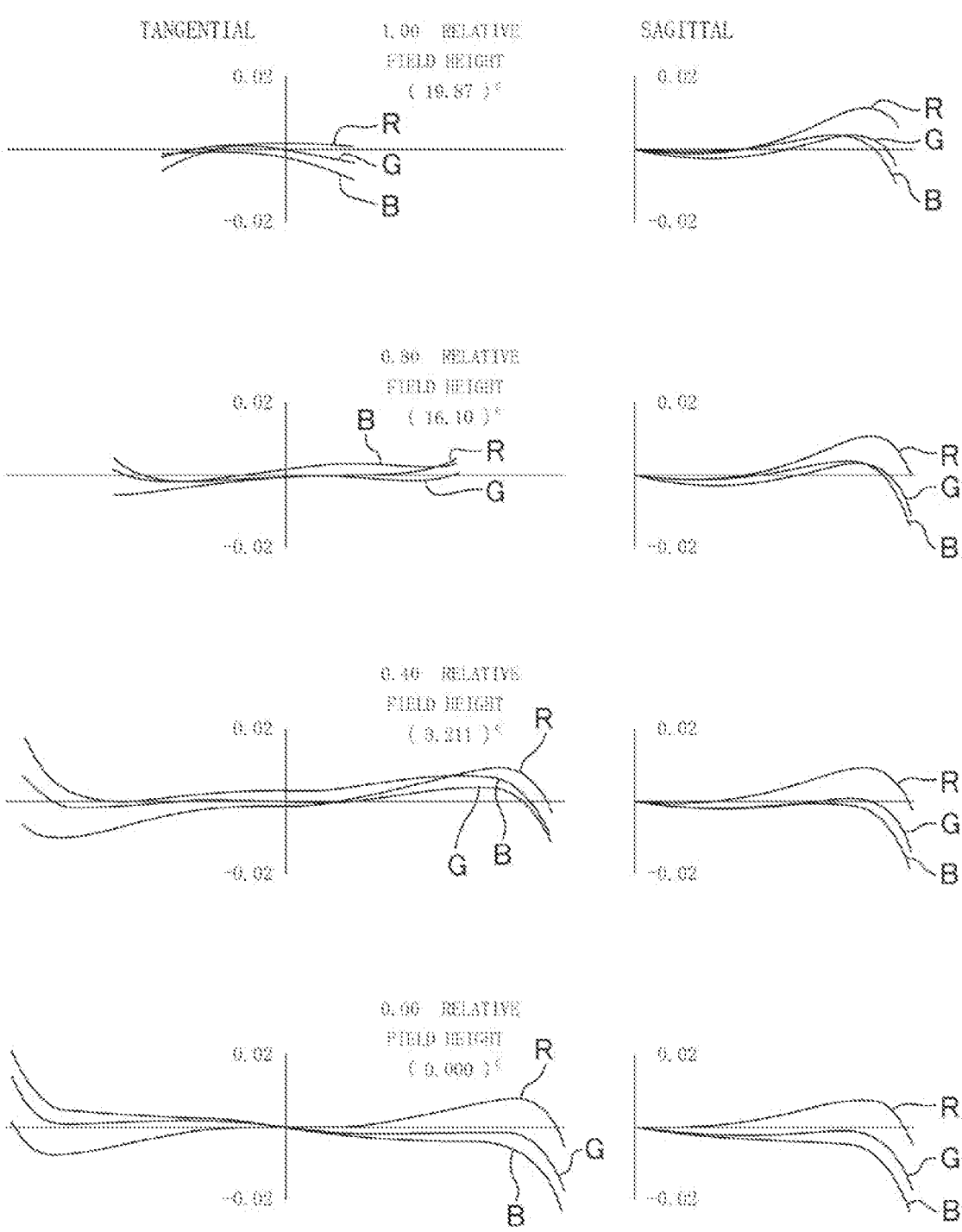
FIG. 29 shows the coma produced by the projection system according to Example 6 operating at the telephoto end.
Figure 30:
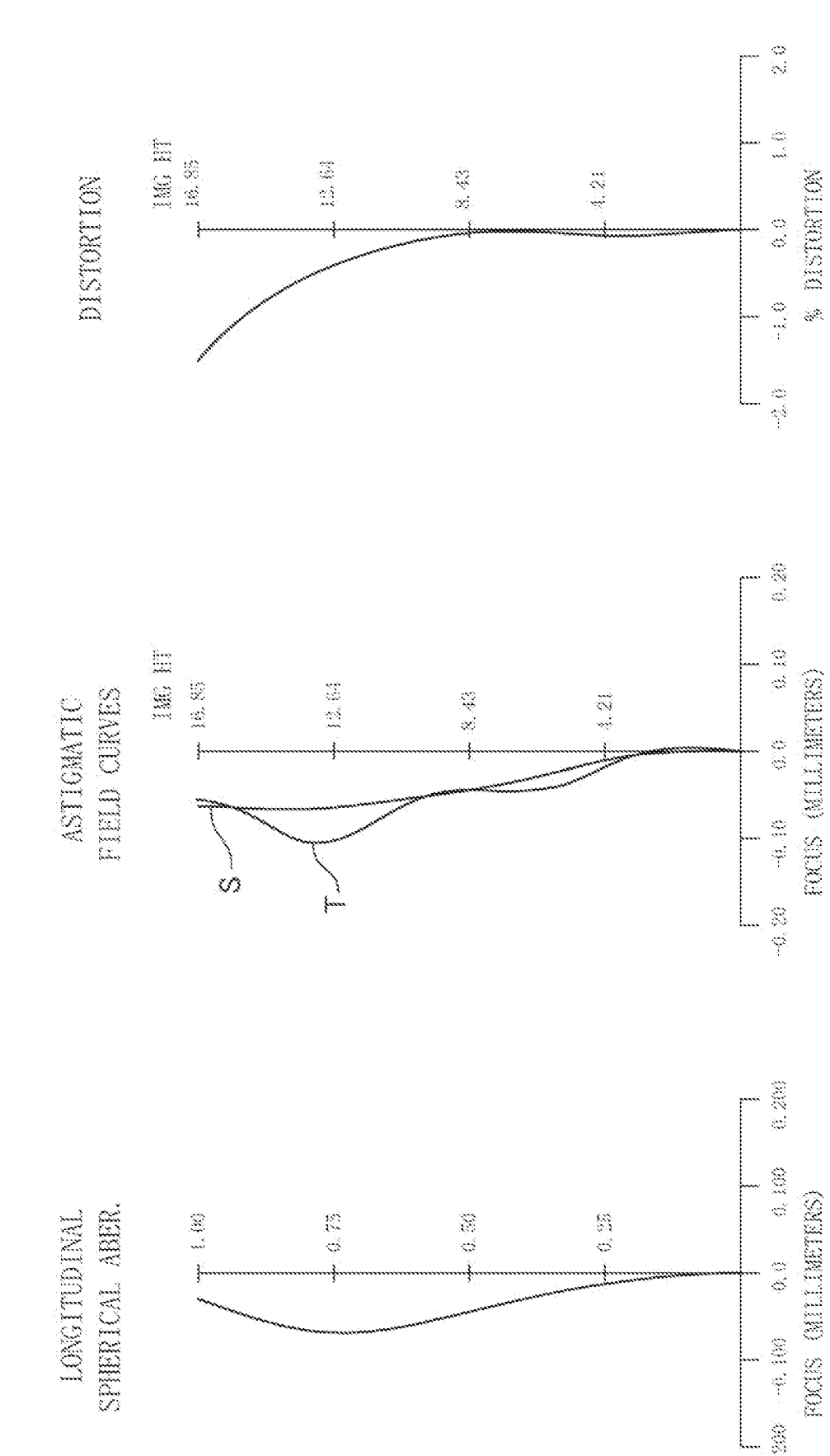
FIG. 30 shows the spherical aberration, astigmatism, and distortion produced by the projection system according to Example 6 operating at the wide angle end.
Figure 31:
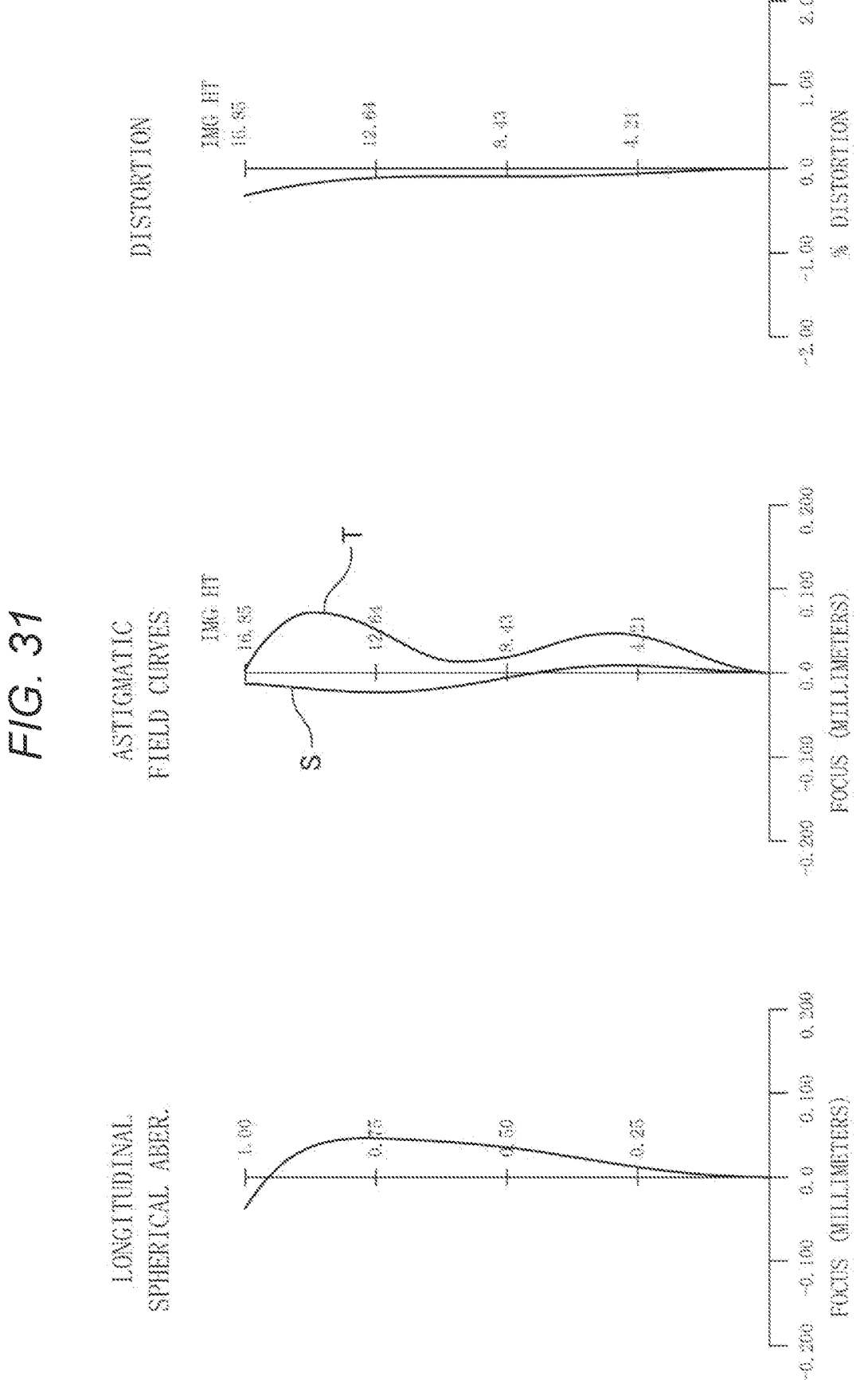
FIG. 31 shows the spherical aberration, astigmatism, and distortion produced by the projection system according to Example 6 operating at the telephoto end.

FIG. 28 shows the coma produced by the projection system 3F operating at the wide angle end. FIG. 29 shows the coma produced by the projection system 3F operating at the telephoto end. FIG. 30 shows the spherical aberration, astigmatism, and distortion produced by the projection system 3F operating at the wide angle end. FIG. 31 shows the spherical aberration, astigmatism, and distortion produced by the projection system 3F operating at the telephoto end. The projection system 3F according to the present example suppresses the variety of aberrations, as shown in FIGS. 28 to 31.

Example 7

Figure 32:
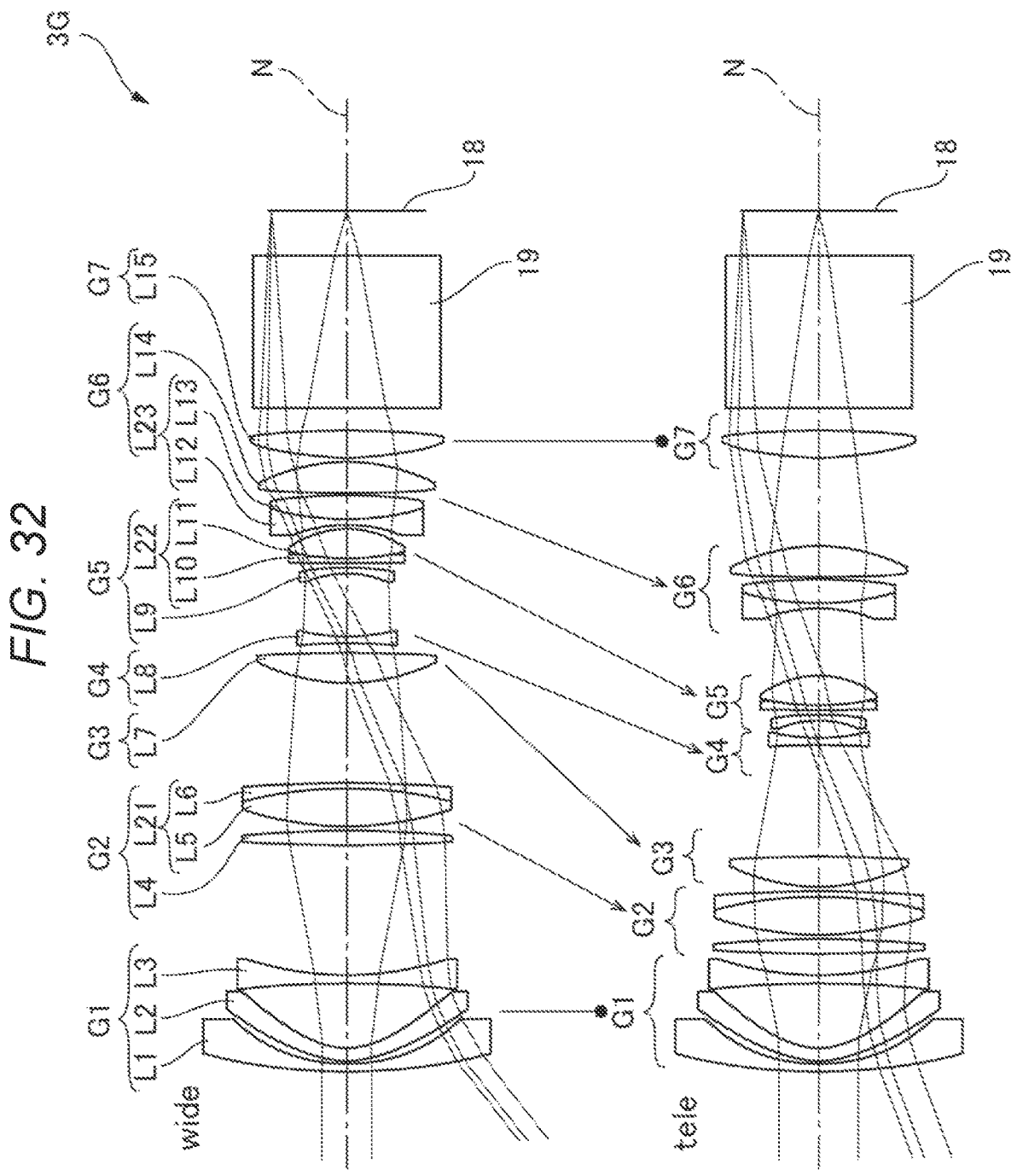
FIG. 32 is a beam diagram showing beams passing through the projection system according to Example 7.

FIG. 32 is a beam diagram showing beams passing through a projection system 3G according to Example 7. The projection system 3G includes a first lens group G1 having negative power, a second lens group G2 having positive power, a third lens group G3 having positive power, a fourth lens group G4 having negative power, a fifth lens group G5 having positive power, a sixth lens group G6 having positive power, and a seventh lens group G7 having positive power sequentially arranged from the enlargement side toward the reduction side, as shown in FIG. 32.

The first lens group G1 is formed of three lenses L1 to L3. The lenses L1 to L3 are arranged in this order from the enlargement side toward the reduction side. The lens L1 has negative power. The lens L1 is a meniscus lens. The lens L1 has a convex surface at the enlargement side and a concave surface at the reduction side. The lens L2 is made of resin. The lens L2 has negative power. The lens L2 has a convex surface at the enlargement side and a concave surface at the reduction side. The lens L2 has aspheric surfaces at the enlargement and reduction sides. The lens L3 has negative power. The lens L3 has concave surfaces at the enlargement and reduction sides.

The second lens group G2 is formed of three lenses L4 to L6. The lenses L4 to L6 are arranged in this order from the enlargement side toward the reduction side. The lens L4 has positive power. The lens L4 has convex surfaces at the enlargement and reduction sides. The lens L5 has positive power. The lens L5 has convex surfaces at the enlargement and reduction sides. The lens L6 has negative power. The lens L6 is a meniscus lens. The lens L6 has a concave surface at the enlargement side and a convex surface at the reduction side. The lens L5 and the lens L6 are bonded to each other into a cemented doublet L21. The cemented doublet L21 has positive power.

The third lens group G3 is formed of a single lens L7. The lens L7 has positive power. The lens L7 has convex surfaces at the enlargement and reduction sides. The fourth lens group G4 is formed of a single lens L8. The lens L8 has negative power. The lens L8 has concave surfaces at the enlargement and reduction sides.

The fifth lens group G5 is formed of three lenses L9 to L11. The lenses L9 to L11 are arranged in this order from the enlargement side toward the reduction side. The lens L9 is made of glass. The lens L9 has negative power. The lens L9 is a meniscus lens. The lens L9 has a concave surface at the enlargement side and a convex surface at the reduction side. The lens L9 has an aspheric surface at the enlargement side. The lens L10 has negative power. The lens L10 is a meniscus lens. The lens L10 has a convex surface at the enlargement L11 has positive power. The lens L11 has convex surfaces at the enlargement and reduction sides. The lens L10 and the lens L11 are bonded to each other into a cemented doublet L22. The cemented doublet L22 has positive power.

The sixth lens group G6 is formed of three lenses L12 to L14. The lenses L12 to L14 are arranged in this order from the enlargement side toward the reduction side. The lens L12 has negative power. The lens L12 has concave surfaces at the enlargement and reduction sides. The lens L13 has positive power. The lens L13 has convex surfaces at the enlargement and reduction sides. The lens L12 and the lens L13 are bonded to each other into a cemented doublet L23. The cemented doublet L23 has negative power. The lens L14 has positive power. The lens L14 has convex surfaces at the enlargement and reduction sides.

The seventh lens group G7 is formed of a single lens L15. The lens L15 has positive power. The lens L15 has convex surfaces at the enlargement and reduction sides.

In the projection system 3G, the reduction side of the lens L15 of the seventh lens group G7 forms a telecentric system.

The projection system 3G is a zoom lens having an angle of view that changes between the angle at the wide angle end and the angle at the telephoto end. To change the magnification of the projection system 3G, the first lens group G1 and the seventh lens group G7 are fixed, and the second lens group G2, the third lens group G3, the fourth lens group G4, the fifth lens group G5, and the sixth lens group G6 are moved along the optical axis N. When the magnification is changed from the value at the wide angle end to the value at the telephoto end, the second lens group G2, the third lens group G3, the fourth lens group G4, the fifth lens group G5, and the sixth lens group G6 are each moved along the optical axis N from the reduction side toward the enlargement side. In the present example, the zooming ratio is about 2.08.

Data on the projection system 3G are listed in the table below, in which FNo represents the f number of the projection system 3G, ω represents the half angle of view, Fw represents the focal length of the overall projection system operating at the wide angle end, Ft represents the focal length of the overall projection system operating at the telephoto end, LL represents the overall length of the projection system (distance from object-side surface of lens L1 to reduction-side surface of lens L15), IH represents the largest image height at the liquid crystal panel 18, M represents the projection magnification, Fg1 represents the focal length of the first lens group G1, Fg2 represents the focal length of the second lens group G2, and Fg3 represents the focal length of the third lens group G3.

| | |
|---|---|
| FNo (between wide angle end and telephoto end) | 1.99 to 2.58 |
| ω (between telephoto end and wide angle end) | 19.81° to 37.25° |
| Fw | 22.48 mm |
| Ft | 46.74 mm |
| LL | 148.28 mm |
| IH | 16.85 mm |
| M | 107.90 |
| Fg1 | −31.82 mm |
| Fg2 | 54.01 mm |
| Fg3 | 76.05 mm |

Data on the lenses of the projection system 3G are listed below. The surfaces of the lenses are numbered sequentially from the enlargement side toward the reduction side. Reference characters are given to the screen, the lenses, the dichroic prism, and the liquid crystal panels. An aspheric surface has a surface number followed by *. R represents the radius of curvature. D represents the axial inter-surface spacing. Nd represents the refractive index at the d line. vd represents the Abbe number at the d line. R and D are expressed in millimeters.

| Reference character | Surface number | R | D | Nd | vd |
|---|---|---|---|---|---|
| S | 1 | 1.00E+18 | 2390.000 | | |
| L1 | 2 | 125.915 | 2.000 | 1.6277 | 59.00 |
| | 3 | 36.286 | 0.502 | | |
| L2 | 4* | 18.568 | 3.000 | 1.5350 | 55.71 |
| | 5* | 14.233 | 15.009 | | |
| L3 | 6 | −231.919 | 2.000 | 1.4970 | 81.55 |
| | 7 | 72.737 | Variable spacing 1 | | |

-continued

| Reference character | Surface number | R | D | Nd | vd |
|---|---|---|---|---|---|
| L4 | 8 | 445.598 | 3.339 | 1.7443 | 34.64 |
| | 9 | −240.461 | 0.800 | | |
| L5 | 10 | 65.720 | 8.839 | 1.7681 | 39.84 |
| L6 | 11 | −88.457 | 1.200 | 1.7869 | 23.46 |
| | 12 | −312.433 | Variable spacing 2 | | |
| L7 | 13 | 41.848 | 6.987 | 1.4970 | 81.55 |
| | 14 | −379.140 | Variable spacing 3 | | |
| L8 | 15 | −150.238 | 1.500 | 1.5240 | 70.08 |
| | 16 | 37.195 | Variable spacing 4 | | |
| L9 | 17* | −25.407 | 1.400 | 1.5831 | 59.39 |
| | 18 | −62.451 | 0.986 | | |
| L10 | 19 | 1431.814 | 1.200 | 1.7716 | 24.04 |
| L11 | 20 | 63.162 | 6.687 | 1.4970 | 81.55 |
| | 21 | −21.674 | Variable spacing 5 | | |
| L12 | 22 | −33.338 | 1.200 | 1.7690 | 24.14 |
| L13 | 23 | 56.312 | 5.693 | 1.4970 | 81.55 |
| | 24 | −89.414 | 0.500 | | |
| L14 | 25 | 220.449 | 7.275 | 1.7791 | 23.75 |
| | 26 | −40.467 | Variable spacing 6 | | |
| L15 | 27 | 64.225 | 6.335 | 1.4970 | 81.55 |
| | 28 | −176.120 | 5.100 | | |
| 19 | 29 | 1.00E+18 | 35.540 | 1.5168 | 64.20 |
| | 30 | 1.00E+18 | 10.360 | | |
| 18 | 31 | 1.00E+18 | 0.000 | | |

The table below shows the variable spacings 1, 2, 3, 4, 5, and 6 required for the changes in magnification.

| | Wide angle end | Intermediate position | Telephoto end |
|---|---|---|---|
| Variable spacing 1 | 30.046 | 10.812 | 4.948 |
| Variable spacing 2 | 23.079 | 12.882 | 1.000 |
| Variable spacing 3 | 2.179 | 16.613 | 25.915 |
| Variable spacing 4 | 14.727 | 7.914 | 4.012 |
| Variable spacing 5 | 1.000 | 11.660 | 15.000 |
| Variable spacing 6 | 0.800 | 11.809 | 20.757 |

The aspheric coefficients are listed below.

| Surface number | 4 | 5 | 17 |
|---|---|---|---|
| R | 18.568 | 14.233 | −25.407 |
| Conic constant (K) | −0.857 | −0.930 | 1.968 |
| Fourth-order coefficient | −3.506689E−05 | −4.304864E−05 | 2.914886E−07 |
| Sixth-order coefficient | 4.174401E−08 | 5.571541E−08 | 3.273176E−10 |
| Eighth-order coefficient | −2.775328E−11 | −4.481662E−11 | 4.377748E−10 |
| Tenth-order coefficient | 3.658176E−15 | 1.129537E−14 | −5.020649E−12 |
| Twelfth-order coefficient | 5.401274E−19 | 1.986394E−18 | 4.665867E−14 |
| Fourteenth-order coefficient | 3.648580E−21 | 8.419040E−22 | −1.367595E−16 |
| Sixteenth-order coefficient | 6.878197E−25 | 3.280987E−24 | 9.483554E−29 |
| Eighteenth-order coefficient | 5.831342E−28 | −9.961047E−27 | 0.000000E+00 |
| Twentieth-order coefficient | −4.975566E−30 | 2.461402E−31 | 0.000000E+00 |

The projection system 3G according to the present example satisfies Conditional Expressions (1) to (8), as the projection system 3A according to Example 1 does.

In the present example,

| Fw | 22.48 mm |
|---|---|
| Fg2 | 54.01 mm | are provided. Fg2/Fw=2.40 is therefore achieved, so that Conditional Expression (1) is satisfied.

In the present example,

| Fg1 | −32.82 mm |
|---|---|
| Fg2 | 54.01 mm | are provided. Fg2/Fg1=−1.70 is therefore achieved, so that Conditional Expression (2) is satisfied.

In the present example,

| Fg2 | 54.01 mm |
|---|---|
| Fg3 | 76.05 mm | are provided. Fg2/Fg3=0.71 is therefore achieved, so that Conditional Expression (3) is satisfied.

In the present example,

| Fw | 22.48 mm |
|---|---|
| Ft | 46.74 mm | are provided. Ft/Fw=2.08 is therefore achieved, so that Conditional Expression (4) is satisfied.

In the present example,

| LL | 148.28 mm |
|---|---|
| Dwg12 | 30.05 mm | are provided. Dwg12/LL=0.20 is therefore achieved, so that Conditional Expression (5) is satisfied.

In the present example,

| LL | 148.28 mm |
|---|---|
| Dwg34 | 2.18 mm | are provided. Dwg34/LL=0.01 is therefore achieved, so that Conditional Expression (6) is satisfied.

In the present example,

| LL | 148.28 mm |
|---|---|
| IH | 16.85 mm | are provided. LL/IH=8.80 is therefore achieved, so that Conditional Expression (7) is satisfied.

In the present example, Nd=1.50 to 1.79 is provided, so that Conditional Expression (8) is satisfied.

Effects and Advantages

The second lens group G2 is formed of the following lenses arranged from the enlargement side toward the reduction side: the lens L4, which is a positive lens; the lens L5, which is a positive lens; and the lens L6, which is a negative lens. The projection system 3G according to the present example can therefore provide the same effects and advantages as those provided by the projection system 3A according to Example 1.

The projection system 3G according to the present example, which satisfies Conditional Expressions (1) to (8), can provide the same effects and advantages as those provided by the projection system 3A according to Example 1.

Figure 33:
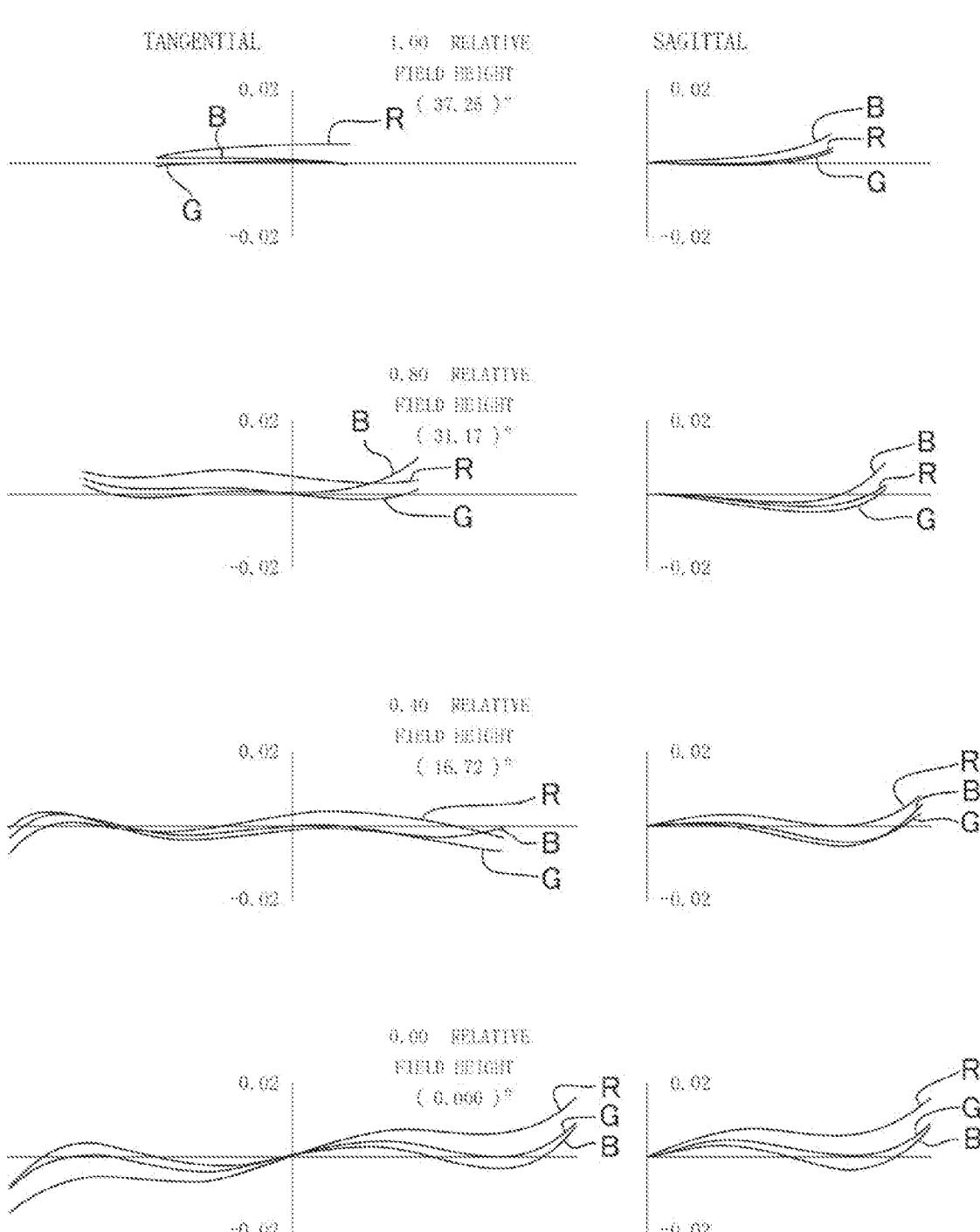
FIG. 33 shows the coma produced by the projection system according to Example 7 operating at the wide angle end.
Figure 34:
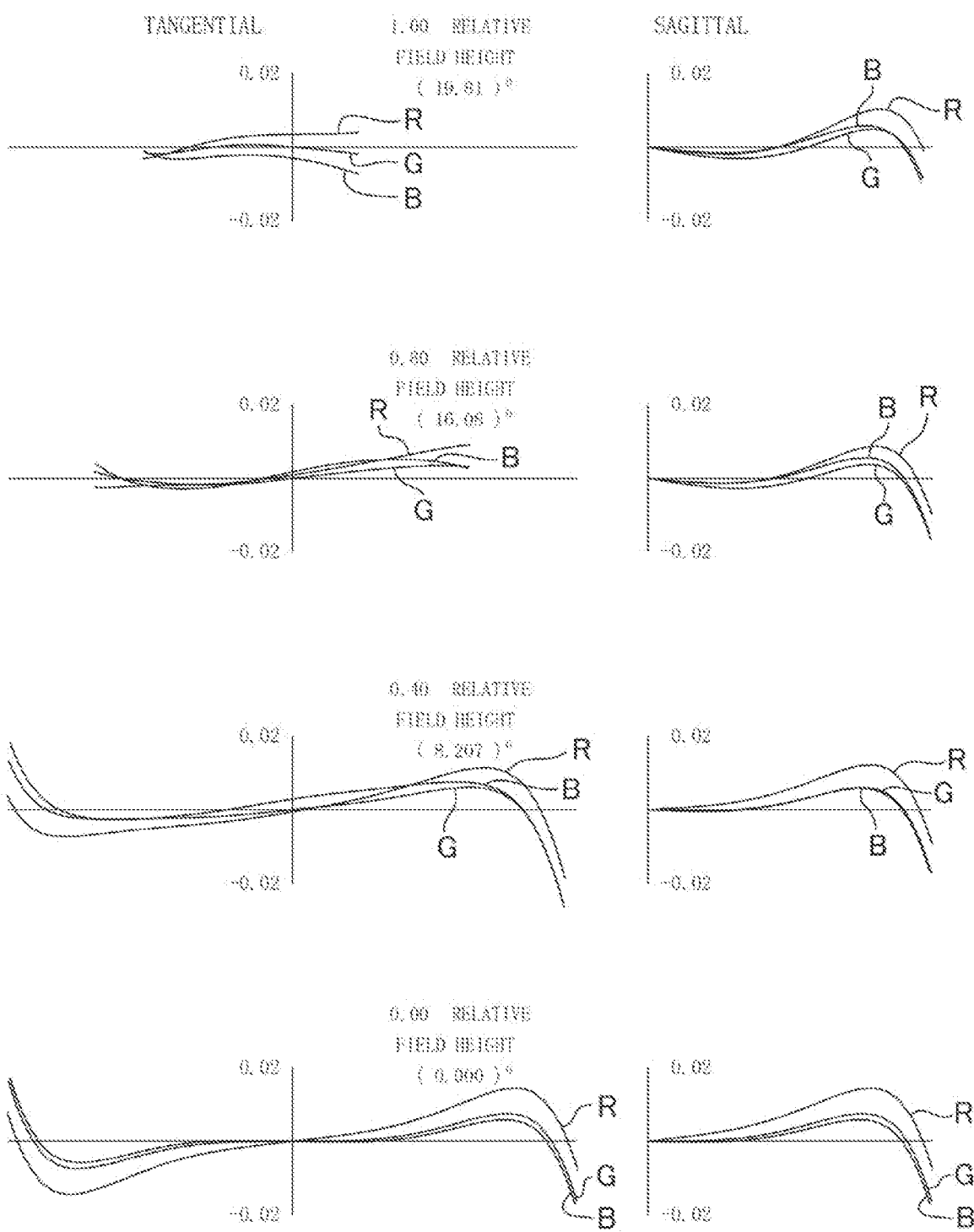
FIG. 34 shows the coma produced by the projection system according to Example 7 operating at the telephoto end.
Figure 35:
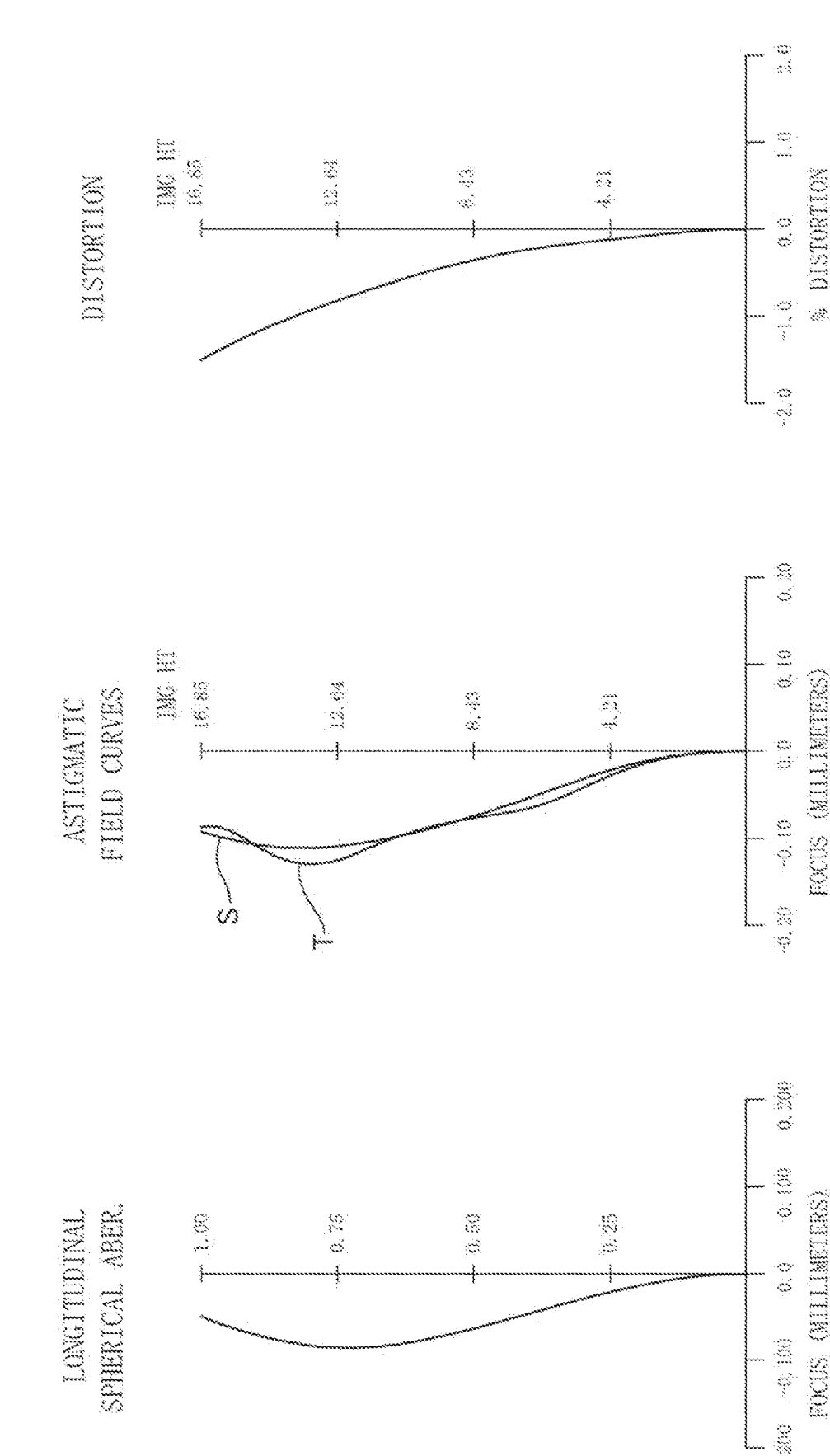
FIG. 35 shows the spherical aberration, astigmatism, and distortion produced by the projection system according to Example 7 operating at the wide angle end.
Figure 36:
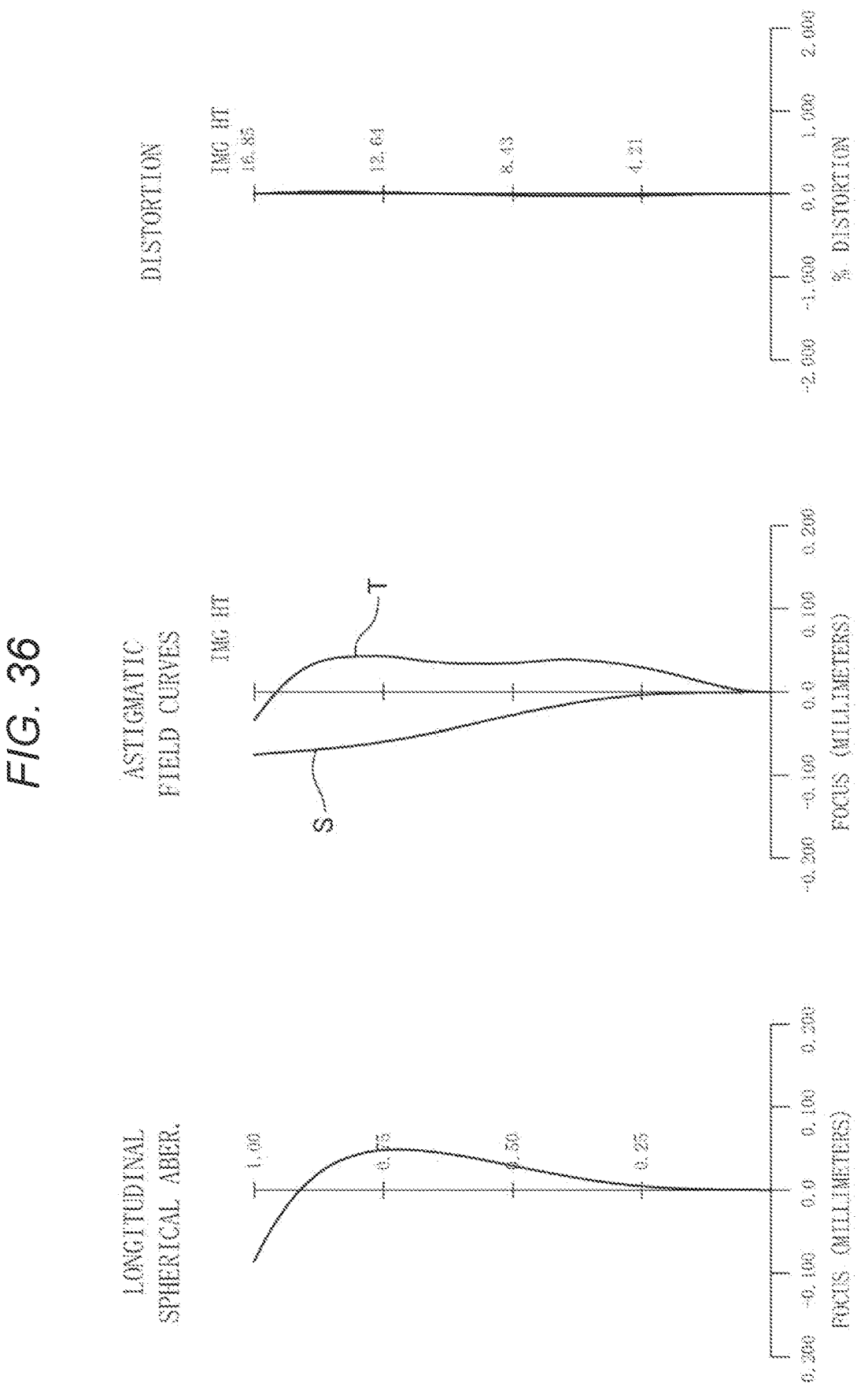
FIG. 36 shows the spherical aberration, astigmatism, and distortion produced by the projection system according to Example 7 operating at the telephoto end.

FIG. 33 shows the coma produced by the projection system 3G operating at the wide angle end. FIG. 34 shows the coma produced by the projection system 3G operating at the telephoto end. FIG. 35 shows the spherical aberration, astigmatism, and distortion produced by the projection system 3G operating at the wide angle end. FIG. 36 shows the spherical aberration, astigmatism, and distortion produced by the projection system 3G operating at the telephoto end. The projection system 3G according to the present example suppresses the variety of aberrations, as shown in FIGS. 33 to 36.

Example 8

Figure 37:
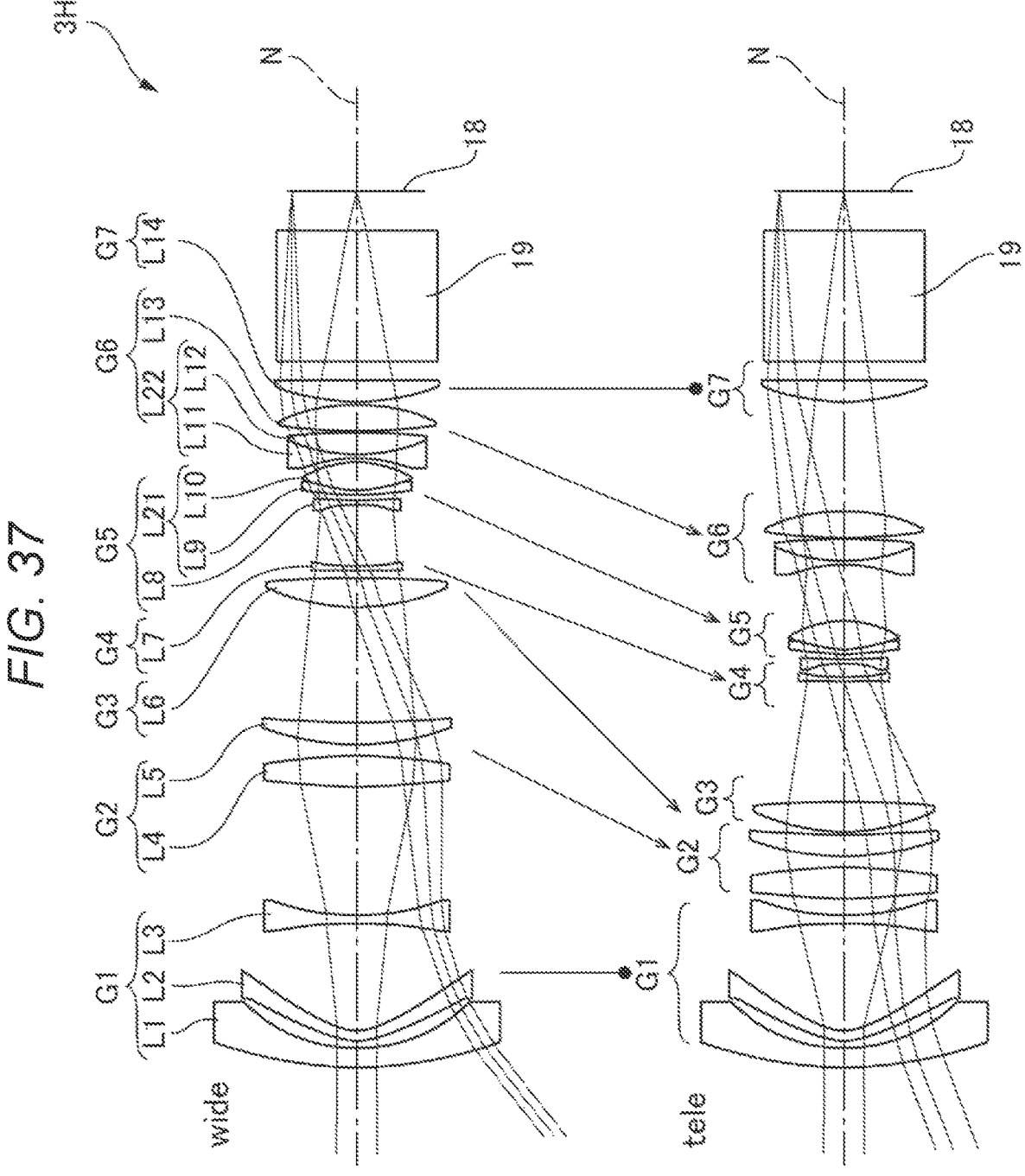
FIG. 37 is a beam diagram showing beams passing through the projection system according to Example 8.

FIG. 37 is a beam diagram showing beams passing through a projection system 3H according to Example 8. The projection system 3H includes a first lens group G1 having negative power, a second lens group G2 having positive power, a third lens group G3 having positive power, a fourth lens group G4 having negative power, a fifth lens group G5 having positive power, a sixth lens group G6 having positive power, and a seventh lens group G7 having positive power sequentially arranged from the enlargement side toward the reduction side, as shown in FIG. 37.

The first lens group G1 is formed of three lenses L1 to L3. The lenses L1 to L3 are arranged in this order from the enlargement side toward the reduction side. The lens L1 has negative power. The lens L1 is a meniscus lens. The lens L1 has a convex surface at the enlargement side and a concave surface at the reduction side. The lens L2 is made of resin. The lens L2 has negative power. The lens L2 has a convex surface at the enlargement side and a concave surface at the reduction side. The lens L2 has aspheric surfaces at the enlargement and reduction sides. The lens L3 has negative power. The lens L3 has concave surfaces at the enlargement and reduction sides.

The second lens group G2 is formed of two lenses L4 and L5. The lenses L4 and L5 are arranged in this order from the enlargement side toward the reduction side. The lens L4 has positive power. The lens L4 has convex surfaces at the enlargement and reduction sides. The lens L5 has positive power. The lens L5 is a meniscus lens. The lens L5 has a convex surface at the enlargement side and a concave surface at the reduction side.

The third lens group G3 is formed of a single lens L6. The lens L6 has positive power. The lens L6 has convex surfaces at the enlargement and reduction sides. The fourth lens group G4 is formed of a single lens L7. The lens L7 has negative power. The lens L7 has concave surfaces at the enlargement and reduction sides.

The fifth lens group G5 is formed of three lenses L8 to L10. The lenses L8 to L10 are arranged in this order from the enlargement side toward the reduction side. The lens L8 is made of glass. The lens L8 has negative power. The lens L8 has concave surfaces at the enlargement and reduction sides. The lens L8 has an aspheric surface at the enlargement side. The lens L9 has negative power. The lens L9 is a meniscus lens. The lens L9 has a convex surface at the enlargement side and a concave surface at the reduction side. The lens L10 has positive power. The lens L10 has convex surfaces at the enlargement and reduction sides. The lens L9 and the lens L10 are bonded to each other into a cemented doublet L21. The cemented doublet L21 has positive power.

The sixth lens group G6 is formed of three lenses L11 to L13. The lenses L11 to L13 are arranged in this order from the enlargement side toward the reduction side. The lens L11 has negative power. The lens L11 has concave surfaces at the enlargement and reduction sides. The lens L12 has positive power. The lens L12 has convex surfaces at the enlargement and reduction sides. The lens L11 and the lens L12 are bonded to each other into a cemented doublet L22. The cemented doublet L22 has negative power. The lens L13 has positive power. The lens L13 has convex surfaces at the enlargement and reduction sides.

The seventh lens group G7 is formed of a single lens L14. The lens L14 has positive power. The lens L14 has convex surfaces at the enlargement and reduction sides.

In the projection system 3H, the reduction side of the lens L14 of the seventh lens group G7 forms a telecentric system.

The projection system 3H is a zoom lens having an angle of view that changes between the angle at the wide angle end and the angle at the telephoto end. To change the magnification of the projection system 3H, the first lens group G1 and the seventh lens group G7 are fixed, and the second lens group G2, the third lens group G3, the fourth lens group G4, the fifth lens group G5, and the sixth lens group G6 are moved along the optical axis N. When the magnification is changed from the value at the wide angle end to the value at the telephoto end, the second lens group G2, the third lens group G3, the fourth lens group G4, the fifth lens group G5, and the sixth lens group G6 are each moved along the optical axis N from the reduction side toward the enlargement side. In the present example, the zooming ratio is about 2.08.

Data on the projection system 3H are listed in the table below, in which FNo represents the f number of the projection system 3H, ω represents the half angle of view, Fw represents the focal length of the overall projection system operating at the wide angle end, Ft represents the focal length of the overall projection system operating at the telephoto end, LL represents the overall length of the projection system (distance from object-side surface of lens L1 to reduction-side surface of lens L14), IH represents the largest image height at the liquid crystal panel 18, M represents the projection magnification, Fg1 represents the focal length of the first lens group G1, Fg2 represents the focal length of the second lens group G2, and Fg3 represents the focal length of the third lens group G3.

| | |
|---|---|
| FNo (between wide angle end and telephoto end) | 2.07 to 2.93 |
| ω (between telephoto end and wide angle end) | 19.93° to 37.23° |
| Fw | 22.48 mm |
| Ft | 46.74 mm |
| LL | 185.35 mm |
| IH | 16.85 mm |
| M | 108.32 |
| Fg1 | −29.40 mm |
| Fg2 | 56.25 mm |
| Fg3 | 94.64 mm |

Data on the lenses of the projection system 3H are listed below. The surfaces of the lenses are numbered sequentially from the enlargement side toward the reduction side. Reference characters are given to the screen, the lenses, the dichroic prism, and the liquid crystal panels. An aspheric surface has a surface number followed by *. R represents the radius of curvature. D represents the axial inter-surface spacing. Nd represents the refractive index at the d line. vd represents the Abbe number at the d line. R and D are expressed in millimeters.

| Reference character | Surface number | R | D | Nd | vd |
|---|---|---|---|---|---|
| S | 1 | 1.00E+18 | 2390.000 | | |
| L1 | 2 | 104.962 | 5.000 | 1.6295 | 58.68 |
| | 3 | 39.581 | 2.011 | | |
| L2 | 4* | 16.500 | 2.778 | 1.5350 | 55.71 |
| | 5* | 13.103 | 29.195 | | |
| L3 | 6 | −112.551 | 2.000 | 1.4970 | 81.55 |
| | 7 | 65.032 | Variable spacing 1 | | |
| L4 | 8 | 173.671 | 8.366 | 1.6821 | 51.70 |
| | 9 | −123.707 | 3.149 | | |
| L5 | 10 | 66.777 | 5.882 | 1.7950 | 43.00 |
| | 11 | 237.534 | Variable spacing 2 | | |

-continued

| Reference character | Surface number | R | D | Nd | vd |
|---|---|---|---|---|---|
| L6 | 12 | 57.059 | 8.043 | 1.4970 | 81.55 |
| | 13 | −259.062 | Variable spacing 3 | | |
| L7 | 14 | −294.992 | 1.200 | 1.7609 | 24.30 |
| | 15 | 70.788 | Variable spacing 4 | | |
| L8 | 16* | −34.025 | 1.400 | 1.5831 | 59.39 |
| | 17 | 210.141 | 1.374 | | |
| L9 | 18 | 94.532 | 1.200 | 1.5747 | 42.49 |
| L10 | 19 | 36.520 | 7.617 | 1.4970 | 81.55 |
| | 20 | −24.355 | Variable spacing 5 | | |
| L11 | 21 | −39.460 | 1.200 | 1.7600 | 24.86 |
| L12 | 22 | 44.268 | 5.677 | 1.4970 | 81.55 |
| | 23 | −176.040 | 0.500 | | |
| L13 | 24 | 120.279 | 6.995 | 1.7950 | 23.00 |
| | 25 | −47.581 | Variable spacing 6 | | |
| L14 | 26 | 54.320 | 5.817 | 1.4970 | 81.55 |
| | 27 | 981.909 | 5.100 | | |

-continued

| Reference character | Surface number | R | D | Nd | vd |
|---|---|---|---|---|---|
| 19 | 28 | 1.00E+18 | 35.540 | 1.5168 | 64.20 |
| | 29 | 1.00E+18 | 10.360 | | |
| 18 | 30 | 1.00E+18 | 0.000 | | |

The table below shows the variable spacings 1, 2, 3, 4, 5, and 6 required for the changes in magnification.

| | Wide angle end | Intermediate position | Telephoto end |
|---|---|---|---|
| Variable spacing 1 | 34.755 | 11.267 | 4.630 |
| Variable spacing 2 | 31.060 | 20.844 | 1.000 |
| Variable spacing 3 | 1.936 | 21.217 | 32.549 |
| Variable spacing 4 | 16.396 | 3.219 | 3.241 |
| Variable spacing 5 | 1.000 | 13.120 | 15.000 |
| Variable spacing 6 | 0.800 | 16.158 | 29.353 |

The aspheric coefficients are listed below.

| Surface number | 4 | 5 | 16 |
|---|---|---|---|
| R | 16.500 | 13.103 | −34.025 |
| Conic constant (K) | −1.306 | −1.414 | −7.273 |
| Fourth-order coefficient | −3.942850E−05 | −3.689550E−05 | −3.531360E−05 |
| Sixth-order coefficient | 5.706900E−08 | 6.458590E−08 | 1.477430E−08 |
| Eighth-order coefficient | −3.053840E−11 | −5.205420E−11 | 3.209070E−10 |
| Tenth-order coefficient | −1.743140E−14 | 5.871140E−15 | −6.309160E−12 |
| Twelfth-order coefficient | 1.629470E−17 | −4.743990E−19 | 4.665870E−14 |
| Fourteenth-order coefficient | 2.377640E−20 | 1.744910E−20 | −1.367590E−16 |
| Sixteenth-order coefficient | −1.985210E−23 | 4.192520E−23 | 1.825970E−28 |
| Eighteenth-order coefficient | −1.483160E−26 | −1.110950E−25 | 0.000000E+00 |
| Twentieth-order coefficient | 1.367550E−29 | 6.329790E−29 | 0.000000E+00 |

The projection system 3H according to the present example satisfies Conditional Expressions (1) to (8), as the projection system 3A according to Example 1 does.

In the present example,

| | |
|---|---|
| Fw | 22.48 mm |
| Fg2 | 56.25 mm | are provided. Fg2/Fw=2.50 is therefore achieved, so that Conditional Expression (1) is satisfied.

In the present example,

| | |
|---|---|
| Fg1 | −29.40 mm |
| Fg2 | 56.25 mm | are provided. Fg2/Fg1=−1.91 is therefore achieved, so that Conditional Expression (2) is satisfied.

In the present example,

| | |
|---|---|
| Fg2 | 56.25 mm |
| Fg3 | 94.64 mm | are provided. Fg2/Fg3=0.59 is therefore achieved, so that Conditional Expression (3) is satisfied.

In the present example,

| | |
|---|---|
| Fw | 22.48 mm |
| Ft | 46.74 mm | are provided. Ft/Fw=2.08 is therefore achieved, so that Conditional Expression (4) is satisfied.

In the present example,

| | |
|---|---|
| LL | 185.35 mm |
| Dwg12 | 34.75 mm | are provided. Dwg12/LL=0.19 is therefore achieved, so that Conditional Expression (5) is satisfied.

In the present example,

| | |
|---|---|
| LL | 185.35 mm |
| Dwg34 | 1.94 mm | are provided. Dwg34/LL=0.01 is therefore achieved, so that Conditional Expression (6) is satisfied.

In the present example,

| | |
|---|---|
| LL | 185.35 mm |
| IH | 16.85 mm | are provided. LL/IH=11.00 is therefore achieved, so that Conditional Expression (7) is satisfied.

In the present example, Nd=1.50 to 1.80 is provided, so that Conditional Expression (8) is satisfied.

Effects and Advantages

The projection system 3H according to the present example, which satisfies Conditional Expressions (1) to (8), can provide the same effects and advantages as those provided by the projection system 3A according to Example 1.

Figure 38:
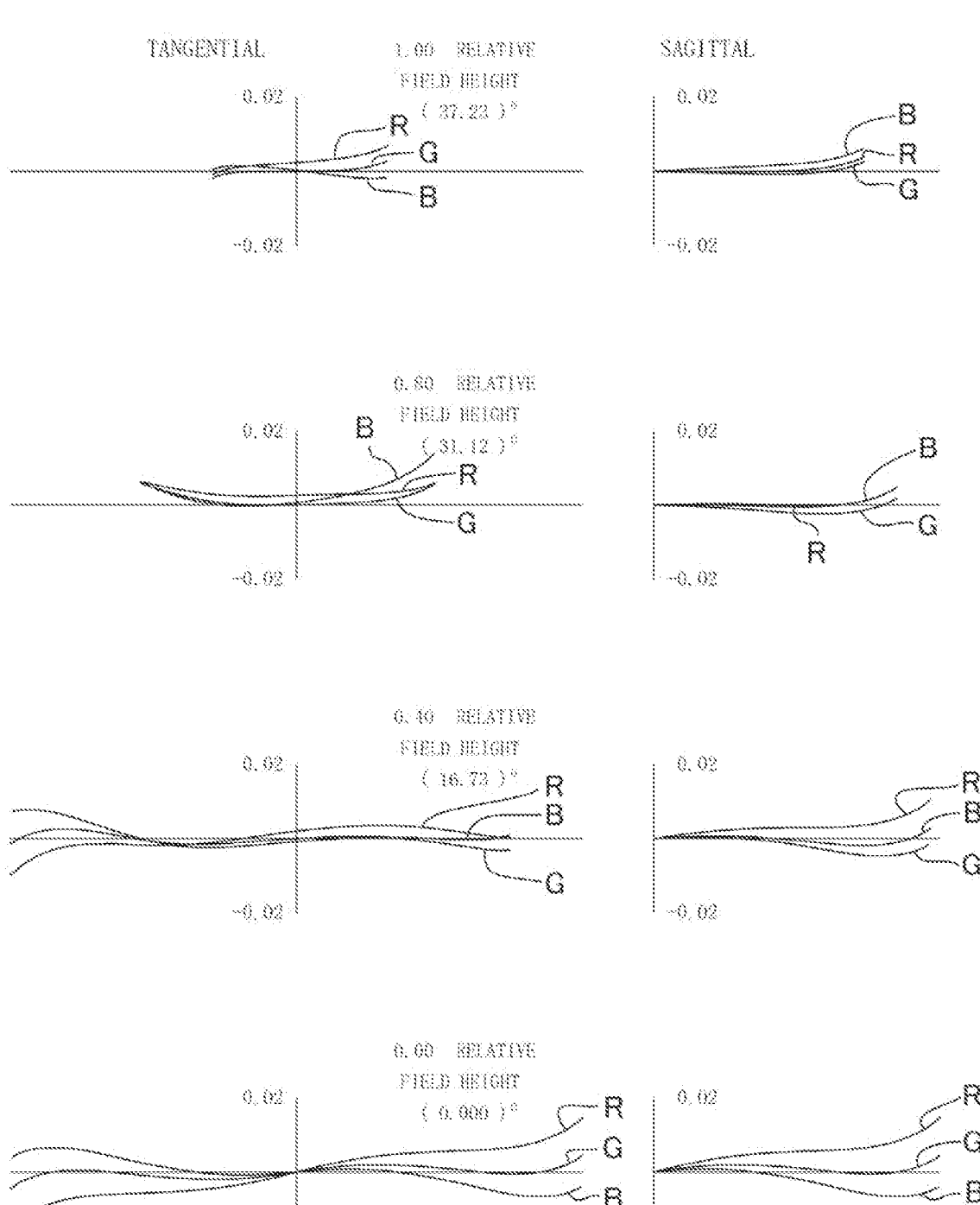
FIG. 38 shows the coma produced by the projection system according to Example 8 operating at the wide angle end.
Figure 39:
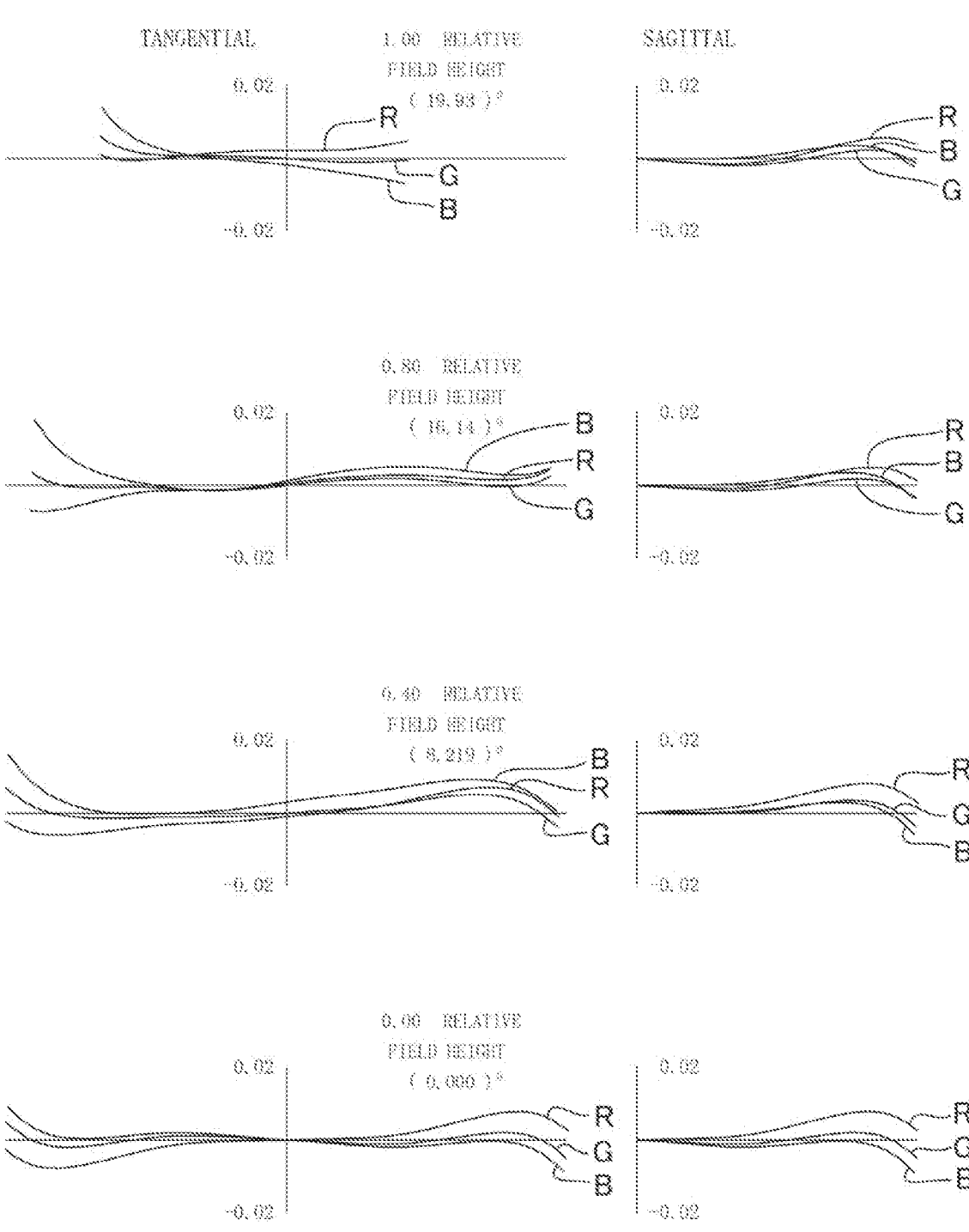
FIG. 39 shows the coma produced by the projection system according to Example 8 operating at the telephoto end.
Figure 40:
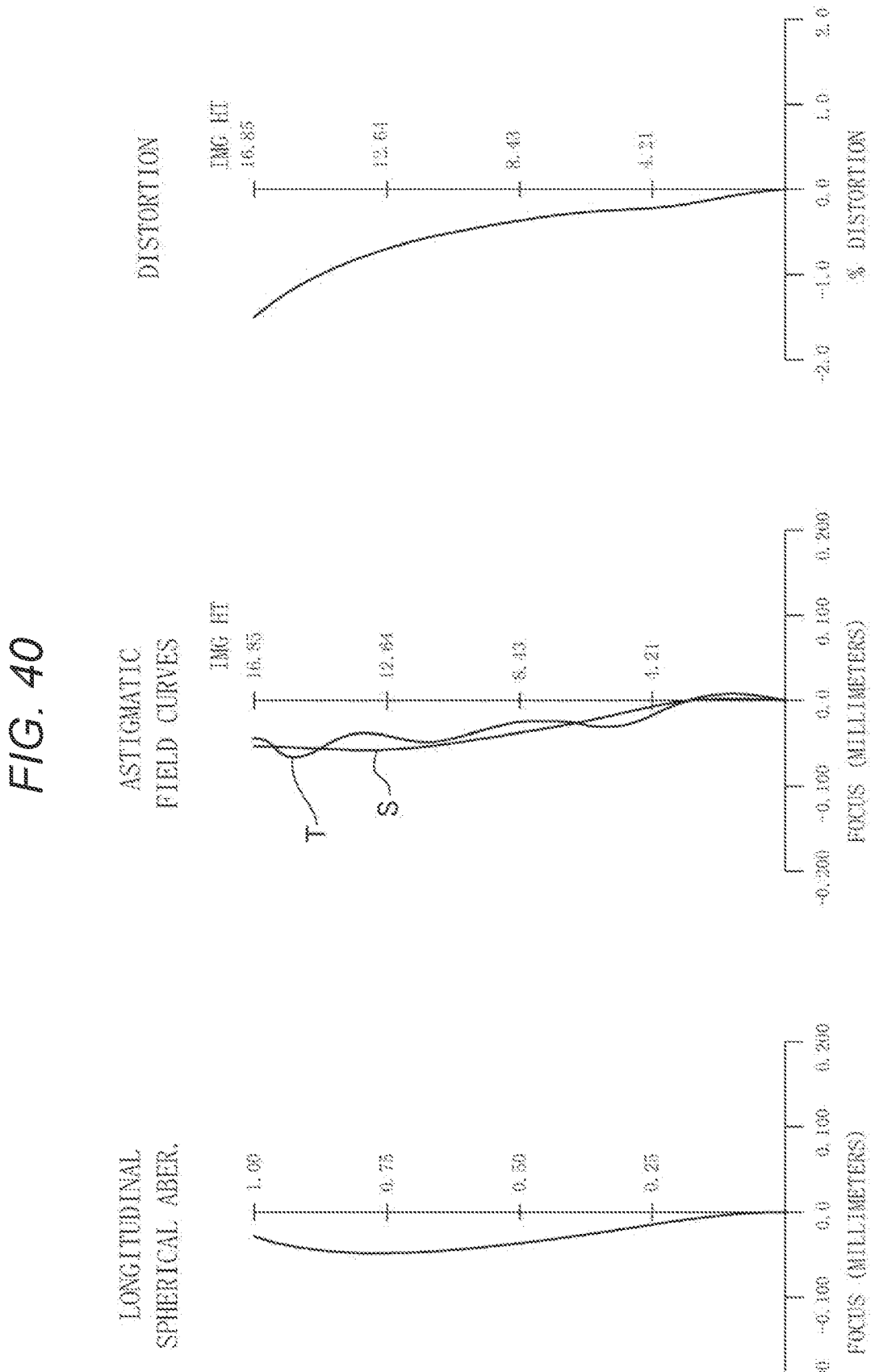
FIG. 40 shows the spherical aberration, astigmatism, and distortion produced by the projection system according to Example 8 operating at the wide angle end.
Figure 41:
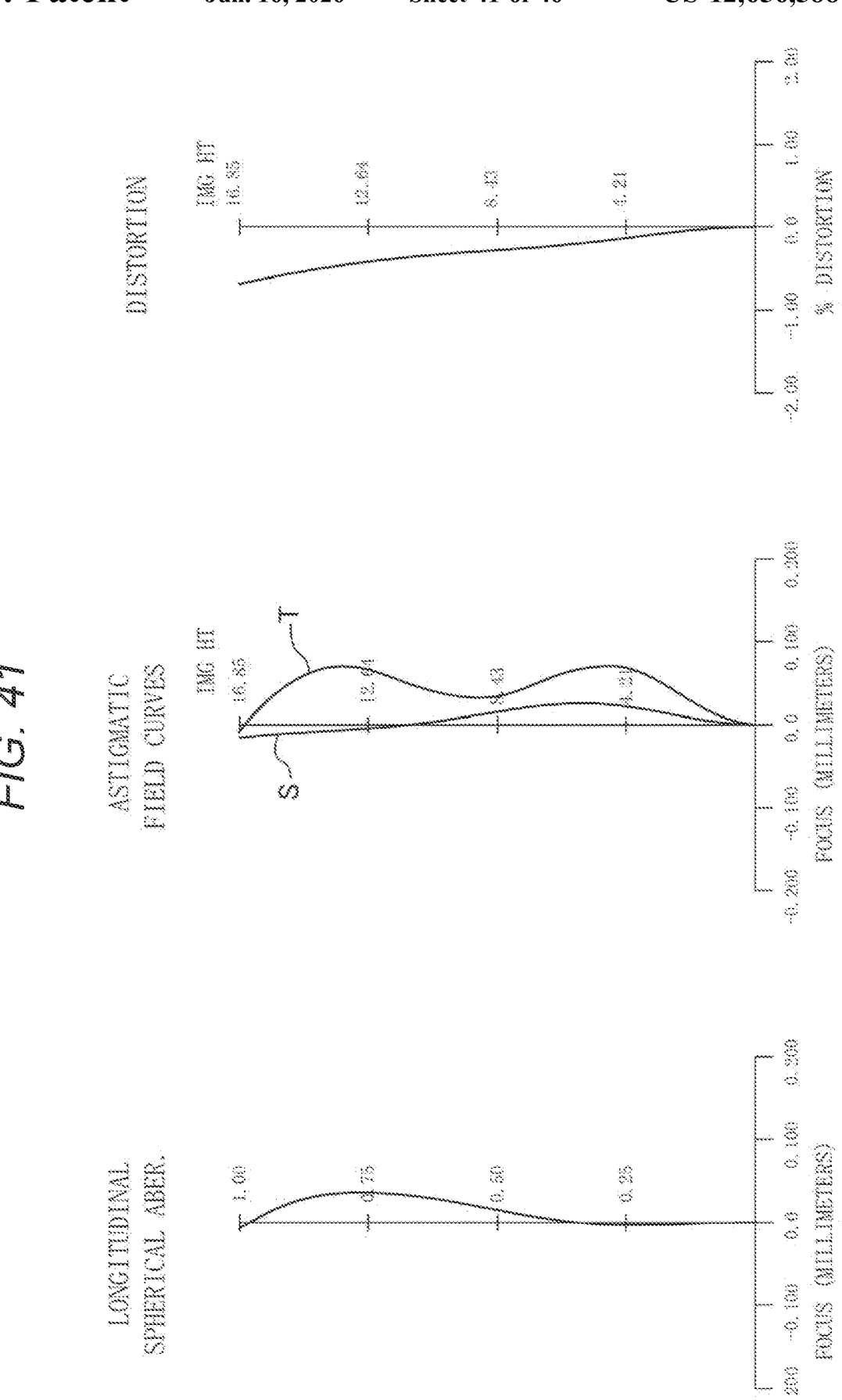
FIG. 41 shows the spherical aberration, astigmatism, and distortion produced by the projection system according to Example 8 operating at the telephoto end.

FIG. 38 shows the coma produced by the projection system 3H operating at the wide angle end. FIG. 39 shows the coma produced by the projection system 3H operating at the telephoto end. FIG. 40 shows the spherical aberration, astigmatism, and distortion produced by the projection system 3H operating at the wide angle end. FIG. 41 shows the spherical aberration, astigmatism, and distortion produced by the projection system 3H operating at the telephoto end. The projection system 3H according to the present example suppresses the variety of aberrations, as shown in FIGS. 38 to 41.

Example 9

Figure 42:
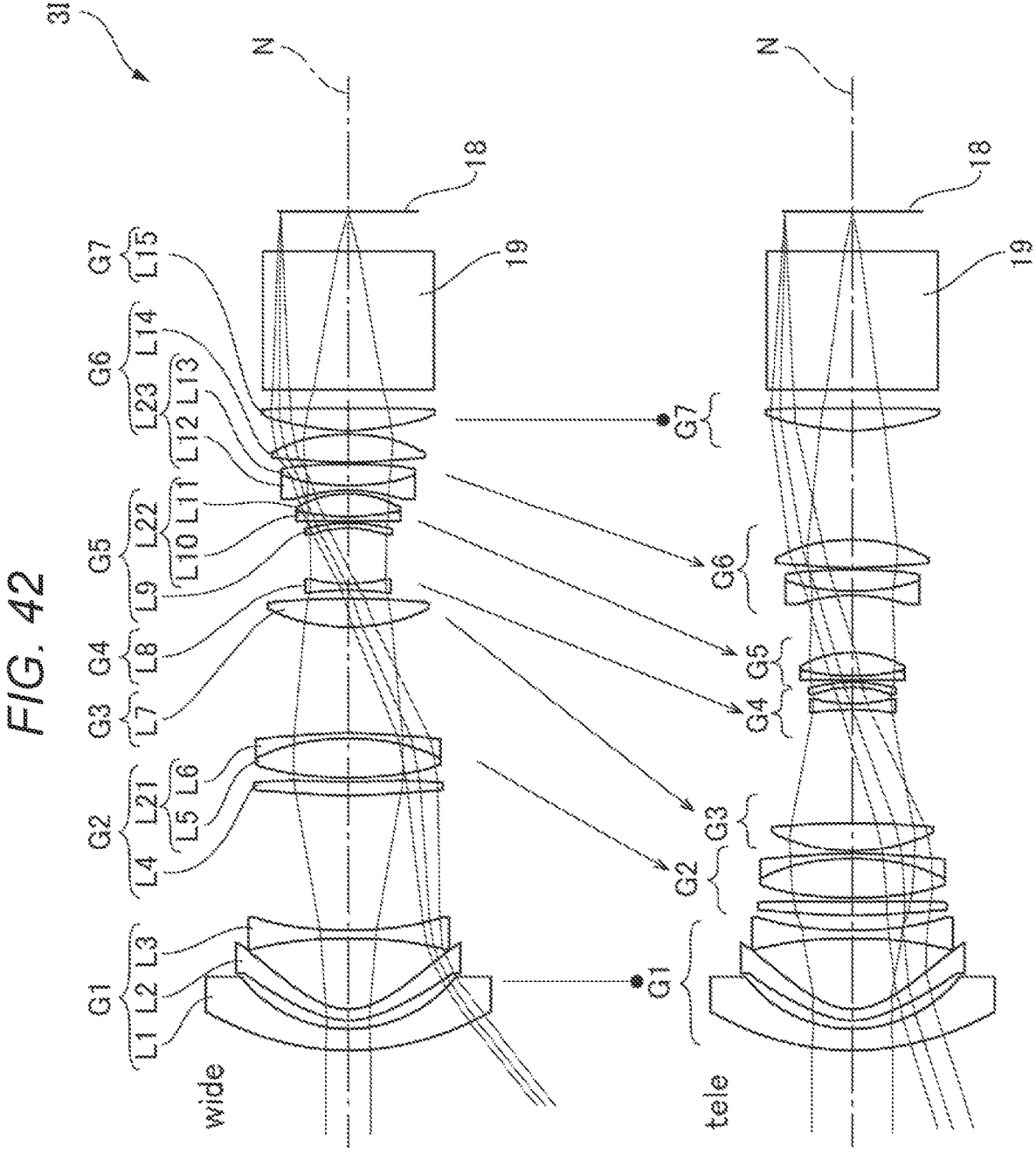
FIG. 42 is a beam diagram showing beams passing through the projection system according to Example 9.

FIG. 42 is a beam diagram showing beams passing through a projection system 3I according to Example 9. The projection system 3I includes a first lens group G1 having negative power, a second lens group G2 having positive power, a third lens group G3 having positive power, a fourth lens group G4 having negative power, a fifth lens group G5 having positive power, a sixth lens group G6 having positive power, and a seventh lens group G7 having positive power sequentially arrange from the enlargement side toward the reduction side, as shown in FIG. 42.

The first lens group G1 is formed of three lenses L1 to L3. The lenses L1 to L3 are arranged in this order from the enlargement side toward the reduction side. The lens L1 has negative power. The lens L1 is a meniscus lens. The lens L1 has a convex surface at the enlargement side and a concave surface at the reduction side. The lens L2 is made of resin. The lens L2 has negative power. The lens L2 has a convex surface at the enlargement side and a concave surface at the reduction side. The lens L2 has aspheric surfaces at the enlargement and reduction sides. The lens L3 has negative power. The lens L3 has concave surfaces at the enlargement and reduction sides.

The second lens group G2 is formed of three lenses L4 to L6. The lenses L4 to L6 are arranged in this order from the enlargement side toward the reduction side. The lens L4 has positive power. The lens L4 has convex surfaces at the enlargement and reduction sides. The lens L5 has positive power. The lens L5 has convex surfaces at the enlargement and reduction sides. The lens L6 has negative power. The lens L6 is a meniscus lens. The lens L6 has a concave surface at the enlargement side and a convex surface at the reduction side. The lens L5 and the lens L6 are bonded to each other into a cemented doublet L21. The cemented doublet L21 has positive power.

The third lens group G3 is formed of a single lens L7. The lens L7 has positive power. The lens L7 has convex surfaces at the enlargement and reduction sides. The fourth lens group G4 is formed of a single lens L8. The lens L8 has negative power. The lens L8 has concave surfaces at the enlargement and reduction sides.

The fifth lens group G5 is formed of three lenses L9 to L11. The lenses L9 to L11 are arranged in this order from the enlargement side toward the reduction side. The lens L9 is made of glass. The lens L9 has negative power. The lens L9 is a meniscus lens. The lens L9 has a concave surface at the enlargement side and a convex surface at the reduction side. The lens L9 has an aspheric surface at the enlargement side. The lens L10 has negative power. The lens L10 is a meniscus lens. The lens L10 has a convex surface at the enlargement side and a concave surface at the reduction side. The lens L11 has positive power. The lens L11 has convex surfaces at the enlargement and reduction sides. The lens L10 and the lens L11 are bonded to each other into a cemented doublet L22. The cemented doublet L22 has positive power.

The sixth lens group G6 is formed of three lenses L12 to L14. The lenses L12 to L14 are arranged in this order from the enlargement side toward the reduction side. The lens L12 has negative power. The lens L12 has concave surfaces at the enlargement and reduction sides. The lens L13 has positive power. The lens L13 has convex surfaces at the enlargement and reduction sides. The lens L12 and the lens L13 are bonded to each other into a cemented doublet L23. The cemented doublet L23 has negative power. The lens L14 has positive power. The lens L14 has convex surfaces at the enlargement and reduction sides.

The seventh lens group G7 is formed of a single lens L15. The lens L15 has positive power. The lens L15 has convex surfaces at the enlargement and reduction sides.

In the projection system 3I, the reduction side of the lens L15 of the seventh lens group G7 forms a telecentric system.

The projection system 3I is a zoom lens having an angle of view that changes between the angle at the wide angle end and the angle at the telephoto end. To change the magnification of the projection system 3I, the first lens group G1 and the seventh lens group G7 are fixed, and the second lens group G2, the third lens group G3, the fourth lens group G4, the fifth lens group G5, and the sixth lens group G6 are moved along the optical axis N. When the magnification is changed from the value at the wide angle end to the value at the telephoto end, the second lens group G2, the third lens group G3, the fourth lens group G4, the fifth lens group G5, and the sixth lens group G6 are each moved along the optical axis N from the reduction side toward the enlargement side. In the present example, the zooming ratio is about 2.42

Data on the projection system 3I are listed in the table below, in which FNo represents the f number of the projection system 3I, $\omega$ represents the half angle of view, Fw represents the focal length of the overall projection system operating at the wide angle end, Ft represents the focal length of the overall projection system operating at the telephoto end, LL represents the overall length of the projection system (distance from object-side surface of lens L1 to reduction-side surface of lens L15), IH represents the largest image height at the liquid crystal panel 18, M represents the projection magnification, Fg1 represents the focal length of the first lens group G1, Fg2 represents the focal length of the second lens group G2, and Fg3 represents the focal length of the third lens group G3.

| | |
|---|---|
| FNo (between wide angle end and telephoto end) | 2.02 to 2.73 |
| $\omega$ (between telephoto end and wide angle end) | 17.18° to 37.22° |
| Fw | 22.48 mm |
| Ft | 54.40 mm |
| LL | 166.10 mm |
| IH | 16.85 mm |
| M | 108.31 |
| Fg1 | −33.03 mm |
| Fg2 | 55.00 mm |
| Fg3 | 74.44 mm |

Data on the lenses of the projection system 3I are listed below. The surfaces of the lenses are numbered sequentially from the enlargement side toward the reduction side. Reference characters are given to the screen, the lenses, the dichroic prism, and the liquid crystal panels. An aspheric surface has a surface number followed by *. R represents the radius of curvature. D represents the axial inter-surface spacing. Nd represents the refractive index at the d line. vd represents the Abbe number at the d line. R and D are expressed in millimeters.

| Reference character | Surface number | R | D | Nd | vd |
|---|---|---|---|---|---|
| S | 1 | 1.00E+18 | 2390.000 | | |
| L1 | 2 | 66.254 | 5.600 | 1.6100 | 59.74 |
| | 3 | 32.958 | 2.178 | | |
| L2 | 4* | 17.900 | 3.000 | 1.5350 | 55.71 |
| | 5* | 13.819 | 18.288 | | |
| L3 | 6 | −95.156 | 2.000 | 1.4970 | 81.55 |
| | 7 | 79.901 | Variable spacing 1 | | |
| L4 | 8 | 189.148 | 3.735 | 1.7515 | 30.87 |
| | 9 | −993.547 | 0.800 | | |
| L5 | 10 | 80.702 | 10.271 | 1.7685 | 39.44 |
| L6 | 11 | −52.087 | 1.200 | 1.7762 | 23.86 |
| | 12 | −168.904 | Variable spacing 2 | | |
| L7 | 13 | 43.353 | 7.073 | 1.4970 | 81.55 |
| | 14 | −242.963 | Variable spacing 3 | | |
| L8 | 15 | −54.571 | 1.500 | 1.5482 | 69.89 |
| | 16 | 39.536 | Variable spacing 4 | | |
| L9 | 17* | −27.471 | 1.400 | 1.5831 | 59.39 |
| | 18 | −37.612 | 0.436 | | |
| L10 | 19 | 1970.747 | 1.200 | 1.7395 | 29.07 |
| L11 | 20 | 59.286 | 5.937 | 1.4970 | 81.55 |
| | 21 | −26.069 | Variable spacing 5 | | |
| L12 | 22 | −37.518 | 1.200 | 1.7673 | 24.21 |
| L13 | 23 | 50.454 | 5.436 | 1.4970 | 81.55 |
| | 24 | −117.153 | 0.500 | | |
| L14 | 25 | 153.150 | 7.349 | 1.7546 | 25.12 |
| | 26 | −39.987 | Variable spacing 6 | | |
| L15 | 27 | 54.480 | 5.807 | 1.4970 | 81.55 |
| | 28 | −1037.188 | 5.100 | | |
| 19 | 29 | 1.00E+18 | 35.540 | 1.5168 | 64.20 |
| | 30 | 1.00E+18 | 10.360 | | |
| 18 | 31 | 1.00E+18 | 0.000 | | |

The table below shows the variable spacings 1, 2, 3, 4, 5, and 6 required for the changes in magnification.

| | Wide angle end | Intermediate position | Telephoto end |
|---|---|---|---|
| Variable spacing 1 | 34.970 | 10.565 | 3.712 |
| Variable spacing 2 | 27.429 | 13.789 | 1.000 |
| Variable spacing 3 | 2.637 | 18.571 | 29.424 |
| Variable spacing 4 | 14.357 | 9.837 | 3.896 |
| Variable spacing 5 | 1.000 | 13.049 | 15.000 |
| Variable spacing 6 | 0.800 | 15.384 | 28.161 |

The aspheric coefficients are listed below.

| Surface number | 4 | 5 | 17 |
|---|---|---|---|
| R | 17.900 | 13.819 | −27.471 |
| Conic constant (K) | −0.983 | −0.884 | 1.010 |

-continued

| Surface number | 4 | 5 | 17 |
|---|---|---|---|
| Fourth-order coefficient | −2.878768E−05 | −3.945656E−05 | −1.780601E−06 |
| Sixth-order coefficient | 3.205886E−08 | 3.969740E−08 | 3.916756E−10 |
| Eighth-order coefficient | −2.237895E−11 | −3.344213E−11 | 2.053676E−10 |
| Tenth-order coefficient | 9.727985E−15 | 1.038922E−14 | −5.221844E−12 |
| Twelfth-order coefficient | −3.702736E−18 | −5.244096E−18 | 4.665867E−14 |
| Fourteenth-order coefficient | −2.171330E−21 | 1.550085E−20 | −1.367594E−16 |
| Sixteenth-order coefficient | 2.479903E−24 | 2.339581E−23 | 9.456911E−29 |
| Eighteenth-order coefficient | 1.342193E−26 | −6.338022E−26 | 0.000000E+00 |
| Twentieth-order coefficient | −1.597831E−29 | 1.081227E−29 | 0.000000E+00 |

The projection system 3I according to the present example satisfies Conditional Expressions (1) to (8), as the projection system 3A according to Example 1 does.

In the present example,

| Fw | 22.48 mm |
|---|---|
| Fg2 | 55.00 mm | are provided. Fg2/Fw=2.45 is therefore achieved, so that Conditional Expression (1) is satisfied.

In the present example,

| Fg1 | −33.03 mm |
|---|---|
| Fg2 | 55.00 mm | are provided. Fg2/Fg1=−1.67 is therefore achieved, so that Conditional Expression (2) is satisfied.

In the present example,

| Fg2 | 55.00 mm |
|---|---|
| Fg3 | 74.44 mm | are provided. Fg2/Fg3=0.74 is therefore achieved, so that Conditional Expression (3) is satisfied.

In the present example,

| Fw | 22.48 mm |
|---|---|
| Ft | 54.40 mm | are provided. Ft/Fw=2.42 is therefore achieved, so that Conditional Expression (4) is satisfied.

In the present example,

| LL | 166.10 mm |
|---|---|
| Dwg12 | 34.97 mm | are provided. Dwg12/LL=0.21 is therefore achieved, so that Conditional Expression (5) is satisfied.

In the present example,

| LL | 166.10 mm |
|---|---|
| Dwg34 | 2.64 mm | are provided. Dwg34/LL=0.02 is therefore achieved, so that Conditional Expression (6) is satisfied.

In the present example,

| LL | 166.10 mm |
|---|---|
| IH | 16.85 mm | are provided. LL/IH=9.86 is therefore achieved, so that Conditional Expression (7) is satisfied.

In the present example, Nd=1.50 to 1.78 is provided, so that Conditional Expression (8) is satisfied.

Effects and Advantages

The second lens group G2 is formed of the following lenses arranged from the enlargement side toward the reduction side: the lens L4, which is a positive lens; the lens L5, which is a positive lens; and the lens L6, which is a negative lens. The projection system 3I according to the present example can therefore provide the same effects and advantages as those provided by the projection system 3A according to Example 1.

The projection system 3I according to the present example, which satisfies Conditional Expressions (1) to (8), can provide the same effects and advantages as those provided by the projection system 3A according to Example 1.

Figure 43:
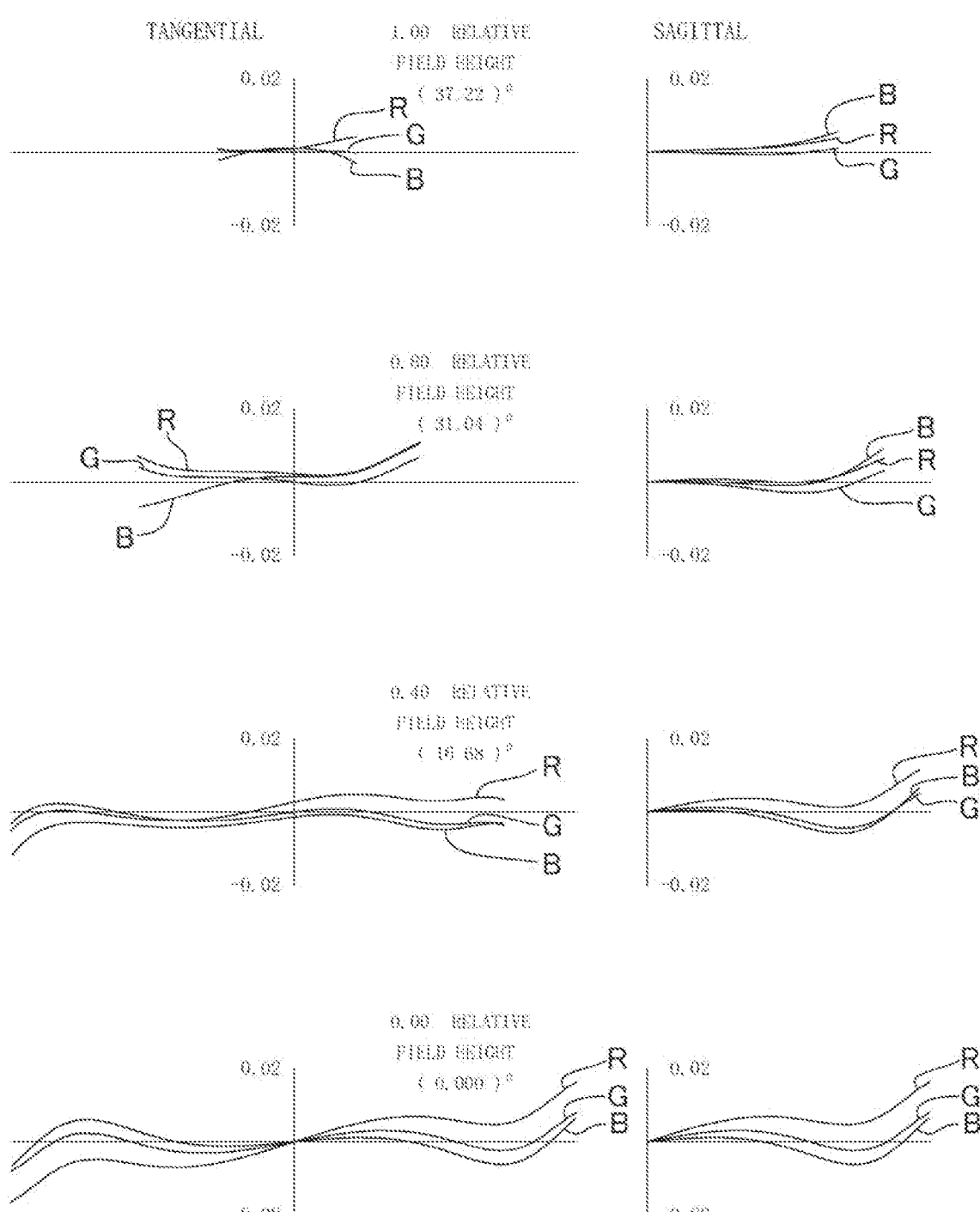
FIG. 43 shows the coma produced by the projection system according to Example 9 operating at the wide angle end.
Figure 44:
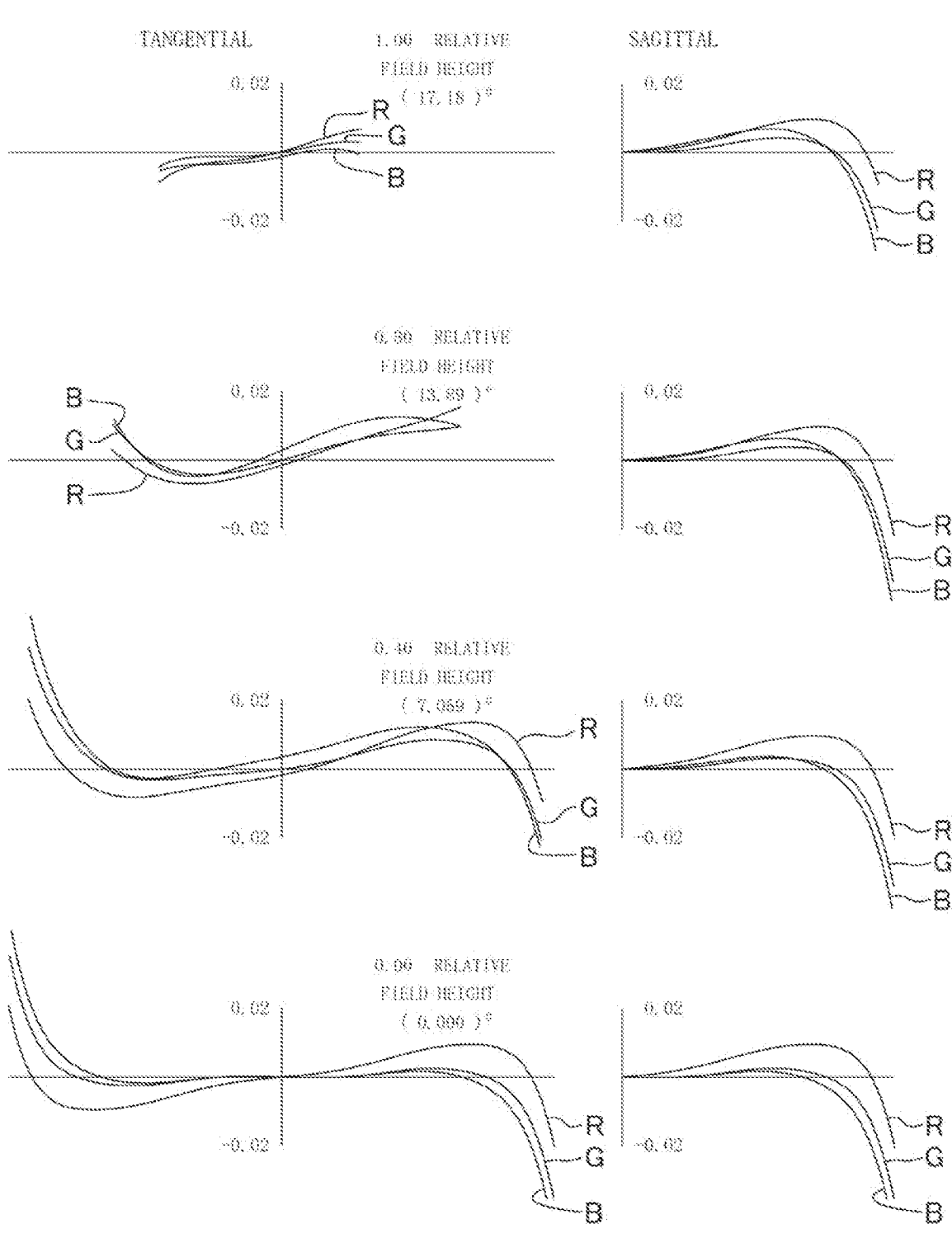
FIG. 44 shows the coma produced by the projection system according to Example 9 operating at the telephoto end.
Figure 45:
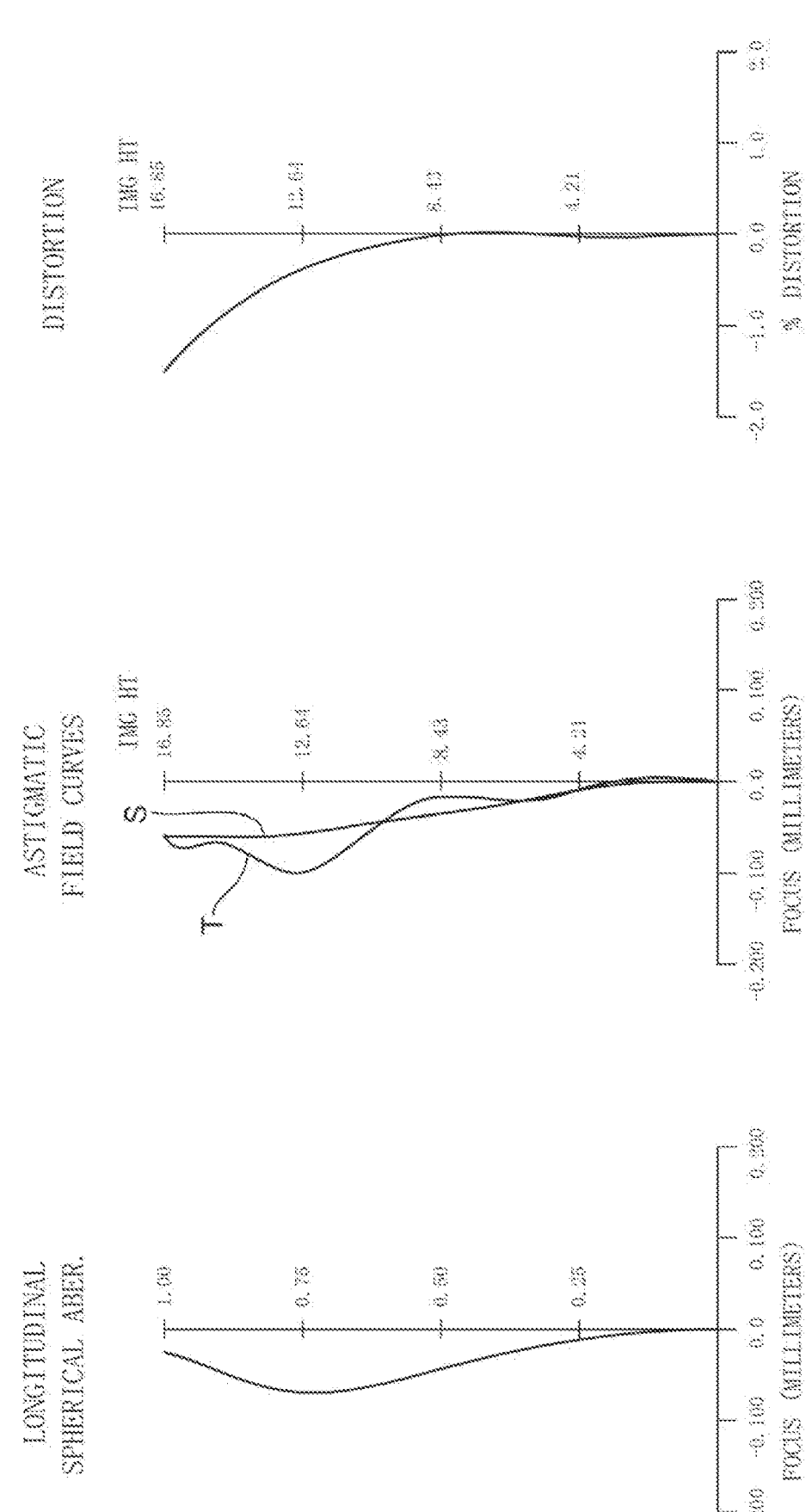
FIG. 45 shows the spherical aberration, astigmatism, and distortion produced by the projection system according to Example 9 operating at the wide angle end.
Figure 46:
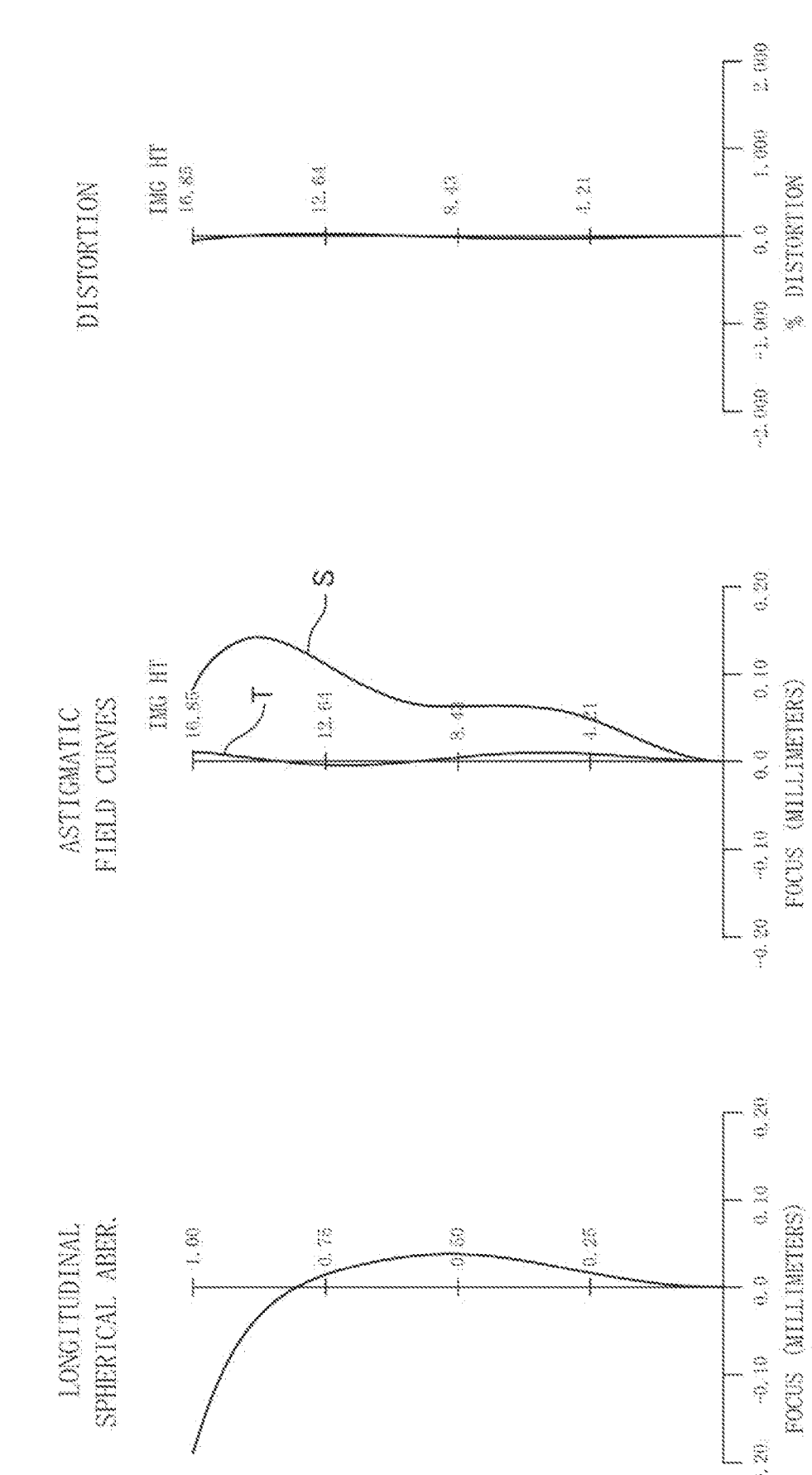
FIG. 46 shows the spherical aberration, astigmatism, and distortion produced by the projection system according to Example 9 operating at the telephoto end.

FIG. 43 shows the coma produced by the projection system 3I operating at the wide angle end. FIG. 44 shows the coma produced by the projection system 3I operating at the telephoto end. FIG. 45 shows the spherical aberration, astigmatism, and distortion produced by the projection system 3I operating at the wide angle end. FIG. 46 shows the spherical aberration, astigmatism, and distortion produced by the projection system 3I operating at the telephoto end. The projection system 3I according to the present example suppresses the variety of aberrations, as shown in FIGS. 43 to 46.

Other Examples

The projection system 3 described above may have a focusing function. In this case, the first lens group G1 of the projection system 3 only needs to be moved along the optical axis N during focusing. A lens group other than the first lens group G1 of the projection system 3 may instead be moved along the optical axis N during focusing.

SUMMARY OF PRESENT DISCLOSURE

The present disclosure will be summarized below as additional remarks.

Additional Remark 1

A projection system including a first lens group having negative power, a second lens group having positive power, a third lens group having positive power, a fourth lens group having negative power, a fifth lens group having positive power, a sixth lens group having positive power, and a seventh lens group having positive power that are sequentially arranged from the enlargement side toward the reduction side, the second lens group, the third lens group, the fourth lens group, the fifth lens group, and the sixth lens group being moved with the first lens group and the seventh lens group fixed to change the magnification of the projection system, and the projection system satisfies the following conditional expression, $$1.0 < Fg2/Fw < 3.0 \tag{1}$$

$$-2.50 \le Fg2/Fg1 < -1.0 \tag{2}$$

$$0.5 \le Fg2/Fg3 < 1.0 \tag{3}$$

$$Ft/Fw > 2.0 \tag{4}$$

where Fw represents the focal length of the overall projection system operating at the wide angle end, Ft represents the focal length of the overall projection system operating at the telephoto end, Fg1 represents the focal length of the first lens group, Fg2 represents the focal length of the second lens group, and Fg3 represents the focal length of the third lens group.

The projection system can therefore satisfactorily correct the chromatic aberration of magnification and the variety of aberrations while achieving a large zooming ratio.

Additional Remark 2

The projection system described in the additional remark 1, in which the second lens group is formed of a positive lens, a positive lens, and a negative lens arranged from the enlargement side toward the reduction side.

The second lens group can therefore satisfactorily correct the chromatic aberration of magnification and the variety of aberrations.

Additional Remark 3

The projection system described in the additional remark 1 or 2 satisfies the following conditional expression, $$0.10 < Dwg12/LL < 0.30 \tag{5}$$

where LL represents the overall length of the projection system, and Dwg12 represents the spacing between the first lens group and the second lens group of the projection system operating at the wide angle end.

The projection system can therefore suppress design error sensitivity and ensure the spacing between the first lens group and the second lens group while satisfactorily correcting the chromatic aberration of magnification and distortion.

Additional Remark 4

The projection system described in any one of the additional remarks 1 to 3 satisfies the following conditional expression, $$0 < Dwg34/LL \le 0.05 \tag{6}$$

where LL represents the overall length of the projection system, and Dwg34 represents the spacing between the third lens group and the fourth lens group of the projection system operating at the wide angle end.

The projection system therefore allows reduction in the cost of the lens materials while satisfactorily correcting the chromatic aberration of magnification.

Additional Remark 5

The projection system described in any one of the additional remarks 1 to 4 satisfies the following conditional expression, $$8.0 < LL/IH \le 11.0 \tag{7}$$

where LL represents the overall length of the projection system, and IH represents the largest image height at the reduction side.

The projection system can therefore satisfactorily correct the variety of aberrations with the overall projection system being compact.

Additional Remark 6

The projection system described in any one of the additional remarks 1 to 5 satisfies the following conditional expression, $$Nd < 1.85 \tag{8}$$

where Nd represents the refractive index of the following lenses at the d line: the lenses that constitute the first lens group, the second lens group, the third lens group, the fourth lens group, the fifth lens group, the sixth lens group, and the seventh lens group.

The projection system therefore allows improvement in the transmittance of the lenses and reduction in the cost of the lens materials.

Additional Remark 7

A projector including the projection system according to any one of the additional remarks 1 to 6, and an image formation device that forms a projection image in the reduction-side conjugate plane of the projection system.

What is claimed is:

1. A projection system comprising a first lens group having negative power, a second lens group having positive power, a third lens group having positive power, a fourth lens group having negative power, a fifth lens group having positive power, a sixth lens group having positive power, and a seventh lens group having positive power that are sequentially arranged from an enlargement side toward a reduction side, wherein the second lens group, the third lens group, the fourth lens group, the fifth lens group, and the sixth lens group are moved with the first lens group and the seventh lens group fixed to change the magnification of the projection system, and the projection system satisfies the following conditional expressions, $$1.0 < Fg2/Fw < 3.0 \tag{1}$$

$$-2.50 \le Fg2/Fg1 < -1.0 \tag{2}$$

$$0.5 \le Fg2/Fg3 < 1.0 \tag{3}$$

$$Ft/Fw > 2.0 \tag{4}$$

where Fw represents a focal length of the overall projection system operating at a wide angle end, Ft represents the focal length of the overall projection system operating at a telephoto end, Fg1 represents a focal length of the first lens group, Fg2 represents a focal length of the second lens group, and Fg3 represents a focal length of the third lens group.

2. The projection system according to claim 1, wherein the second lens group is formed of a positive lens, a positive lens, and a negative lens arranged from the enlargement side toward the reduction side.

3. The projection system according to claim 1, satisfying the following conditional expression, $$0.10 < Dwg12/LL < 0.30 \tag{5}$$

where LL represents an overall length of the projection system, and Dwg12 represents a spacing between the first lens group and the second lens group of the projection system operating at the wide angle end.

4. The projection system according to claim 1, satisfying the following conditional expression, $$0 < Dwg34/LL \le 0.05 \tag{6}$$

where LL represents an overall length of the projection system, and Dwg34 represents a spacing between the third lens group and the fourth lens group of the projection system operating at the wide angle end.

5. The projection system according to claim 1, satisfying the following conditional expression, $$8.0 < LL/IH \le 11.0 \tag{7}$$

where LL represents an overall length of the projection system, and IH represents a largest image height at the reduction side.

6. The projection system according to claim 1, satisfying the following conditional expression, $$Nd < 1.85 \tag{8}$$

where Nd represents a refractive index of the following lenses at a d line: lenses that constitute the first lens group, the second lens group, the third lens group, the fourth lens group, the fifth lens group, the sixth lens group, and the seventh lens group.

7. A projector comprising:

the projection system according to claim 1; and an image formation device that forms a projection image in a reduction-side conjugate plane of the projection system.

* * * * *